(12) United States Patent
Fujita et al.

(10) Patent No.: US 7,275,793 B2
(45) Date of Patent: Oct. 2, 2007

(54) SEAT

(75) Inventors: Etsunori Fujita, Hiroshima (JP); Seiji Kawasaki, Hiroshima (JP); Yumi Ogura, Hiroshima (JP); Eiichi Yasuda, Aichi (JP); Shunichi Doi, Aichi (JP); Etsuko Kato, Aichi (JP); Katsuya Ibaraki, Aichi (JP)

(73) Assignees: Delta Tooling Co., Ltd., Hiroshima-shi (JP); Kabushiki Kaisha Toyota Chuo Kenkyusho, Aichi-gun (JP)

( * ) Notice: Subject to any disclaimer, the term of this patent is extended or adjusted under 35 U.S.C. 154(b) by 264 days.

(21) Appl. No.: 10/477,877

(22) PCT Filed: Apr. 2, 2002

(86) PCT No.: PCT/JP02/03309

§ 371 (c)(1), (2), (4) Date: Nov. 17, 2003

(87) PCT Pub. No.: WO02/091881

PCT Pub. Date: Nov. 21, 2002

(65) Prior Publication Data

US 2004/0145230 A1 Jul. 29, 2004

(30) Foreign Application Priority Data

May 16, 2001 (JP) .............................. 2001-146471
Jul. 5, 2001 (JP) .............................. 2001-204925

(51) Int. Cl.
*B60N 2/50* (2006.01)

(52) U.S. Cl. ........................ 297/452.56; 297/452.27; 297/452.48

(58) Field of Classification Search ........... 297/452.48, 297/452.28, 216.1, 216.13, 216.14, 216.16, 297/218.1, 218.2, 218.3, 218.5, 229, 230.11, 297/452.18, 452.56, 452.27; 5/655.9, 953; 428/45

See application file for complete search history.

(56) References Cited

U.S. PATENT DOCUMENTS 2,596,292 A * 5/1952 Sackner .................. 297/452.48

(Continued)

FOREIGN PATENT DOCUMENTS

EP          0 157 105          10/1985

(Continued)

OTHER PUBLICATIONS

Microfilm of the specification and drawings annexed to the request of the Japanese Utility Model Application No. 142950/1980 ) Laid-open No. 65650/1982) (Tachikawa Spring Co., Ltd.), Apr. 19, 1982 (Apr. 19, 1982), Full text; Figs. 1 to 5. (Family: none).

*Primary Examiner*—Peter R. Brown
(74) *Attorney, Agent, or Firm*—Oblon, Spivak, McClelland, Maier & Neustadt, P.C.

(57) ABSTRACT

A seat includes a seat frame, and a cushion material supported by the seat frame and having a three-dimensional knitted fabric which is formed by joining, with connecting threads, a pair of ground knit fabrics which are disposed so as to be separated from one another. The cushion material includes a first region whose elastic compliance when a reaction force is applied to an extending side of the cushion material when an occupant is seated on the seat is substantially equivalent to an elastic compliance of a portion of the occupant's body pressing the cushion material and a second region whose elastic compliance is larger than that of the first region. Accordingly, a thin and light seat can be provided, load concentration on the occupant's tuber ishiadicum bottom portion when seated for a long period of time can be mitigated, and vibration-transmitting characteristics can be improved.

36 Claims, 31 Drawing Sheets

U.S. PATENT DOCUMENTS

| | | | |
|---|---|---|---|
| 3,083,496 A * | 4/1963 | Feinerman | 297/452.48 |
| 3,109,679 A * | 11/1963 | Eames | 297/452.48 |
| 3,616,171 A * | 10/1971 | Hoskinson, Sr. | 428/300.7 |
| 5,360,653 A * | 11/1994 | Ackley | 428/71 |
| 5,669,799 A * | 9/1997 | Moseneder et al. | 442/374 |
| 6,428,083 B2 * | 8/2002 | Dettoni et al. | 296/146.7 |

FOREIGN PATENT DOCUMENTS

| | | |
|---|---|---|
| EP | 1 084 902 A2 | 3/2001 |
| JP | 4-222260 | 8/1992 |
| JP | 6-49244 | 12/1994 |
| JP | 2001-17262 | 1/2001 |
| JP | 2001-87077 | 4/2001 |
| WO | WO99/44125 | 9/1999 |

* cited by examiner

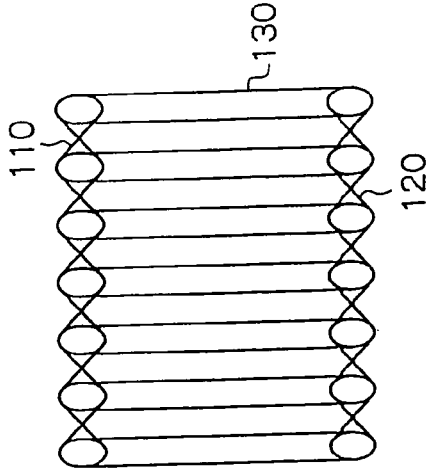
FIG. 8A
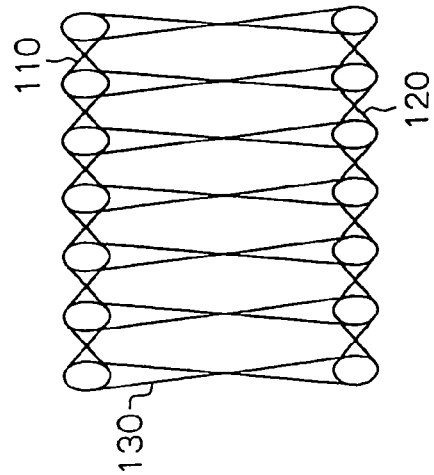
FIG. 8B
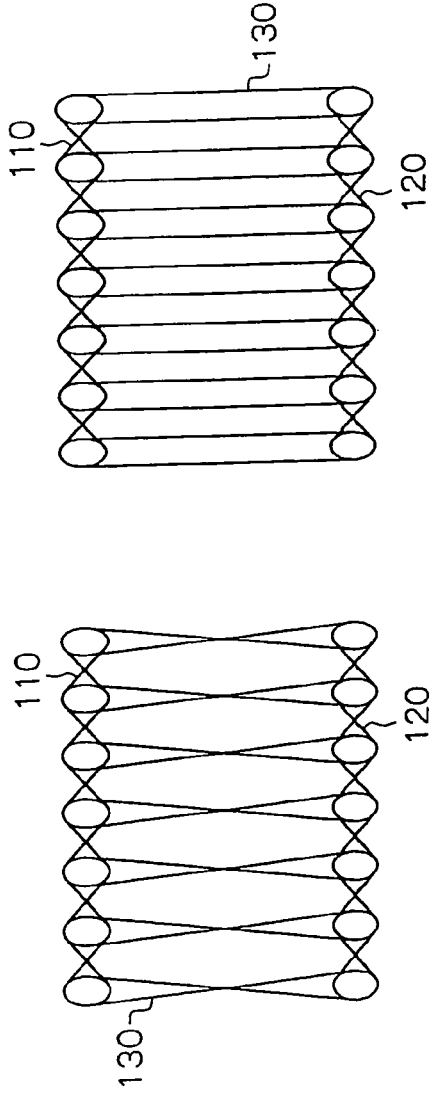
FIG. 8C
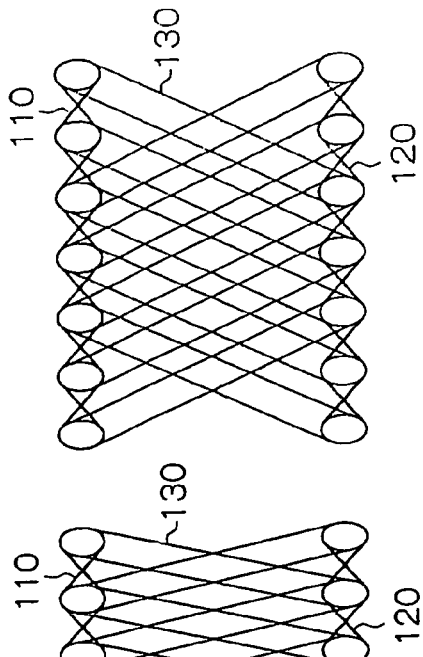
FIG. 8E
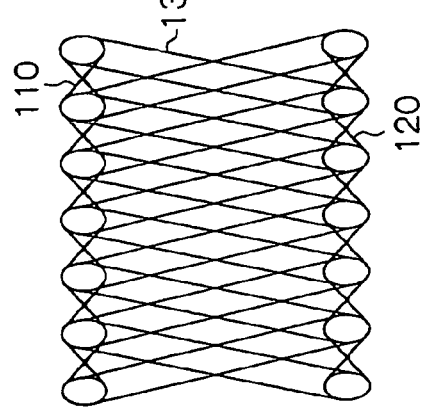
FIG. 8D
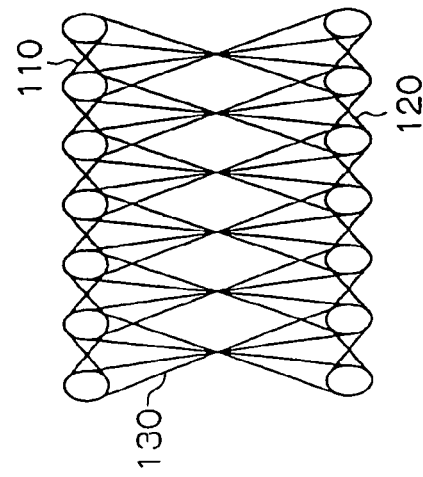

FREQUENCY CHARACTERISTIC OF SPRING CONSTANT

FREQUENCY CHARACTERISTIC OF DAMPING COEFFICIENT

FREQUENCY CHARACTERISTIC(JM85) OF
SPRING CONSTANT k/DAMPING COEFFICIENT c
IN MUSCLES OF BUTTOCKS

VIBRATION MODEL AT 1 DEGREE OF FREEDOM

FREQUENCY CHARACTERISTIC OF FLEXURE IN MUSCLES OF BUTTOCKS

ELASTIC COMPLIANCE WHEN CUSHION AND MUSCLES ARE IN EQUILIBRIUM STATE (3Hz)

IN CASE OF 3Hz

IN CASE OF 4Hz

SEAT

TECHNICAL FIELD

The present invention relates to a seat using a three-dimensional knitted fabric as a cushion material, and more particularly, to a variety of seats such as a vehicle seat for an automobile or train, an office chair, a furniture chair and the like.

BACKGROUND ART

Lately, a vehicle seat using a three dimensionally structured net material (three-dimensional knitted fabric) which is of a thin-type, but able to exhibit a high cushioning performance, and which has a large number of cylinders and is accordingly able to exhibit excellent air permeability, has been known. The three-dimensional knitted fabric has a truss structure (three-dimensional structure) which does not easily elastically wear out. The truss structure is formed by using a large number of connecting threads to join a pair of ground knit fabrics which are disposed so as to be separated from one another. The three-dimensional knitted fabric has excellent air permeability, body pressure distribution performance, and impact absorbing performance, and in spite of being of a thin type, can impart characteristics similar to those obtained by a high elastic polyurethane foam generally used as a cushion material.

However, when a cushion material having high stiffness is used for a vehicle seat or the like, a load from a human body is generally concentrated on a muscle portion in the vicinity of a tuber ischiadicum. This creates an uncomfortable sensation, and even causes numbness when an occupant is seated on a vehicle seat for a long period of time.

On the other hand, it is known that ranges of vibration which largely influence riding comfort are around 5 Hz at which range a skeleton of an occupant (a human body) swings vertically and at 2 Hz or less at which range a human body swings in a forward-backward (longitudinal) direction. Therefore, it is considered that an ideal cushion material should have characteristics whose tolerable vibration peak is outside the aforementioned vibration ranges, and in addition, whose vibration-transmitting ratio is relatively low, within a range of 6 to 8 Hz, and accordingly, has resonance with the internal organs of an occupant.

In view of the aforementioned facts, an object of the present invention is to provide a seat using a three-dimensional knitted fabric of a thin and light type and having superior characteristics as a cushion material as described above, in which riding comfort can be improved by alleviating concentration of a load on a tuber ishiadicum of an occupant, reducing occurrences of numbness when an occupant is seated for a long period of time, and compared with the past, alleviating vibration-transmitting characteristics caused by the impact of vibration on a human body (seated occupant).

DISCLOSURE OF THE INVENTION

In order to solve the aforementioned problems, the following aspects have attracted the attention of the present inventors:

First, the present inventors reached a conclusion that concentration of a load on a tuber ischiadicum bottom of an occupant causes numbness to occur. This is because, if a cushion material for a seat has high stiffness, the amount of deformation of a muscle portion (including skin) of an occupant pressing the cushion material is greater than that of the cushion material. Further, a muscle portion of a human body and the cushion material make contact with each other through clothes and the like of an occupant. However, since the clothes can be ignored, hereinafter, in some cases, the term "contacting" is used instead of the term of 'pressing'.

In other words, as shown in FIG. 4, when a load (weight) W acts on the cushion material, in consideration of a serial connection between a spring constant $k_1$ of the cushion material and an equivalent spring constant $k_2$ of a muscle portion of the buttocks of a human body, flexure of the cushion material $x_1$ is represented by $x_1 = W/k_1$, and flexure of buttocks $x_2$ is represented by $x_2 = W/k_2$. For this reason, when $k_1 > k_2$, flexure of buttocks $x_2$ becomes greater, concentration of a load on a tuber ishiadicum bottom portion of a human body and numbness as a result of concentration of load tend to occur.

Accordingly, the smaller the spring constant of the cushion material $k_1$ in relation to that of a muscle portion of the buttocks $k_2$, the greater the flexure of the cushion material $x_1$. Therefore, by using a cushion material which includes a region having a spring constant substantially equivalent to or smaller than that of a portion of an occupant's body pressing (or contacting) the cushion material, concentration of load on a tuber ischiadicum bottom of a human body and occurrences of numbness as a result of the concentration of load can be reduced. Further, by forming such a region on the cushion material, when a muscle portion of a human body is considered as a material for structuring a vibration system, a muscle portion behaves as a vibration model at 2 degrees of freedom when having a dynamic vibration absorbing effect, and it is considered that vibration-transmitting characteristics can also thereby be improved. In this context, 'dynamic vibration absorbing effect' means that a pair of thighs of an occupant behaves as a dynamic vibration absorber, and dynamically damps vibration applied to an object which has been mainly formed by a fuselage of an occupant.

On the other hand, "spring constant" is determined by a relative relationship between a load and a flexure amount. However, in order to evaluate a very small region (per unit area) of a seat portion which the periphery of a tuber ishiadicum of an occupant contacts by considering that a state in which an occupant is seated on a seat is an equilibrium point, it is effective to use as an index an elastic compliance in which pressure fluctuation is a variable input, displacement is an output value, and a load is converted into a pressure value, i.e., an "elastic compliance" which is calculated by "flexure amount/pressure value". Accordingly, providing a cushion material with a region whose spring constant is substantially equivalent to or smaller than that of a human body portion contacting (pressing) against the cushion material can be considered an alternative to setting a cushion material in a structure having a region whose elastic compliance is substantially equivalent to or greater than that of a human body portion contacting the cushion material.

FIG. 22 shows a flexure characteristic of a muscle portion in relation to a pressure of a pressurizing plate, a flexure characteristic which is measured at a region from the ishium to the vicinities of the thighs of an occupant by using a pressurizing plate having a diameter of 98 mm. In accordance with this flexure characteristic, it can be noted that change of characteristic on the buttocks and thighs are small. Further, inclination of this characteristic (flexure amount/pressure value) represents a so-called elastic compliance. A detailed description of elastic compliance will be made later.

A description of a pressurizing plate having a diameter of 98 mm (hereinafter, a 98 mm-diameter pressurizing plate) will be made next. First, an assumption is made that a mass of a fuselage (trunk portion) of a human body is concentrated on a seat portion which the periphery of a tuber ishiadicum of an occupant contacts. It is known that a distance between two tuber ishiadica for a male adult is 100 mm to 115 mm, and for a female adult, 110 mm to 130 mm.

When data for body pressure distribution is evaluated, it is considered that a partial stiffness of a cushion material is measured by using a pressurizing plate whose diameter is 100 mm or less. It is also assumed that 80% of a weight of an occupant is concentrated on the vicinity of a tuber ishiadicum, and when an occupant weighs 60 kg, a pressurizing plate whose diameter is 200 mm can support 45 kg out of 60 kg. When this value is converted into a pressure value, it becomes 143 g/cm$^2$. In this case, two 98 mm-diameter pressurizing plates can support a load of 21.57 kg. This value is within a pressure range which the 98 mm-diameter pressurizing plate can output, when it is assumed that a maximum pressure value of a seat, which provides an occupant with a sense of comfortable riding comfort, is 180 to 200 g/cm$^2$. As shown in FIG. 36, this value is approximate to a load mean value which is obtained by integrating a pressure value per unit area, which is experimentally determined by using q body pressure distribution meter, with a dimension of a 98 mm-diameter.

In considering 120 kg weight, one 98-diameter pressurizing plate corresponds to a load of 21.57 kg. Accordingly, partial stiffness was measured under the same conditions as those of the 98 mm-pressurizing plate (maximum load: 20 kg). Further, by means of an experiment, it was confirmed that a range of a pressure of 80 g/cm$^2$ or more, which is considered as a reference value on the basis of a capillary pressure value, can be concentrated on a pressure range of the 98 mm-diameter pressurizing plate. Further, it was verified that a slender seated occupant imparts a pressure value higher than that of a fatter seated occupant. Accordingly, when the flexure characteristics of a muscle portion and the like are examined, use of the 98 mm-diameter pressurizing plate is reasonable.

When the seat portion is formed by polyurethane foam, the seat portion is formed such that an occupant feels sensation of softness at a tuber ishiadicum bottom portion, and increasingly hardness toward a front edge portion of the seat portion. However, there is a possibility that a front edge portion of the seat portion compresses the rear sides of the thighs of an occupant thereby causing compression of nerves and impeding blood flow. Accordingly, it is desirable that the elastic compliance of a dimension of the seat portion which the thighs of an occupant contacts (which substantially corresponds to a dimension of the 98 mm-diameter pressurizing plate) be greater than that of a corresponding dimension of the seat portion which the vicinity of a tuber ishiadicum bottom portion of an occupant contacts. In terms of a spring constant, it is desirable that a spring constant of a front edge portion of the seat portion be smaller than that of the seat portion which the vicinity of a tuber ishiadicum bottom portion of an occupant contacts, and it is also desirable that it impart a characteristic of a small reaction force. In particular, when the cushion material is used for a vehicle seat, in order to facilitate a smooth pedal operation, it is desirable that the required spring characteristic at a front edge portion of a seat portion not be excessively large.

The elastic compliance of the seat portion which a tuber ishiadicum bottom portion of an occupant contacts is made to be substantially equivalent to that of a human body portion contacting the seat portion, and the elastic compliance of a front edge portion of a seat portion is made to be greater than that of the seat portion which a tuber ishiadicum bottom portion of an occupant contacts. Accordingly, although a fluctuation characteristic is non-linear, hysteresis loss is large. Consequently, setting of load occurs, and a reaction force applied to a human body can be minimized. As described above, occurrences of numbness in a tuber ishiadicum bottom portion can be prevented and attempts can be made to prevent the impeding of blood flow into the thighs of an occupant.

On the other hand, the seat portion which a pelvis front portion of an occupant contacts, which is located about 100 mm forward of the seat portion which a tuber ishiadicum bottom portion of an occupant contacts, has an elastic compliance smaller than that of a human body (seated occupant) contacting the seat portion. Meanwhile, a linear characteristic of the seat portion which a pelvis front portion of an occupant contacts is more pronounced than that of the seat portion which a tuber ishiadicum bottom portion of an occupant contacts. Therefore, a region that functions as a dam can be formed at the seat portion which the vicinity of a pelvis front portion of an occupant contacts. Accordingly, an ishium portion of a human body can sink into a relatively large amount, rotation of the ishium can be prevented, and stability of seating posture can be improved. Further, a spring system, which imparts a restoring force against an input force, is intensively focused on a tuber ishiadicum bottom portion, which is a gravity center of a vertical load when an occupant is seated on the seat. Consequently, efficiency of the restoring force is improved, relative displacement is made greater by a small frequency band, and reduction of vibration by means of anti-phase is made possible.

The above descriptions are summarized as shown in table 1:

TABLE 1

| | tuber ishiadicum bottom portion | pelvis front portion (100 mm in front) | front edge portion |
|---|---|---|---|
| elastic compliance characteristic | equivalent to human body non-linear | smaller than human body higher linear than that of seat portion beneath tuber ishiadicum bottom portion | larger than human body non-linear |
| spring constant | equivalent to human body | larger than that of human body | smaller than that of human body |

Moreover, it becomes important to determine a spring constant of a muscle portion k and a damping coefficient c in relation to vibration frequency in order to set characteristics of the cushion material. To this end, simple vibration test were conducted on the buttocks of four male adults to examine frequency characteristics of the spring constant k and the damping coefficient c.

As shown in FIG. 31, an occupant was seated on a seat portion which is structured by stretching a cloth spring across a frame of a size: 370 mm×520 mm×320 mm. Vibration was applied to the seat portion by varying a sine waveform frequency at 1 Hz of from 2 Hz to 10 Hz. Based on flexure of a tuber ishiadicum bottom portion measured from the rear side of the cloth spring, on an output from a small acceleration sensor mounted on the seat portion which a tuber ishiadicum bottom portions contacts, and on a mass equivalent to 80% of a weight of an occupant as shown in FIG. 32, a vibration model at 1 degree of freedom was simulated, whereby the spring constant k and the damping coefficient c were determined by using a state of mass obtained from the experiment. Frequency characteristics of the spring constant k and the damping coefficient c of a JM85 (Japanese male/weight 85 kg) are shown in FIGS. 30A and 30B.

Hardness of buttocks was measured from the rear side of the cloth spring by a Shore A hardness meter. Since the measured hardness of buttocks and the hardness of buttocks during seating posture were equivalent to one another, the spring constant of the cloth spring was insignificant in comparison with that of a muscle portion. Accordingly, the frequency characteristics which are shown in FIGS. 30A and 30B can be regarded as equivalent to those of the spring constant k and the damping coefficient c of buttocks.

As shown in FIG. 30A, the spring constant k decreases in a range from 3 Hz to 6 Hz, turned negative near 6 Hz, and thereafter, reached a maximum near 9 Hz. On the other hand, as shown in FIG. 30B, characteristics of the damping coefficient c increases at around 6 Hz and 7 Hz where the spring constant k turned negative. As shown in the frequency characteristics of flexure of a muscle portion of the buttocks in FIG. 33, it can be deduced that the spring constant k turns negative near 6 Hz because there are two vertical resonances near 4 Hz and 9 Hz, and there is anti-resonance near 6 Hz. It can be inferred that the two resonances were caused respectively in the vicinity of 4 Hz on account of a mass of an upper body and in the vicinity of 9 Hz ion account of a mass of a waist portion of a human body. However, these resonance frequencies are shown as an example of a JM85, and in the case of a light seated occupant, respective resonance frequencies become higher.

Thus, it has become apparent that, among the characteristics of a muscle portion of the buttocks at below 10 Hz, the spring constant k and the damping coefficient c are determined in accordance with vibration frequencies in a vibration system with 2 degrees of freedom in the seating posture of a human body. Namely, the spring constant of a muscle portion of a tuber ishiadicum bottom portion, on which a greater part of a cushioning load is concentrated, becomes almost zero in a range of 4 to 6 Hz, and it is accordingly important to set the spring constant so as not to cause a muscle portion to collapse at the periphery of a tuber ishiadicum contacting the cushion material. Thus, in order to minimize the spring constant of the cushion material which the periphery of a tuber ishiadicum contacts (for example, a dimension of 30 mm-diameter), and to disperse the load into the periphery of a tuber ishiadicum (for example, a contacting dimension of 98 mm-diameter), it is necessary to set such a spring constant that can change a surface stiffness at the periphery of a tuber ishiadicum and the nearby region.

The present invention has been achieved in the light of the above-described information, and is a seat comprising a seat frame and a cushion material having a three-dimensional knitted fabric which is formed by joining with connecting threads, a pair of ground knit fabrics which are disposed so as to be separated from one another, and which material is supported by the seat frame, in which the cushion material comprises a first region whose elastic compliance when a reaction force is applied to an extending side of the cushion material when an occupant is seated on the seat is substantially equivalent to that of a human body portion pressing the cushion material, and a second region whose elastic compliance is larger than that of the first region.

When a load applied to a contracting side of the cushion material when an occupant is seated on the seat, and a reaction force which is applied to an extending side of the cushion material in response to the load which has been applied to the contracting side of the cushion material are in equilibrium, an elastic compliance of the second region when a very small reaction force is applied to an extending side of the cushion material is greater than that of a human body portion pressing the cushion material.

A road surface vibration while a vehicle is traveling is largely affected by a load fluctuation characteristic when a weight of an occupant and a reaction force applied to the cushion material are in equilibrium. In the present invention, when a very small reaction force is applied to the extending side of the cushion material, an elastic compliance of the second region is larger than that of a human body (a muscle portion) pressing the cushion material. Accordingly, flexure variation in relation to the cushion material becomes greater, and accordingly, flexure variation in relation to a muscle portion becomes less. Consequently, vibration stimulus transmitted to a human body can be reduced and riding comfort can be improved.

In the present invention, in order to examine an elastic compliance of the cushion material during the aforementioned equilibrium state, a load was calculated in accordance with an average pressure of a region, which is mainly at a tuber ishiadicum bottom portion having a 98 mm-diameter. Then, by using a 98 mm-pressurizing plate which has a mass of about 67N equivalent to the obtained load value, vibration having a sine waveform with a constant frequency was applied to 150 mm and 250 mm positions from the rear end of the cushion material. Accordingly, on the basis of pressure of the pressurizing plate and flexure of the cushion material, elastic compliance in the aforementioned equilibrium state was examined.

A pressure of the pressurizing plate was determined such that an inertia force could be calculated by using an output from an acceleration sensor mounted on the pressurizing plate and a mass, and the inertia force thus calculated was divided by a dimension of the pressurizing plate. Further, flexure of the cushion material was determined such that a relative displacement between the pressurizing plate and a vibration-applying base was measured by using a laser displacement meter. FIG. 34 shows an example of results from an experimental simulation of the equilibrium state at the points of 150 mm (the periphery of a tuber ishiadicum) and 250 mm, respectively from the rear end of a seat surface of the cushion material. FIG. 34 shows a graph in which a Lissajous's waveform, formed by a pressure value of the pressurizing plate and flexure of the cushion material, and a static muscle characteristic of FIG. 22 overlap one another.

FIG. 35A shows a graph illustrating a characteristic at 3 Hz by enlargement of portion A of FIG. 34, and FIG. 35B shows a graph illustrating a characteristic at 4 Hz.

As is apparent from FIG. 34, gradients of the Lissajous's waveforms, i.e., elastic compliances at the 150 mm and 250 mm positions have substantially the same value, that is, about 900 mm$^3$/N. The elastic compliance is the same as that of a static elastic compliance of a muscle portion. The elastic compliance has substantially the same tendency for each frequency. Further, a value when the elastic compliance is converted into an average spring constant k of the 98 mm-pressurizing plate is 8.3 kN/m. It is noted that this value is relatively small except values near 6 Hz which are anti-resonance and which are shown in FIG. 30A.

As a result, when a load applied to a contracting side of the cushion material when an occupant is seated on the seat, and a reaction force applied to an extending side of the cushion material in response to the load which has been applied to the contracting side of the cushion material are in equilibrium, an elastic compliance of the second region when a very small reaction force is applied to an extending side of the cushion material is greater than that of a muscle portion of the buttocks (the spring constant decreases sufficiently). Accordingly, the cushion material can absorb a greater part of vibration energy transmitted to a muscle portion of the buttocks while a vehicle is traveling. Consequently, vibration stimulus to a human body is mitigated, and riding comfort is improved.

The first region and the second region are laminated to one another such that the second region is positioned on a top layer portion of a seat portion, or alternatively, the first region and the second region can be disposed such that the second region is positioned at a front edge side of a seat portion and the first region is positioned at a predetermined region including a tuber ishiadicum bottom portion (the periphery of a tuber ishiadicum bottom portion) of an occupant. By laminating the first region and the second region to one another, as described above, vibration is transmitted to a human body via the region whose elastic compliance is greater than that of a muscle portion of a human body. Accordingly, vibration stimulus transmitted to a human body can be mitigated, and riding comfort can be improved. Further, since the second region is positioned at a front edge side of a seating portion, it is possible to prevent numbness of a muscle portion near a tuber ishiadicum bottom portion and the impeding of blood flow into the thighs.

The first region has a region whose elastic compliance is less than that of a human body at the lower portion thereof. Accordingly, the first region can exhibit elastic compliance substantially equivalent to that of a human body.

The present invention is a seat comprising a seat frame, and a cushion material including a three-dimensional knitted fabric which is formed by joining with connecting threads, a pair of ground knit fabrics disposed so as to be separated from one another and a three-dimensional knitted fabric which is supported by the seat frame. The cushion material comprises a first region whose elastic compliance when a reaction force is applied to an extending side of the cushion material when an occupant is seated on the seat is substantially equivalent to that of a portion of the occupant's body pressing the cushion material and which is positioned at a predetermined region including a seat portion which a tuber ishiadicum bottom portion of an occupant contacts, a second region whose elastic compliance is greater than that of the first region and which is positioned in the vicinity of a front edge portion of the seat portion, and a third region whose elastic compliance is less than that of the first region and which is positioned at a seat portion which the vicinity of a pelvis front portion of an occupant contacts.

Further, in the present invention, the cushion material is structured such that the three-dimensional knitted fabric is stretched across the seat frame, and a portion of the stretched three-dimensional knitted fabric is mounted on an elastic member which is smaller than the three-dimensional knitted fabric and whose elastic compliance characteristic is substantially linear, and the cushion material comprises a first region having the elastic member beneath the three-dimensional knitted fabric and a second region which does not have an elastic member beneath the three-dimensional knitted fabric. In this case, the second region is positioned at a front edge side of the seat portion, and the first region is positioned at a predetermined region including a seat portion which a tuber ishiadicum bottom portion of an occupant contacts, whereby it is possible to prevent numbness on a tuber ishiadicum bottom portion and the impeding of blood flow into the thighs to an occupant.

The elastic member is provided at a region which has a predetermined region including a seat portion which a tuber ishiadicum bottom portion (the vicinity of a tuber ishiadicum bottom portion) of an occupant contacts, and which excludes the vicinity of a front edge portion of the seat portion and a rearward-direction portion from the predetermined region. In other words, the elastic member can be provided at points between 100 mm and 300 mm from the rear end portion of the seat portion.

In the present invention, a region, whose elastic compliance when the reaction force is applied to the extending side of the cushion material when an occupant is seated on the seat is smaller than that of a human body portion pressing the cushion material and whose linearity of displacement is higher than that of the predetermined region including a seat portion which a tuber ishiadicum bottom portion of an occupant contacts, is provided at a seat portion which the vicinity of a pelvis front portion of an occupant contacts, between the predetermined region including a seat portion which a tuber ishiadicum bottom portion of an occupant contacts, and a front edge portion of the seat portion. Accordingly, slidability of buttocks can be reduced, and seating stability when an occupant is seated can be improved.

When the three-dimensional knitted fabric is stretched across the seat frame, a seat surface rear end portion of the predetermined region including a seat portion which a tuber ishiadicum bottom portion of an occupant contacts is slackened to a predetermined amount. However, a seat portion which the vicinity of a pelvis front portion of an occupant contacts, between the predetermined region including the seat portion which a tuber ishiadicum bottom portion of an occupant contacts, and a front edge portion of the seat portion is hardly slackened. In this case, the three-dimensional knitted fabric is stretched across the seat frame such that a portion from the rear end of the seat portion to the predetermined region of the seat which a tuber ishiadicum bottom portion contacts is slackened by an extra width of 5 to 60 mm in relation to the entire width of the seat frame for structuring the seat portion. On the other hand, the portion of the seat portion which the vicinity of a pelvis front portion contacts, between the predetermined region of the seat which a tuber ishiadicum bottom portion contacts and the front edge portion of the seat portion is slackened by leaving an extra width of 0 to 20 mm.

The elastic member comprises a mesh-structure elastic member, a sheet-structure elastic member, or a mesh or sheet-structure elastic member supported by a metal spring, an elastic member which can impart large elasticity to a seat portion which the vicinity of a pelvis front portion of a seat occupant contacts.

Next, the three-dimensional knitted fabric will be explained.

The three-dimensional knitted fabric further comprises a portion which has a high surface stiffness, and a main elastic region which has a low surface stiffness and accordingly, imparts a major restoring force in relation to compressive deformation. In this case, two regions or more each having different compressibility are provided at the three-dimensional knitted fabric, and among these regions, one region, whose compressibility is high, is structured as the main elastic region imparting a major restoring force in relation to compressive deformation.

The three-dimensional knitted fabric has a main elastic region which has compressibility in a range from 20 to 90%, and compressive elasticity in a range from 75 to 100%, and compressibility difference between the main elastic region and a non-main elastic region is 5% or more.

Recesses and projections are formed at least one of the surfaces of the three-dimensional knitted fabric, either the recesses or the projections are formed as the main elastic region. In this case, the projections are formed among adjacent recesses into substantially arch-shaped cross sections to structure the main elastic region by making use of elasticity in a bending direction of the projections having substantially arch-shaped cross sections.

The three-dimensional knitted fabric is stretched across the seat frame such that the projections are formed in a wale form in an arbitrary direction of a surface of the three-dimensional knitted fabric, and the projections run in a longitudinal direction corresponding to a left-right direction of the seat at a seat portion or both at a seat portion and a back portion.

When projections of the three-dimensional knitted fabric are arranged in a lattice form or a staggered form, it is preferable that the three dimensional knitted fabric be stretched across the seat frame such that a direction in which arrangement density of the main elastic region is high corresponds to a left-right (transverse) direction of the seat at a seat portion alone or both at a seat portion and a back portion.

The three-dimensional knitted fabric is stretched across the seat frame at an elongation percentage of 5% or less. A thickness of the main elastic region of the three-dimensional knitted fabric ranges from 5 to 80 mm. A percentage per unit area of the main elastic region of the three-dimensional knitted fabric when projected on a plane can be 30%/m$^2$ to 90%/m$^2$.

The main elastic region of the three-dimensional knitted fabric is formed by adjusting a knitting organization of the three-dimensional knitted fabric and is adjusted by any one element or by combining two elements or more of a group of elements comprising a connecting thread arrangement density, a connecting thread thickness, a connecting thread length, a connecting thread material, a ground knit fabric mesh shape, a ground knit fabric mesh size, a ground thread material for structuring the ground knit fabric, and a mesh tightness at the connecting portion of the connecting threads and a ground knit fabric.

Further, recesses can be formed by joining the connecting threads between the pair of ground knit fabrics in a state in which they are made to approach one another, and projections structure the main elastic region. The recesses of the three-dimensional knitted fabric are formed by one of welding, adhesion, stitching, welding using molten fabric, and vibration welding.

Moreover, in the three-dimensional knitted fabric can be formed in a region of projections and a region of recesses with different elements by changing one or two or more of a group of elements comprising a connection thread arrangement density, a connecting thread thickness, a connecting thread length, a connecting thread material, a ground knit fabric mesh shape, a ground knit fabric mesh size, a ground thread material for structuring the ground knit fabric, and a mesh tightness at a connecting portion of the connecting threads and a ground knit fabric.

The three-dimensional knitted fabric can be formed such that the connecting threads in the recesses have an arrangement density lower than that of the connecting threads in the projections for structuring the main elastic region.

The pair of ground knit fabrics, which are disposed so as to be separated from one another, comprising a first ground knit fabric which is formed by a flat fabric organization, and a second ground knit fabric which comprises a plurality of strip-shaped knit fabric portions arranged so as to extend in a predetermined direction at a predetermined spacing, wherein the three-dimensional knitted fabric is formed by connecting a plurality of the strip-shaped knit fabric portions, respectively, to the first ground knit fabric, with connecting threads at a region of the first ground knit fabric which faces respective strip-shaped fabric portions, at a region of the first ground knit fabric which faces respective cylinders among the respective strip-shaped fabric portions, and at a region of the first ground knit fabric which faces other adjacent strip-shaped fabric portions. In the three-dimensional knitted fabric thus structured, the strip-shaped knit fabric portions connected with connecting threads form wale-shaped projections.

The present invention further comprises a hollow portion where connecting threads have been removed, the hollow portion formed at a widthwise intermediate portion of a region where the first ground knit fabric faces the strip-shaped knit fabric portions. The respective edge portions of the strip-shaped knit fabric portions and the first ground knit fabric are made to approach one another so that the respective strip-shaped knit fabric portions form projections. Due to this structure, elastic compliance of the three-dimensional knitted fabric can be increased.

The present invention further comprises a plurality of communicating portions where the respective adjacent strip-shaped knit fabric portions link with each other at a plurality of portions separated from one another at a predetermined spacing in an extending direction of the strip-shaped knit fabric portions.

It is preferable that the three-dimensional knitted fabric applicable to the present invention have substantially the same value as that of a human body portion pressing the cushion material.

As described above, the cushion material comprises a first region whose elastic compliance when a reaction force is applied to an extending side of the cushion material when an occupant is seated on the seat is substantially equivalent to that of a human body portion pressing the cushion material, and a second region whose elastic compliance is greater than that of the first region.

Consequently, in accordance with the present invention, a thin and light seat can be provided, load concentration on a tuber ishiadicum bottom portion of a seat occupant can be mitigated, and accordingly, riding comfort can be improved, when an occupant is seated for a long period of time, numbness can be reduced, and vibration-transmitting characteristics can be mitigated.

Further, if the elastic compliance of a front edge portion of a seat portion when a reaction force is applied to an extending side of the cushion material is made larger than that of a seat portion which the vicinity of a tuber ishiadicum bottom portion of a seated occupant contacts, the impeding of blood flow into the thighs of a seated occupant can be prevented, and when the cushion material is used for a vehicle seat, smooth pedal operation can be facilitated.

Moreover, by raising the linearity of the elastic compliance characteristic of a seat portion which a pelvis front portion of a seated occupant contacts, when a reaction force is applied to an extending side of the cushion material, and by making the elastic compliance of the seat portion which a pelvis front portion of the seated occupant contacts less than that of the seat portion which a tuber ishiadicum bottom portion (a predetermined region including a tuber ishiadicum bottom portion) of a seated occupant contacts, slidability of the buttocks of a seated occupant is minimized, and seating stability can be improved.

BRIEF DESCRIPTION OF THE DRAWINGS

FIGS. 8A to 8E show examples of various types of arrangement of connecting threads;

DESCRIPTION OF THE PREFERRED EMBODIMENTS

With reference to accompanying drawings, a detailed description of an embodiment of the present invention will be made, hereinafter.

Figure 1:
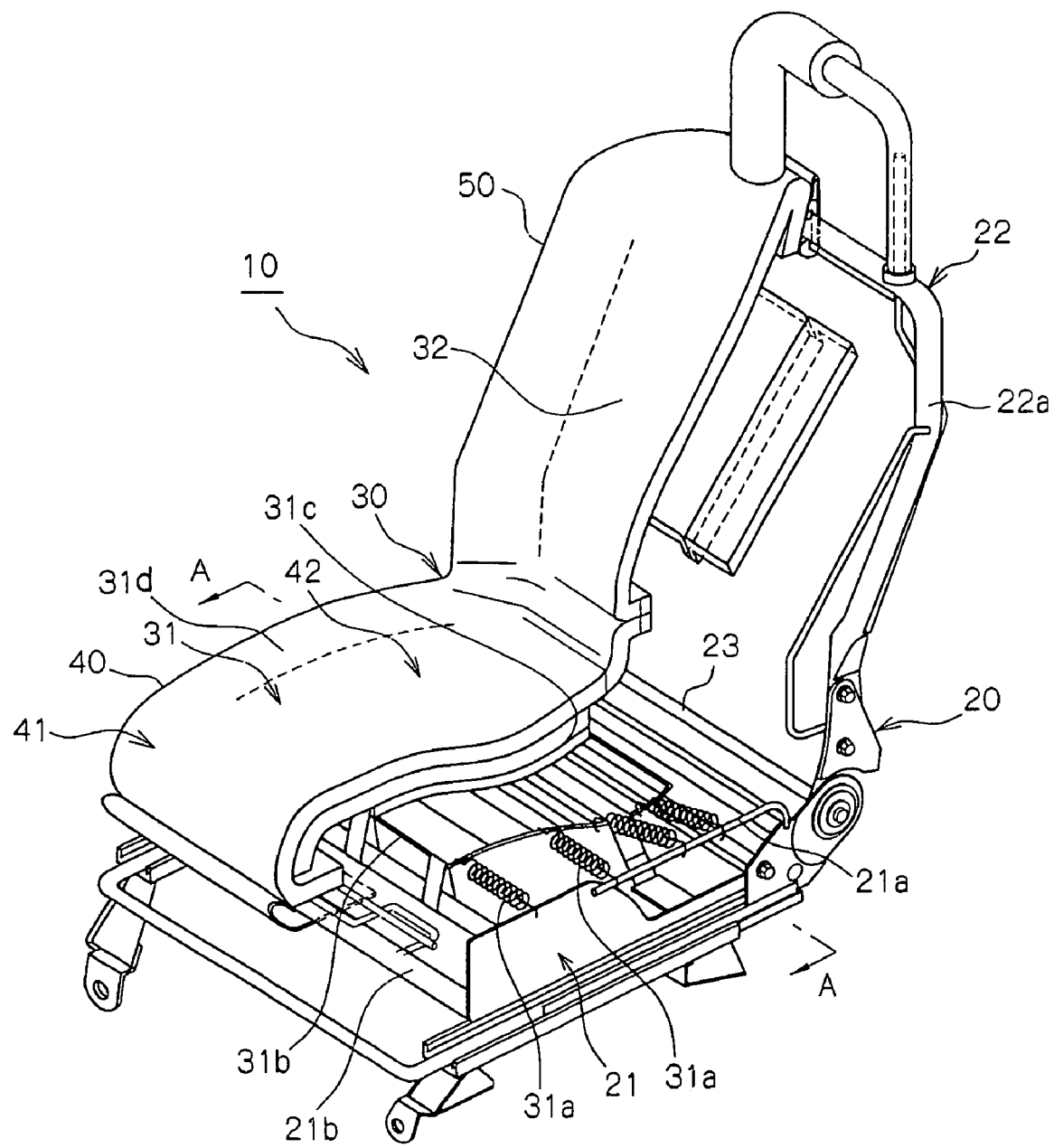
FIG. 1 is a perspective view of a seat, a portion of which is cut away, according to an embodiment of the present invention.

FIG. 1 is a perspective view showing a structure of a seat 10 according to an embodiment of the present invention, in which a portion has been cut away.

As shown in FIG. 1, the seat 10 of the present embodiment comprises a seat frame 20 and a cushion material 30 supported by the seat frame 20. The seat frame 20 further comprises a frame for a seat portion (seat cushion portion) 21 and a frame for a back portion (a seat back portion) 22. A cushion material for a seat portion 31 and a cushion material for a back portion 32 are supported respectively by the frame for the seat portion 21 and the frame for the back portion 22. A seat portion (a cushion portion) 40 of the seat 10 of the present embodiment is supported by the frame for the seat portion 21 and the cushion material for the seat portion 31. A back portion (seat back portion) 50 of the seat 10 is formed by the frame for the back portion (seat back portion) 22 and the cushion material for the back portion 32.

Further, in the present embodiment, the frame for the back portion 22 can rotate forward and backward in relation to the frame for the seat portion 21 around a supporting shaft 23, and a reclining mechanism is thereby formed.

Figure 2:
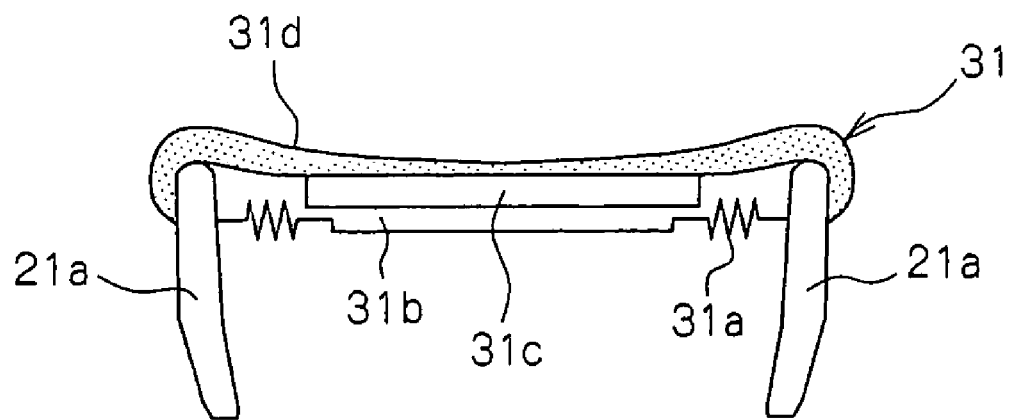
FIG. 2 is a cross-sectional view of the seat cut along the line A-A.

As shown in FIGS. 1 and 2, the cushion material for the seat portion 31 comprises metal springs (coil springs) 31a each having one end supported by a side frame 21a for forming the frame for the seat portion 21, and a mesh structure elastic member 31b elastically supported by the other ends of the respective metal springs 31a. The cushion material for the seat portion 31 further comprises an intermediate elastic member 31c which is laminated on a top surface of the mesh structure elastic member 31b, and an upper elastic member 31b laminated on a top surface of the intermediate elastic member 31c and stretched between a pair of side frames 21a facing one another. In the present embodiment, the intermediate elastic member 31c and the upper elastic member 31d are respectively formed by the three-dimensional knitted fabric. The intermediate elastic member 31c is provided for the purpose of suppressing a sensation of having hit the bottom felt when using only the upper elastic member 31d, and for mitigating a foreign matter sensation caused by the mesh structure elastic member 31b and the metal spring 31a. Of course, it is possible to use the upper elastic member 31d in a single layer without folding the three-dimensional knitted fabric. However, as shown in FIG. 1, the foreign matter sensation caused by the metal springs 31a and the like can further be mitigated by folding the three-dimensional knitted fabric at both sides of the side frame 21a.

Depending on the thickness of the three-dimensional knitted fabric as the upper elastic member 31d, there are of course cases when the intermediate elastic member 31c need not be provided. Further, as the mesh structure elastic member 31b, Plumaflex (product name) or contour mat (product name) can be used. However, instead of the mesh structure elastic member 31b, a sheet structure elastic member can be used. The sheet structure elastic member is formed by a two-dimensional or a three-dimensional fabric or knitted fabric structured by threads having a spring constant which imparts high linearity. If the sheet structure elastic member or the mesh structure elastic member can independently impart elasticity equivalent to that in the present embodiment in which the metal springs 31a are used, the metal springs need not be used, and the mesh structure elastic member or the sheet structure elastic member can be connected directly to the side frame 21a.

As shown in FIG. 1, only the upper elastic member 31d which is formed by the three-dimensional knitted fabric is disposed by being stretched and supported by the side frames 21a and a front end frame 21b in the vicinity of a front edge portion 41 of the seat portion 40 (at a position of 350 mm from the seat surface rear end) of the present embodiment, and accordingly, no other elastic member (i.e., lower elastic member) such as the mesh structure elastic member 31b or the like for structuring the cushion material for the seat portion 31 is provided. In other words, a lower elastic member comprising the mesh structure elastic member 31b or the metal springs (coil springs) 31a is disposed between the vicinity of a tuber ishiadicum bottom portion and the front edge portion 41 of the seat portion, which is a region that excludes the vicinity of the front edge portion 41 and a rearward-direction portion from the vicinity of a tuber ishiadicum bottom portion.

When an occupant is seated, a region of a seat portion corresponding to the vicinity of a tuber ishiadicum bottom portion of a seated occupant (a predetermined region including the seat portion, which a tuber ishiadicum bottom portion of a seated occupant contacts) has a lower elastic member beneath the three-dimensional knitted fabric, and is positioned at a region in the vicinity of a border between the region including the lower elastic member and the region excluding the lower elastic member. Accordingly, the three-dimensional knitted fabric is structured such that the region where the lower elastic member has been removed (where only the three-dimensional knitted fabric exists) and the region where both the three-dimensional knitted fabric and the lower elastic member co-exist react with one another, and the three-dimensional knitted fabric has an elastic compliance substantially equivalent to that of a portion of an occupant's body contacting the cushion material.

A lower elastic member such as the mesh structure elastic member 31b does not exist in the vicinity under the front edge portion 41 of the seat portion. Accordingly, when an occupant is seated on the seat, a spring constant of the front edge portion 41 when a reaction force is applied to an extending side of the seat portion (i.e., a reaction force in a pressing direction along the thighs of a seated occupant) is smaller than that of the other region in which the lower elastic member such as the mesh structure elastic member 31b exist). In other words, the vicinity of the front edge portion 41 imparts a greater elastic compliance when a reaction force is applied to the extending side of the seat portion, and tends to operate as a damping element. Consequently, a reaction force pressing rear sides of the thighs of a seated occupant becomes smaller preventing the impeding of blood flow into the thighs, and when the cushion material is used for a vehicle seat, it is possible to facilitate a smooth pedal operation.

The elastic compliance of the vicinity of the front edge portion 41 is larger than that of a remaining region of the seat portion, and accordingly, is larger than that of a human body portion pressing the vicinity of the front edge portion 41 of the seat portion.

A region 42 of the seat portion which the vicinity of a pelvis front portion of the seat occupant contacts, between the seat portion which the vicinity of a tuber ishiadicum bottom portion of a seated occupant contacts, and a front edge portion of a seat portion (at a position of 100 mm in front of a tuber ishiadicum bottom portion) is positioned at a substantially central portion (including the central portion and a portion for-ward from the central portion) of a region of the seat portion. Namely, the region of the seat portion including the region 42 beneath the three-dimensional knitted fabric, has a lower elastic member such as the mesh structure elastic member 31b which imparts a substantially linear elastic compliance characteristic when an occupant is seated on the seat. For this reason, when a reaction force is applied to an extending side of the cushion material, the region 42 of the seat portion which the vicinity of a pelvis front portion of a seated occupant contacts, imparts an elastic compliance less than that of a human body portion contacting the cushion material, and deforms with a higher linearity than that of the seat portion which the vicinity of a tuber ishiadicum portion of a seated occupant and a region rearward therefrom contact. Accordingly, a spring characteristic of the region 42 of the seat portion which the vicinity of a pelvis front portion of a seat occupant contacts becomes greater, and the ishium portion of a human body positioned rearward of the vicinity of a pelvis front portion can largely sink into the seat cushion without stretching the three-dimensional knitted fabric itself at a large seat angle (angle of a seat cushion in relation to a normal line). Accordingly, rotation of the seat portion which an ishium portion of a seated occupant contacts is prevented, and stability of seating posture can be improved.

More specifically, a lower elastic member such as the mesh structure elastic member 31b is disposed within a range of 100 to 300 mm forward from the seating surface rear end of the seat portion so as to impart to a considerable extent high linear elastic compliance to the region 42 of the seat portion which a pelvis front portion of a seated occupant contacts, by adjustments of size, shape, attachment angle, and attachment position.

A driver needs to stabilize a seating posture in order to drive a car. Therefore, when a seating angle is increased, a load outputted from the buttocks (ishium) to a waist portion generally becomes larger. In the seat of the present embodiment, the three-dimensional knitted fabric (net) need not be tensely stretched to increase the seating angle. By removing a lower elastic member such as a mesh structure elastic member or the metal spring from the seat portion which a tuber ishiadicum bottom portion of a seated occupant contacts, and a rearward-direction portion therefrom, a reaction force applied to the seat portion which the ishium contacts is made smaller than that applied to the seat portion which a pelvis front portion contacts. Consequently, when an occupant is seated on the seat, an ishium of a seated occupant can sink in more deeply, producing a similar effect to a case when a large seating angle is formed.

Namely, in the present embodiment, the cushion material is formed by using a three-dimensional knitted fabric which has a spring characteristic approximate to that of a muscle portion of a human body and a lower elastic member which is smaller than the three-dimensional knitted fabric and whose elastic compliance characteristic is substantially linear. The three-dimensional knitted fabric is stretched across the seat frame and is mounted on the lower elastic member. An elastic compliance of a region (second region) at which the lower elastic member beneath the three-dimensional knitted fabric is greater than that of a human body portion contacting the seat. An elastic compliance of a region at which the lower elastic member exists beneath the three-dimensional knitted fabric, i.e., a region (first region) which is disposed near a border between the region including the lower elastic member and the region excluding the lower elastic member, beneath the three dimensional knitted fabric is substantially equivalent to that of a human body portion contacting the cushion material. Accordingly, an elastic compliance of a region including the lower elastic member beneath the three-dimensional knitted fabric, i.e., a region between the first region and the second region is less than that of a human body portion contacting the seat.

The lower elastic member is preferably positioned at a region of the seat portion which both a tuber ishiadicum bottom portion of an occupant and a forward-direction portion therefrom contact, a region excluding the front edge portion of the seat portion which the thighs of a human body (seated occupant) contact.

The cushion material for the back portion 32 is formed by a three-dimensional knitted fabric and is stretched between the side frames 22a of the frame for the back portion 22. In this way, the cushion material for the back portion 32 is structured only by the three-dimensional knitted fabric, imparts a small restoring force, and has a large damping characteristic. For this reason, the cushion material for the back portion 32 is easily deformed in order to follow changes in the posture of a seated occupant. A lower portion of the three-dimensional knitted fabric for forming the cushion material for the back portion 32 and a rear portion of the three-dimensional knitted fabric for structuring the upper elastic member 31d of the cushion material for the seat portion 31 are sewn together. As a result, a region from the buttocks to a waist portion of a seated occupant, which is where a great load is applied when an occupant is seated, is supported in a hammock-like manner such that a body of a seated occupant is raised up from buttocks to the waist portion. In this way, the foreign matter sensation arising from various frame members, arranged in a rearward-direction from the region of the buttocks to the waist portion, can be mitigated, it becomes easier for the seat to follow changes in the posture of a seated occupant, and the sensation of sitting can be improved.

Thus, a vibration model at 2 degrees of freedom having a dynamic vibration absorption effect is formed by a mass of thighs and an elastic compliance of the three-dimensional knitted fabric under the thighs of a seated occupant. The vibration model at 2 degrees of freedom, vibration due to the mass of thighs and the vibration of the three dimensional knitted fabric under the thighs can reduce a vibration characteristic gain of a main vibration within a range of 4 to 6 Hz equivalent to a spring constant of a lower elastic member provided beneath the three-dimensional knitted fabric which a tuber ishiadicum bottom portion of a seated occupant contacts, and which has an elastic compliance smaller than that of the three-dimensional knitted fabric.

Figure 3:
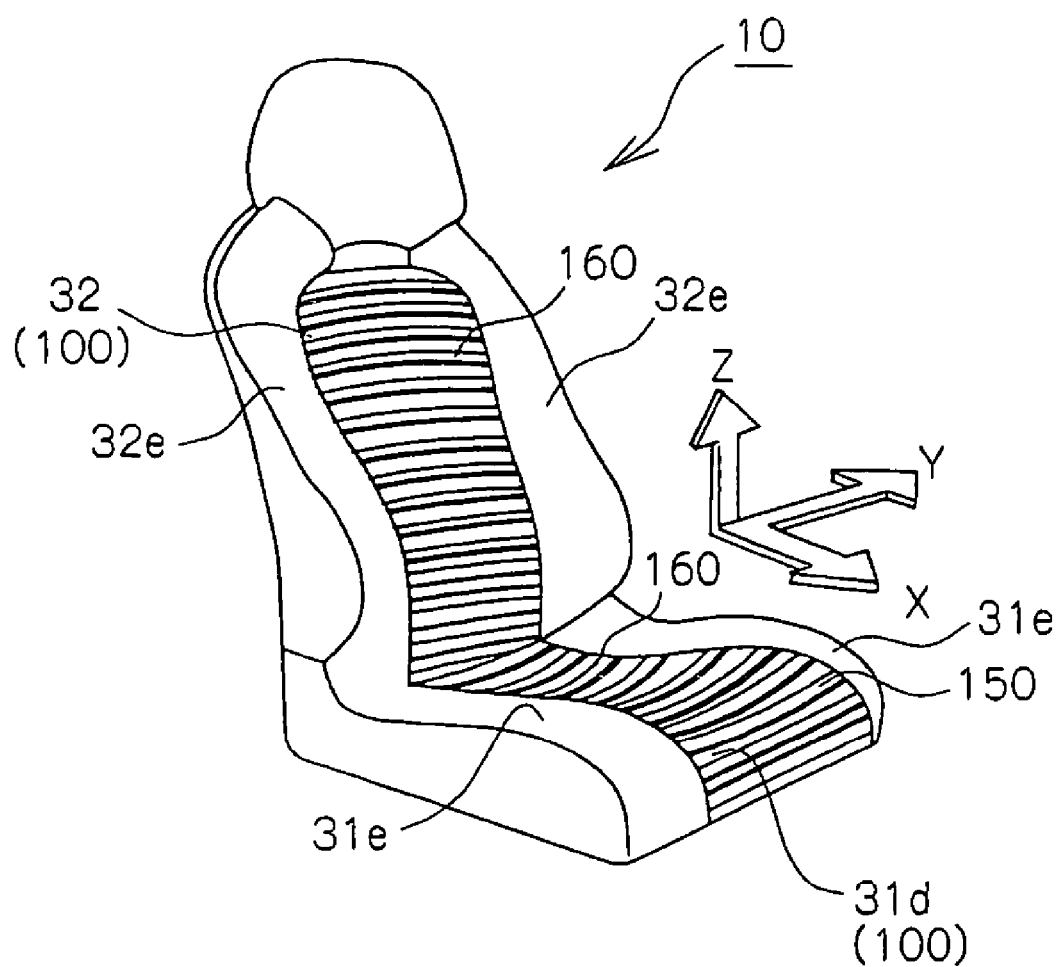
FIG. 3 is a perspective view of another stretching state of a three-dimensional knitted fabric for constituting an upper elastic member and a cushion material for a back portion.

As shown in FIG. 3, both side portions of the upper elastic member 31d formed by the three-dimensional knitted fabric of the cushion material for the seat portion 31, and the cushion material for the back portion 32 which is also formed by the three-dimensional knitted fabric are respectively sewn together with fabric materials 31e and 32de such as felts, and the fabrics 31e and 32e can be stretched so as to cover the side frames 21a and 22a. Accordingly, elongation of the three-dimensional knitted fabric in a transverse direction (left-light direction of the side frame) is suppressed, and elongation of the three-dimensional knitted fabric in a front-back direction becomes larger. Accordingly, holding performance can be improved, and stability when an occupant is seated can be improved. A description of these effects will be made later.

Thus, the cushion material for the seat portion 31 and the cushion material for the back portion 32 provided as described above are set so as to form a tendency substantially equivalent to the elastic compliance of a human body portion contacting the cushion material. However, such characteristics are achieved by using the three-dimensional knitted fabric. The three-dimensional knitted fabric is formed by a pair of ground knit fabrics which are disposed so as to be separated from one another and then joined together by connecting threads, and is structured to support a load applied thereto by deformation of a mesh which forms each of the ground knit fabrics, deformation (collapsing or buckling) of the connecting threads, and a restoring force of the adjacent connecting threads which imparts a spring characteristic to the deformed connecting threads. Accordingly, when an area of contact between an occupant and the cushion material is large, due to a large reaction force imparted by a large number of the connecting threads corresponding to the area, a large surface stiffness is exerted. On the other hand, when a partial load is applied to the seat portion as in a case in which the thighs of the seat occupant contacts the seat portion, namely, when an area of contact between a seated occupant and the cushion material is small, the number of the connecting threads within the area of contact is small, and the restoring force imparted by the connecting threads, which support one another and prevent mutual deformation (collapsing or buckling) of the connecting threads, is diminished. Consequently, the elastic compliance of the three-dimensional knitted fabric, as its own elastic compliance characteristic, is substantially approximate to that of a human body portion contacting a seat portion, and has a fluctuation characteristic in which an initial flexure amount is substantial, hysteresis is experienced and accordingly, restoration insufficient.

As shown in FIGS. 1 and 2, a seat having such an elastic compliance as described above has a specific structure in which one of the ends of the coil springs 31a is supported by the side frames 21a for structuring the frame 21 for the seat portion of the cushion material 31, and the mesh structure elastic member 31b formed by a contour mat or the like is supported by the other ends of the coil springs 31a. Then, as the intermediate plastic member 31c, viscous urethane having a thickness of 10 mm, for example, is mounted on the mesh structure elastic member 31b, and urethane slub is further laminated thereon. Finally, a conventional three-dimensional knitted fabric having a thickness of 1.3 mm is disposed on this.

Figure 37:
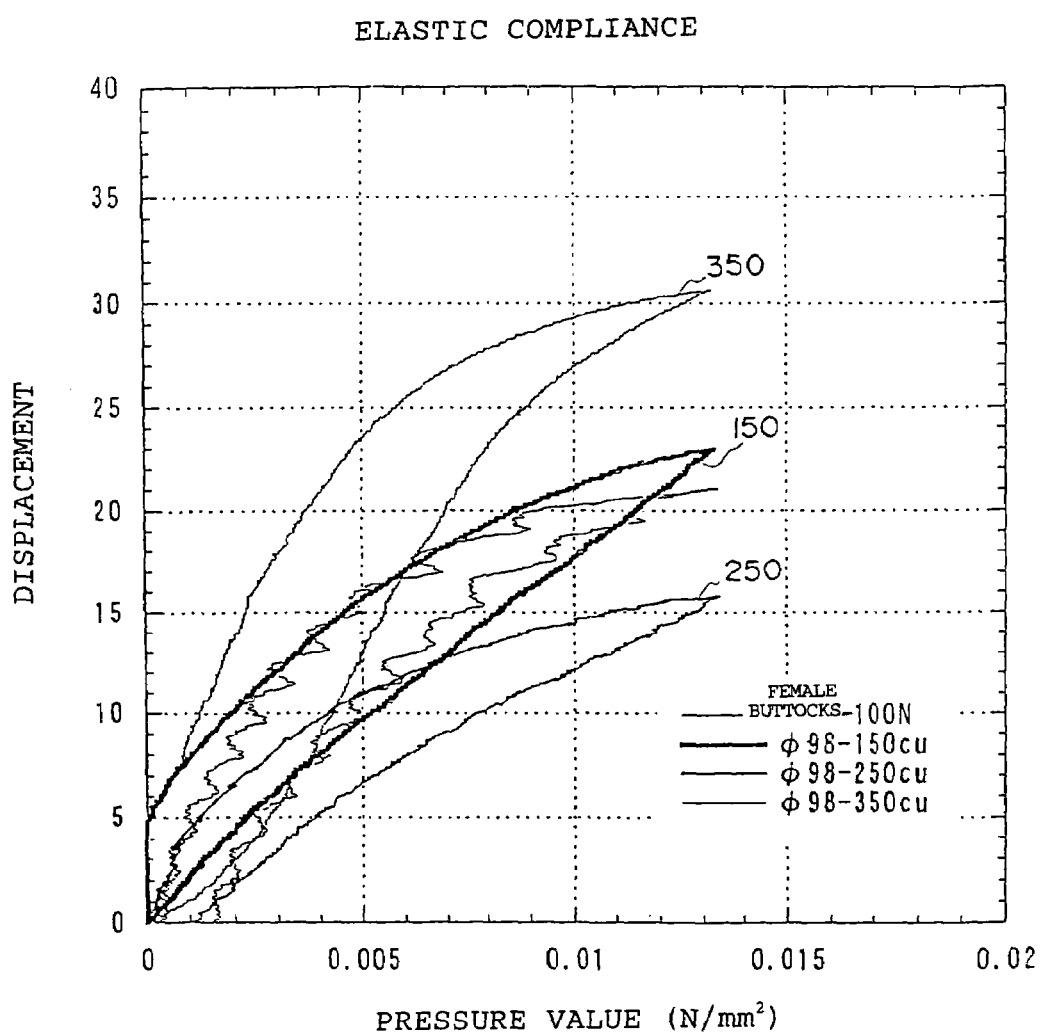
FIG. 37 is a graph illustrating a Lissajous's waveform which is formed by a pressure value from the 98-diameter pressurizing plate and flexure of the cushion material.

FIG. 37 shows a Lissajous's waveform of a relationship between a pressure value applied to the cushion material by using the pressurizing plate having a diameter of 98 mm (hereinafter, 98 mm-diameter pressuring plate), and a flexure amount of the cushion material. As is apparent from this graph, an elastic compliance characteristic of the cushion material at a distance of 150 mm in front of the seat surface rear end (50 mm ahead of the rear end of the lower elastic member) is substantially equivalent to that of a human body. Further, an elastic compliance characteristic of the seat portion (cushion material) at a distance of 250 mm (50 mm to the rear from the front end portion of the lower elastic member of the seat portion which the vicinity of a pelvis front portion of a seat occupant contacts) is less than that of a human body.

In this seat, three regions comprising a large elastic compliance, a medium elastic compliance and a small elastic compliance are distributed in that order from the vicinity of a front edge portion of a seat portion to the seat surface rear end. A region of a large elastic compliance corresponds to the vicinity of a front edge portion of the seat, a region of small elastic compliance corresponds to the vicinity of a pelvis front portion, and a region of medium elastic compliance corresponds to the vicinity of a tuber ishiadicum bottom portion.

Figure 4:
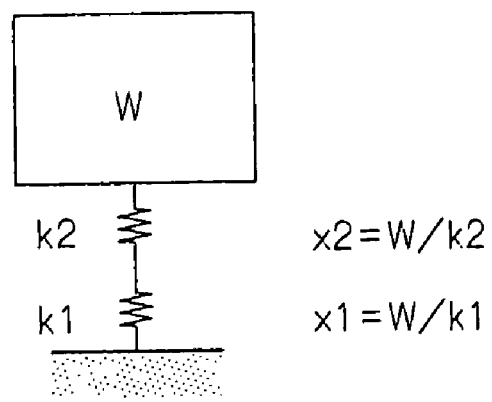
FIG. 4 is a view of a simple model of the cushion material for explaining an operation of a load applied to the cushion material.

Since the three-dimensional knitted fabric operates as described above, the cushion material for the seat portion 31 of the present embodiment is structured such that the upper elastic member 31d which is a member which imparts a spring characteristic substantially equivalent to a characteristic of a muscle portion of a human body is disposed on the aforementioned mesh structure elastic member 31b or the like which has a spring constant whose linearity is high in relation to the deformation of the cushion material. Accordingly, if a spring force having high linearity such as the mesh structure elastic member 31b and a weight of an occupant (vehicle occupant) are in equilibrium, when an external vibration is applied to a seated occupant from the seat cushion and a backrest (seat cushion for the back portion), a vibration system, which comprises a spring constant of the seat cushion and a mass of a human body, causes a vertical oscillation to a human body. The positioning energy due to flexure of spring when the weight of an occupant and a spring force of the mesh structure elastic member 31b of the cushion or the upper elastic member 31d which is formed by the three-dimensional knitted fabric are in equilibrium is converted into a kinetic energy through a vibration of the mass of a human body when an external force is applied to a human body. The kinetic energy acts on the cushion material in an anti-gravity direction, causes acceleration, and thereby mitigates gravity acceleration. Accordingly, the load applied to the cushion material is distributed. Consequently, flexure restoration of the upper elastic member 31d which is formed by the three-dimensional knitted fabric, which has a smaller spring constant than that of the mesh structure elastic member 31b, becomes larger than that of the mesh structure elastic member 31b. Namely, since the three-dimensional knitted fabric whose spring constant is substantially equivalent to that of a muscle portion of an occupant reacts in relation to vibration, a muscle portion hardly flex, and vibration stimulus applied to a human body is minimized (see FIG. 4).

As a result, the seat using the three-dimensional knitted fabric of the present embodiment can exhibit two spring characteristics comprising a spring characteristic which has high linearity in relation to deformation (elastic compliance characteristic with high linearity), and a soft spring characteristic that is substantially equivalent to that of a muscle portion of a human body (in particular, a muscle portion of the buttocks) and accordingly, imparts a considerable effect in alleviating vibration characteristics at a high frequency band.

As described above, the three-dimensional knitted fabric is formed by joining the pair of the ground knit fabrics disposed so as to be separated from one another, with the connecting threads. Accordingly, the three-dimensional knitted fabric tends to exhibit a spring constant characteristic which is substantially equivalent to that of a muscle portion by adjusting any one element or by combining two elements or more of a group of elements comprising: a connecting thread arrangement density, a connecting thread thickness, a connecting thread length, a connecting thread material, a ground knit fabric mesh shape, a ground knit fabric mesh size, a ground thread material for structuring the ground knit fabric, and a mesh tightness at the connecting portion of the connecting thread and the ground knit fabric.

Therefore, by using the three-dimensional knitted fabric together with a lower elastic member such as a mesh structure elastic member which deforms substantially linearly, it is possible to form a cushion material with a spring constant smaller than that of a muscle portion (elastic compliance larger than that of a muscle portion), and a spring constant greater than that of a muscle portion (elastic compliance smaller than that of a muscle portion).

The three-dimensional knitted fabric is used by being stretched across the seat frame, more specifically, the side frames 21a and 22a. Accordingly, each of the above-described characteristics is imparted in a state in which the three-dimensional knitted fabric is stretched across the seat frame. Further, as in the cushion material for the seat portion 31 of the above-described present embodiment, if a cushion material has the lower elastic members such as the metal springs 31a and the mesh structure elastic member 31b, in addition to the upper elastic member 31d which is formed by the three-dimensional knitted fabric, these characteristics are all measured as characteristics of the entire cushion material for the seat portion 31.

In the above description, an example has been described in which a second region whose elastic compliance is larger than that of a human body portion pressing the cushion material is positioned near a front edge portion of the seat portion, and a first region whose elastic compliance is substantially equivalent to that of an occupant's body portion pressing the cushion material is positioned at the seat portion which the vicinity of a tuber ishiadicum bottom portion of a seated occupant contacts. However, the first region and the second region can be laminated to each other such that the second region is positioned on a top surface layer portion of the seat portion. By laminating the first region and the second region to one another, vibration is transmitted to a human body through a region of the seat portion which has an elastic compliance greater than that of a muscle portion of a human body. Accordingly, vibration stimulus can be mitigated, and riding comfort can be improved.

Further, besides the fact that the first region and the second region can be laminated to one another so that the second region is positioned on a top surface layer, the laminated portion of the first and second regions is positioned at the seat portion which the vicinity of a tuber ishiadicum bottom portion of a seated occupant contacts, and a region, from which the laminated portion has been removed, and which has an elastic compliance larger than that of a human body portion pressing the cushion material is positioned at the front edge portion of the seat portion. Accordingly, vibration stimulus to a human body is mitigated, riding comfort can be improved, and numbness of a muscle portion in the vicinity of a tuber ishiadicum bottom portion and the impeding of blood flow into the thighs of a seated occupant can be prevented.

Embodiments of the Three-Dimensional Knitted Fabric

A description of an embodiment of the three-dimensional knitted fabric 100 used for the upper elastic member 31d of the cushion material for the seat portion 31 and for the cushion material for the back portion 32 according to the above-described embodiment of the present invention will be made hereinafter.

The terms "compressibility and compressive elasticity" used in the following explanation are measured by a test method on the basis of "Compressibility and compressive elasticity" in JASO standard-M404-84. More specifically, a thickness $t_o$ (mm) of each of three sample sheets, which are cut into 50 mm×50 mm, is measured when an initial load of 3.5 g/cm² (0.343 kPa) is applied thereto in a thickness direction of each sample sheet for thirty seconds. Then, a thickness $t_1$ (mm) of each sample sheet is measured when a load of 200 g/cm² (19.6 kPa) is applied thereto and left alone for ten minutes. Next, after sample sheets to which no load is applied are left alone for ten minutes, a thickness $t'_0$ (mm) of each sample sheet is measured when an initial load of 3.5 g/cm² (0.343 kPa) is again applied thereto for thirty seconds. Accordingly, compressibility and compressive elasticity are determined by the following equations, and represented by a mean value of these sample sheets. Further, in respective manufacturing examples to be described later, compressibility and compressive elasticity of the three-dimensional knitted fabrics, which have projections (wale portions) and recesses (portions except for the wale portions), are measured by each of the three-dimensional knitted fabrics being cut into 50 mm×50 mm sheet samples. The compressibility and compressive elasticity of the three-dimensional knitted fabrics obtained are used as data for projections (or wale portions) as a main elastic region. Compressibility of the recesses (or portions other than projections) is measured by cutting into 50 mm×50 mm sample sheet each of the three-dimensional knitted fabrics, which are manufactured in the same manner as the projections except that spacing between the projections (wale portions) is set at 50 mm:

$$\text{Compressibility (\%)} = \{(t_0 - t_1)/t_0\} \times 100 \tag{1}$$

$$\text{Compressive elasticity (\%)} = \{(t'_0 - t_1)/(t_0 - t_1)\} \times 100 \tag{2}$$

First Embodiment

Figure 5:
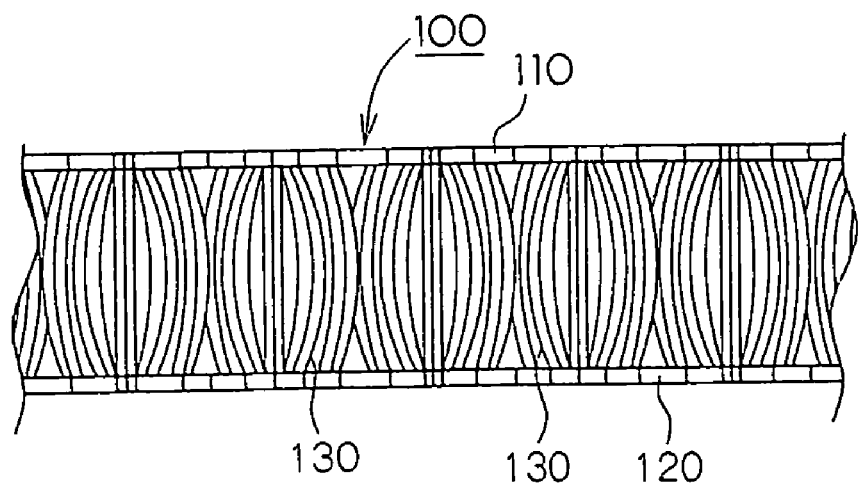
FIG. 5 shows a structure of a three-dimensional knitted fabric of a first embodiment of the present invention according to the present embodiment.

With reference to FIGS. 5 to 8, a description of a first embodiment of the present invention will be made hereinafter. As shown in FIG. 5, this three-dimensional knitted fabric 100 is structured by a three-dimensional structure that comprises a pair of ground knit fabrics 110 and 120 which are disposed so as to be separated from each other, and a large number of connection threads 130 which run back and forth between a pair of the ground knit fabrics 110 and 120 so as to join them together.

Figure 6:
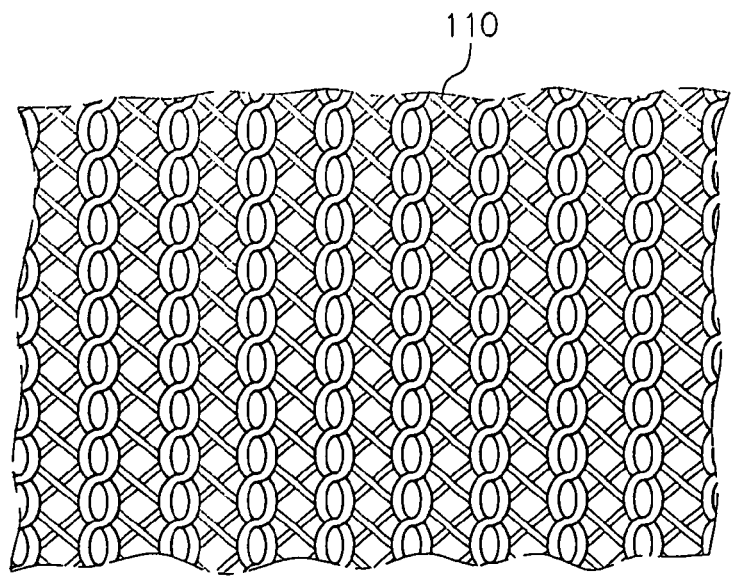
FIG. 6 shows an example of one ground knit fabric.
Figure 7:
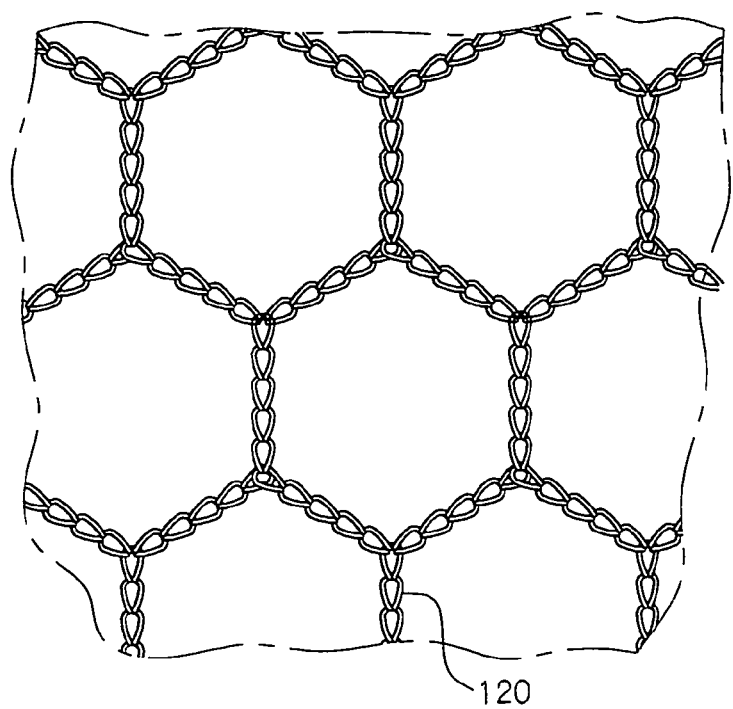
FIG. 7 shows an example of the other ground knit fabric.

As shown in FIG. 6, the first ground knit fabric 110 can be formed, for example, by using a fabric which forms a mesh by a flat knit fabric organization (small cylinders) which uses threads formed by twisting short fibers, and which is continuous in both the wale direction and the course direction. Conversely, as shown in FIG. 7, the other ground knit fabric 120 can be formed into a knit fabric organization whose cylinders are larger than the first ground knit fabric 110, for example, by using a fabric which forms a honeycomb (hexagonal) mesh using threads formed by twisting short fibers. This is merely one example, and knit fabric organizations other than a small stitch knit fabric organization or a honeycomb mesh can be used. The connecting threads 130 are woven in between the pair of ground knit fabrics 110 and 120 so that a predetermined spacing is maintained between the first ground knit fabric 110 and the other ground knit fabric 120. In this way, a predetermined stiffness is imparted to the three-dimensional knitted fabric 100 which is mesh knit.

The three-dimensional knitted fabric 100 can provide the required stiffness, depending on the thickness of the ground threads forming the ground knit fabrics 110, 120, and the like. However, it is preferable that the ground threads be chosen from a range which does not make the knitting difficult. Further, monofilament threads can be used as the ground threads. Multifilament threads or spun threads may be used in consideration of the feel, the softness of the surface tactile sensation, and the like.

Monofilament threads are preferably used as the connecting threads 130, and their thickness is preferably in the range of 167 decitex to 1100 decitex. With multifilament threads, a cushioning ability having a good restoring force cannot be obtained. Moreover, if the thickness is less than 167 decitex, the stiffness of the three-dimensional knitted fabric 100 becomes difficult to achieve. If the thickness exceeds 1100 decitex, the three-dimensional knitted fabric 100 will be too hard and proper cushioning ability cannot be achieved. In other words, by using monofilament threads of 167 decitex to 1100 decitex as the connecting threads 130, the load of an occupant seated on the seat can be supported by the deformation of the meshes forming the ground knit fabrics 110, 120, the deformation caused by the collapsing or buckling of the connecting threads 130, and the restoring forces of the adjacent connecting threads 130 which impart a spring characteristic to the deformed connecting threads 130. A soft structure, which has a soft spring characteristic and in which stress concentration does not occur, can be obtained. Further, as will be described later, when such recesses and projections are formed, spring elements which have substantially arch-shaped cross sections can be formed at the three-dimensional knitted fabric. Thus, a soft spring characteristic can be imparted, and a structure having an elastic compliance equivalent to or greater than that of a muscle portion can easily be formed.

The materials of the ground threads and the connecting threads 130 are not particularly limited. Examples thereof are synthetic fibers and regenerated fibers such as polypropylene, polyester, polyamide, polyacrylonitrile, rayon, and the like, as well as natural fibers such as wool, silk, cotton, and the like. A single type of this material may be used, or plural types thereof may be used together in arbitrary combinations. Preferably, thermoplastic polyester fibers such as polyethylene terephthalate (PET), polybutylene terephthalate (PBT) and the like, and polyolefin fibers such as nylon 6 and the like, and combinations of two or more types of these fibers, are used. Further, polyester fibers are excellent in recyclic performance, which is preferable. Moreover, the thread configurations of the ground threads and the connecting threads 130 are not limited to those described above, and threads having circular cross-sections, threads having differently shaped cross-sections, or the like may be used.

Arrangements (pile organization) of the connecting threads 130 in which the connecting threads 130 join the ground knit fabrics 110, 120 together can be described from a side view position. More specifically, for example, they can be divided into various arrangement types shown in FIGS. 8A to 8E. FIGS. 8A and 8B show straight types of the connecting threads in which the connecting threads 130 are woven substantially upright in between the ground knit fabrics 110, 120. Of these, FIG. 8A shows the connecting threads woven straight so as to form a numerical character "8" shape, and FIG. 8B shows the connecting threads which are simply woven straight. FIGS. 8C to 8E show a cross-type of the connecting threads 130 which are cross-woven in between the ground knit fabrics 110, 120 at the respective intermediate points of the connecting threads 130. Of these figures, FIG. 8C shows the connecting threads 130 which are cross-woven and form a numerical character "8", and FIG. 8D shows the connecting threads 130 which are simply cross-woven. FIG. 8E shows the connecting threads 130 each two of which are double-cross woven. Further, as compared to a case in which the connecting threads 130 are arranged substantially vertically in between the ground knit fabrics 110, 120 (see FIGS. 8A and 8B), as shown in FIGS. 8C to 8E in which the connecting threads 130 are inclined to cross each other, this structure can give soft spring characteristics of higher compressibility while retaining a sufficient reaction force with the buckling strength of the individual connecting threads 130.

Second Embodiment

In a second embodiment of the three-dimensional knitted fabric, the three-dimensional knitted fabric 100 according to the above-mentioned first embodiment is manufactured so as to have recesses and projections in the same manner as a fifth embodiment which will be described later and shown in FIG. 17. And the second embodiment will be explained by using the reference numerals identical to those of FIG. 17. The three-dimensional knitted fabric 100 is manufactured such that a pair of ground knit fabrics 330, 340 are disposed so as to approach to one another in a course direction at a predetermined spacing so that recesses 150 are formed, and projections 160 are formed among the adjacent recesses 150. This can easily provide the three-dimensional knitted fabric with a structure which has a similar tendency to that of a spring constant characteristic (elastic compliance) of a muscle portion of a human body, and a spring constant which is smaller than that of a muscle portion of a human body (an elastic compliance greater than that of a muscle portion of a human body).

Thus, when recesses and projections are formed on the three-dimensional knitted fabric, the second region whose elastic compliance is greater than that of a muscle portion of a human body is formed on a top surface layer portion of the three-dimensional knitted fabric. Under this second region, the first region whose elastic compliance is substantially equivalent to that of a muscle portion of a human body can be formed.

The recesses 150 can be formed from just one of a pair of the ground knit fabrics. However, as shown in FIG. 17, the recesses 150 can also be formed at both sides of the pair of the ground knit fabrics. Examples of means for forming the recesses 150 by causing the ground knit fabrics to approach one another include: welding means, bonding means, as well as suture means by a sewing machine, and joining means by melting molten fibers after interposing them in between the ground knit fabrics. Of these, use of vibration welding means is preferable because it can prevent a region to be welded from becoming rigid, and thereby impart a high bonding strength.

Figure 15:
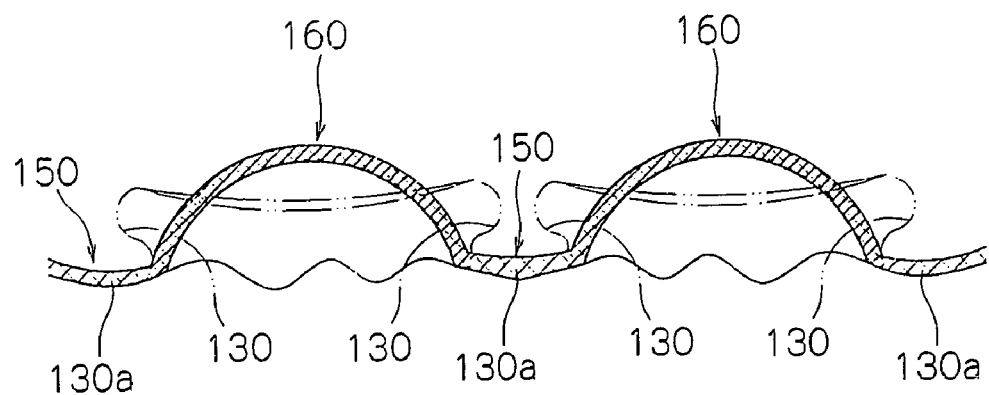
FIG. 15 is a schematic view for explaining an operation of substantially arch-shaped spring elements formed on the three-dimensional knitted fabric shown in FIG. 13.

In this way, by forming the recesses 150 on the three-dimensional knitted fabric, the connecting threads 130, which are arranged within a region at which the recesses 150 are formed, either incline or flex. Further, some of the connecting threads 130 move toward one side, to a region of the projections 160, and the connecting threads 130 adjacent to each other are entangled (chain-crossed) and joined together. In this way, when the connecting threads 130 are entangled and joined together, as schematically shown in FIG. 15, both side portions of the connecting threads 130 between which entangled portions 130a are interposed i.e., projections of the three-dimensional knitted fabric, can respectively function as independent spring characteristics (deforming elements). Accordingly, as schematically shown in FIG. 15, a region extending from another entangled portion 130a in which the connecting threads 130 entangle in another recess 150 to another entangled portion 130a in which the connecting threads 130 entangle in the adjacent recess 150 adjacent to the above-mentioned recess 150, including the ground knit fabrics and the connecting threads 130 which are arranged in this region, is seemingly structured to form both one spring element having a substantially arch-shaped cross section and a damping element due to friction between the connections threads 130.

For this reason, in the three-dimensional knitted fabric having recesses and projections, elasticity of the recesses 150 and the projections 160 are different from each other. When the projections 160 are compressively deformed upon receiving a load, as compared to the case in which the three-dimensional knitted fabric 100 on which recesses and projections are not formed, buckling strength becomes relatively lower, and a buckling characteristic is not easily exhibited. Therefore, as shown by an imaginary line in FIG. 15, elastic function of the spring element having a substantially arch-shaped cross section in a bending direction relatively becomes larger. Namely, as compared to the three-dimensional knitted fabric which is formed under the same conditions except that recesses and projections are not formed, a spring characteristic of the projections 160 has a spring constant which becomes smaller (elastic compliance becomes larger), and at the beginning, a very small load region becomes deformable, so that a buckling characteristic is not easily exhibited.

In the second embodiment of the present invention, as described above, the connecting threads 130 are entangled and joined together in the recesses 150 so that elasticity, which extends and contracts in a direction substantially orthogonal to a line on which the recesses 150 are formed, is imparted to the three-dimensional knitted fabric. Thus, when the three-dimensional knitted fabric is stretched between the seat frame, a spring performance which is imparted in a thickness direction by the spring elements which have substantially arch-shaped cross sections, and elasticity (spring performance) imparted in a planar direction substantially orthogonal to the thickness direction, thus contributing to a decrease in spring constant, and an increase in elastic compliance.

It is preferable to stretch the three-dimensional knitted fabric 100 of the second embodiment of the present invention across the seat frame at an elongation rate of 5% or less so as to sufficiently exhibit the above-described characteristics. Further, as described above, in order for the three-dimensional knitted fabric 100 to sufficiently impart such characteristics as described above to the seat portion corresponding to the vicinity of a tuber ishiadicum bottom portion of a seated occupant and rear-ward therefrom, and impart spring performance having high linearity due to the mesh structure elastic member 31b or the like to the region 42 corresponding to the vicinity of a pelvis front portion of an occupant, it is more preferable to stretch the three-dimensional knitted fabric across the seat frame such that the three-dimensional knitted fabric is slackened by leaving an extra width of 5 to 60 mm of the seat frame, preferably, at a distance of 15 to 35 mm from the seat surface rear end to the vicinity of a tuber ishiadicum bottom portion, i.e., at a distance of 100 to 150 mm from the seat surface rear end, and by leaving an extra width which is infinitely close to zero, from the region 42 of the seat portion which corresponds to the vicinity of a pelvis front portion of an occupant at a distance of about 200 to 300 mm from the seat surface rear end.

As shown in FIG. 3, at least at the seat portion, it is preferable that the three-dimensional knitted fabric is stretched such that a longitudinal direction of the projections 160 (the recesses 150) corresponds to a left-right (transverse) direction (Y direction) of the seat. Namely, by stretching the three-dimensional knitted fabric like this, due to elasticity which is caused in a planar direction which is substantially orthogonal to the longitudinal direction of the projections 160, the three-dimensional knitted fabric is likely to elongate in a front-back direction (X direction) of the seat. Accordingly, a shearing force which is applied to the longitudinal direction of the seat becomes greater than that to the left-right direction of the seat, and a seating angle when an occupant is seated on the seat becomes larger, whereby slidability of buttocks in a frontward direction of the seat can be inhibited and can improve the ability of the cushion material to follow the change of posture. Accordingly, when the three-dimensional knitted fabric is used for a driver's seat, stability of driving posture can be improved, and fatigue, affecting to a driver due to a driving for a long period, can be reduced. Further, as shown in FIG. 3, when the three-dimensional knitted fabric for the back portion is stretched in the same manner as in the seat portion such that the longitudinal direction of the projections 160 corresponds to the left-right direction of the back portion. Accordingly, the three-dimensional knitted fabric is likely to elongate in a vertical direction (Z direction) of the back portion, thus helping the seat portion to flex, and further enabling the cushion material to follow a change of posture.

In the above description, an example in which a plurality of projections of the three-dimensional knitted fabric is arranged in parallel. However, the projections 160 of the three-dimensional knitted fabric can be arranged in a lattice form shown in FIG. 38A or in a staggered form shown in FIG. 38B. Also in this case, for the same reasons as described above, it is preferable to stretch the three-dimensional knitted fabric across the seat frame such that, at least at the seat portion, and more preferably, at both the seat portion and the back portion, projections arranged in a lattice form or in a staggered form and which have a larger dimension or a higher arrangement density, correspond to a transverse direction (Y direction) of the seat.

Figure 16:
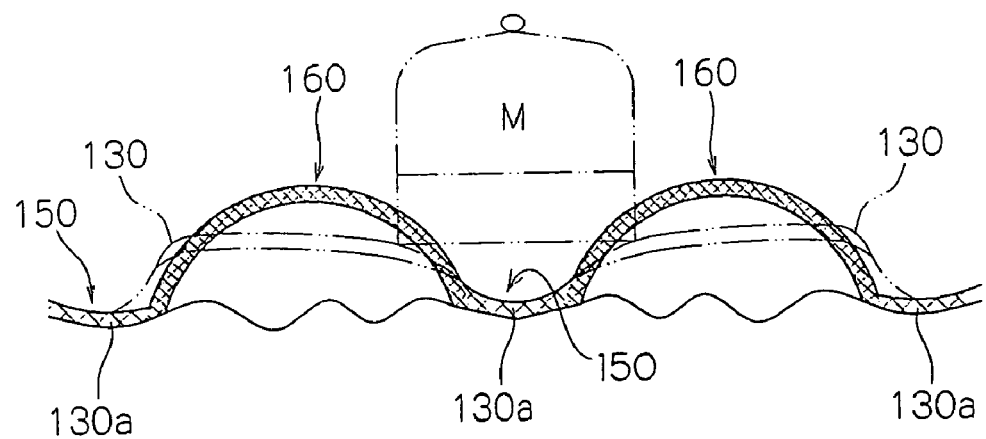
FIG. 16 is a schematic view for explaining an operation of substantially arch-shaped spring elements formed on the three-dimensional knitted fabric shown in FIG. 13.

As shown in FIG. 16, at the time when the three-dimensional knitted fabric 100 structured as described above contacts a region disturbed by human bones and represented by a mass M (substantially equivalent to a pressurizing plate having a diameter of 30 mm), the projections 160 between which the recesses 150 are interposed are recessed and deformed so as to seemingly escape outwardly, and cause partial fatigue. Namely, the projections deform in directions separating from one another. Thereafter, when an additional load is applied to a large area of the three-dimensional knitted fabric, the load is supported by the entire three-dimensional knitted fabric. However, by having such recesses and projections, the three-dimensional knitted fabric deforms as shown in FIG. 16, whereby a sensation of fitting can be enhanced within a narrow displacement region.

The projections 160 correspond to a region having a large compressibility which functions as a main elastic region whose surface stiffness is low, and which mainly exhibits a restoring force in response to compressive deformation. The recesses 150 correspond to a region which exhibits only slight elasticity in the thickness direction, has a small compressibility, and has a high surface stiffness. Further, the surface stiffness is determined by the degree of vertical deflection (thickness direction) and transverse direction (shear direction) of the three-dimensional knitted fabric. A portion having large compressibility is easily offset in both directions, and a portion having small compressibility does not deflect easily. Accordingly, the portion having large compressibility tends to have a low surface stiffness, and a portion having small compressibility tends to have high surface stiffness.

The projections 160 for forming the main elastic region are structured as described above. Accordingly, white the projections 160 impart large compressibility, they also impart the required restoring force. When the three-dimensional knitted fabric having the projections 160 are stretched between the seat frame and used as a cushion material, it becomes possible to impart a spring constant characteristic close to that of a muscle portion of the buttocks. Namely, as an elastic compliance characteristic which is caused when an occupant is seated on the seat, and a reaction force is imparted from the elongated side of the seated portion, and projections having greater elastic compliance than that of a human body portion contacting the seat cushion, and recesses having elastic compliance which is substantially equivalent to that of a human body portion contacting the seat cushion can be formed.

Thus, it is possible to prevent deformation of a muscle portion of the buttocks when an occupant is seated on the seat, and also to reduce a spring characteristic of the skin and a muscle portion of a human body, which can be a damping element in a vibration region of 6 Hz or more, especially 10 Hz or more.

In order for the three-dimensional knitted fabric 100 to impart the above-described characteristics, it is preferable that compressibility of the projections 160 as a main elastic region is from 20 to 90%, and compressive elasticity thereof be set within a range of 75 to 100%. In the second embodiment of the present invention, it is preferable that compressibility of projections other than the projections for forming the main elastic region (the remaining projections) be set such that a difference of compressibility between the recesses 150 and the projections 160 is 5% or more.

Third Embodiment

With reference to FIGS. 9 to 12, a third embodiment of the present invention will be explained, hereinafter. A three-dimensional knitted fabric 210 is structured by a pair of ground knit fabrics 220 and 230, and the connection threads 130.

Figure 9:
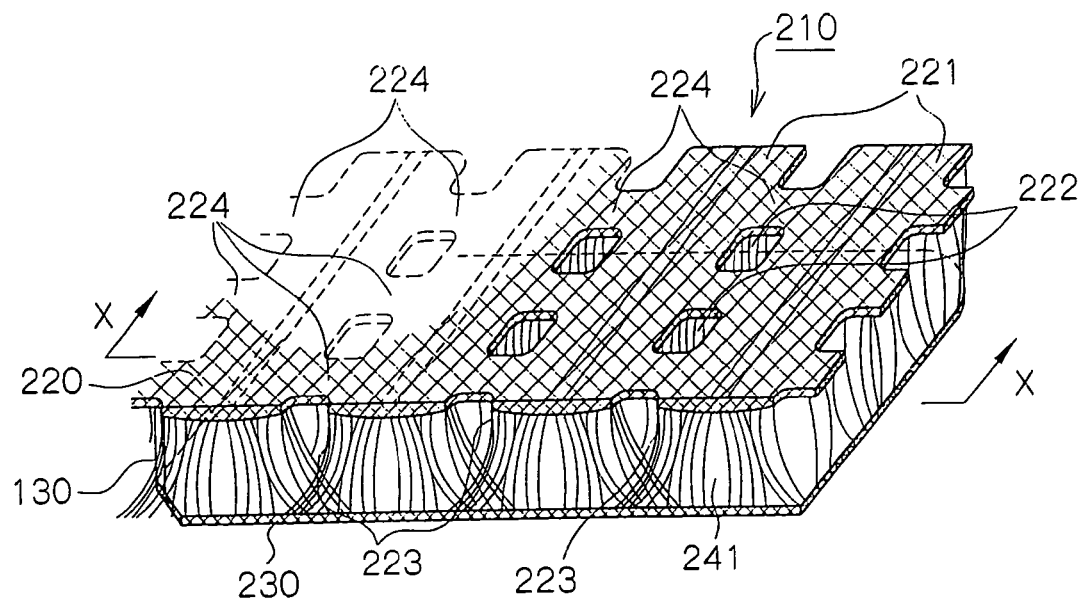
FIG. 9 is a perspective view of a structure of a third embodiment of the three-dimensional knitted fabric according to the present embodiment.
Figure 10:
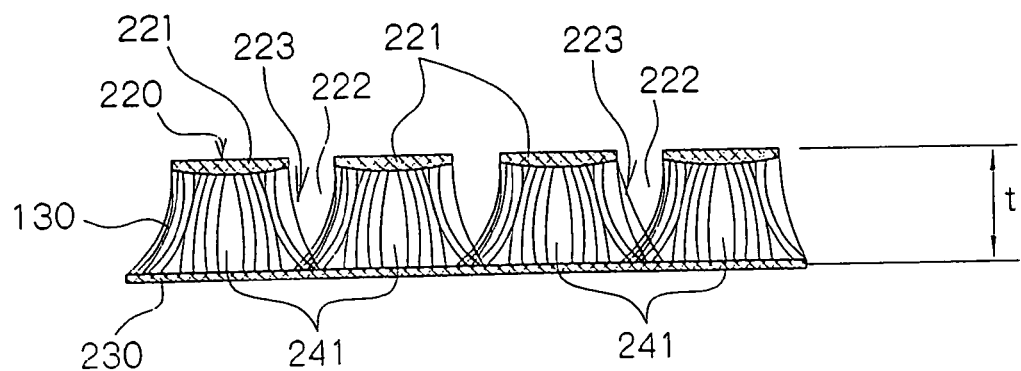
FIG. 10 is a cross-sectional view of FIG. 9.
Figure 11:
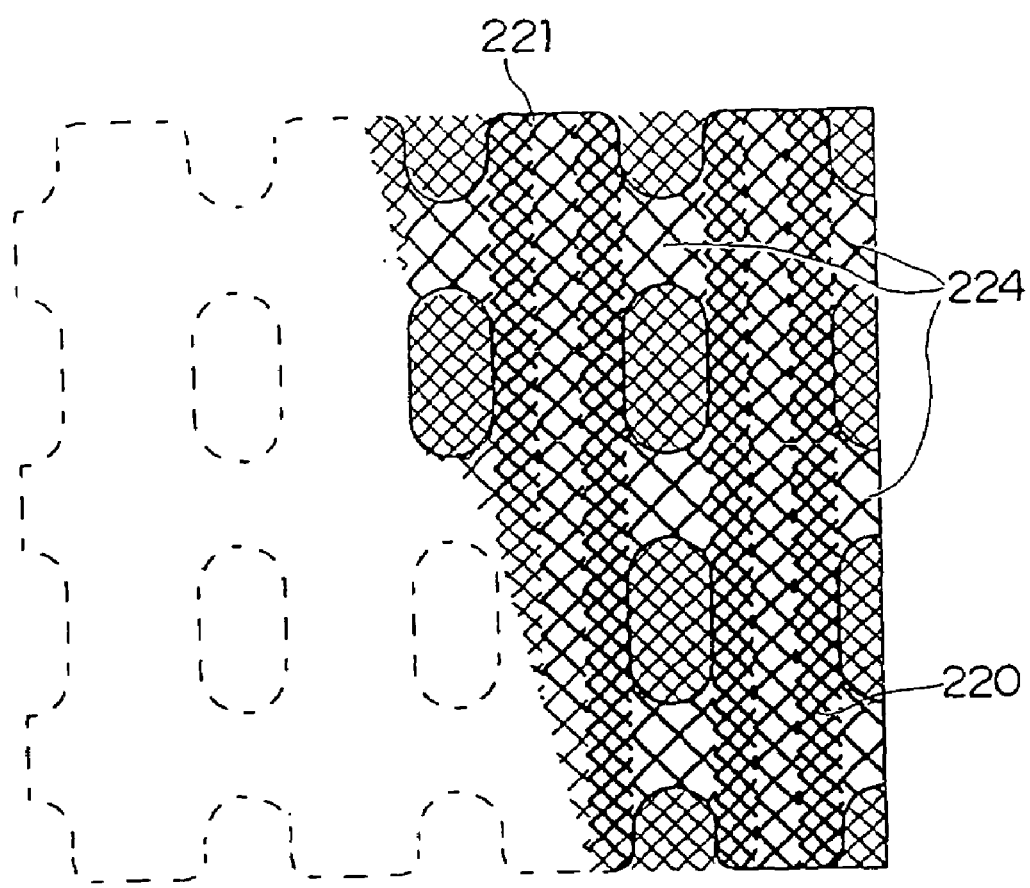
FIG. 11 is a plan view of FIG. 9.

A pair of the ground knit fabrics 220 and 230 is disposed so as to be separated from one another, and the connecting threads 130 are provided so as to run back and forth between the pair of the ground knit fabrics 220 and 230. The first ground knit fabric 220, as shown in FIG. 9, is continuously woven meshes, extends in a wale direction, and has strip-shaped fabric portions 221 which are separated from each other by one or plural wales. As a result, cylinders 222 are formed among the adjacent strip-shaped fabric portions 221, and as shown in FIG. 10, the respective strip-shaped fabric portions 221, and the connection threads 130 arranged in a region between the strip-shaped fabric portions and the other ground knit fabric 220 constitute a part of wale portions 232 which act as projections. The strip-shaped fabric portions 221 for forming the respective wale portions 232 can be provided independently. However, in order to improve a restoring force of the connecting threads 130, it is preferable that communication portions 224, which link the adjacent strip-shaped fabric portions 221 so as to be cross-linked with one another, are provided at a predetermined spacing of one or several courses in a wale direction. FIGS. 9 and 11 show a state in which the adjacent strip-shaped fabric portions 221 are linked to one another by the communicating portions 224.

Figure 12:
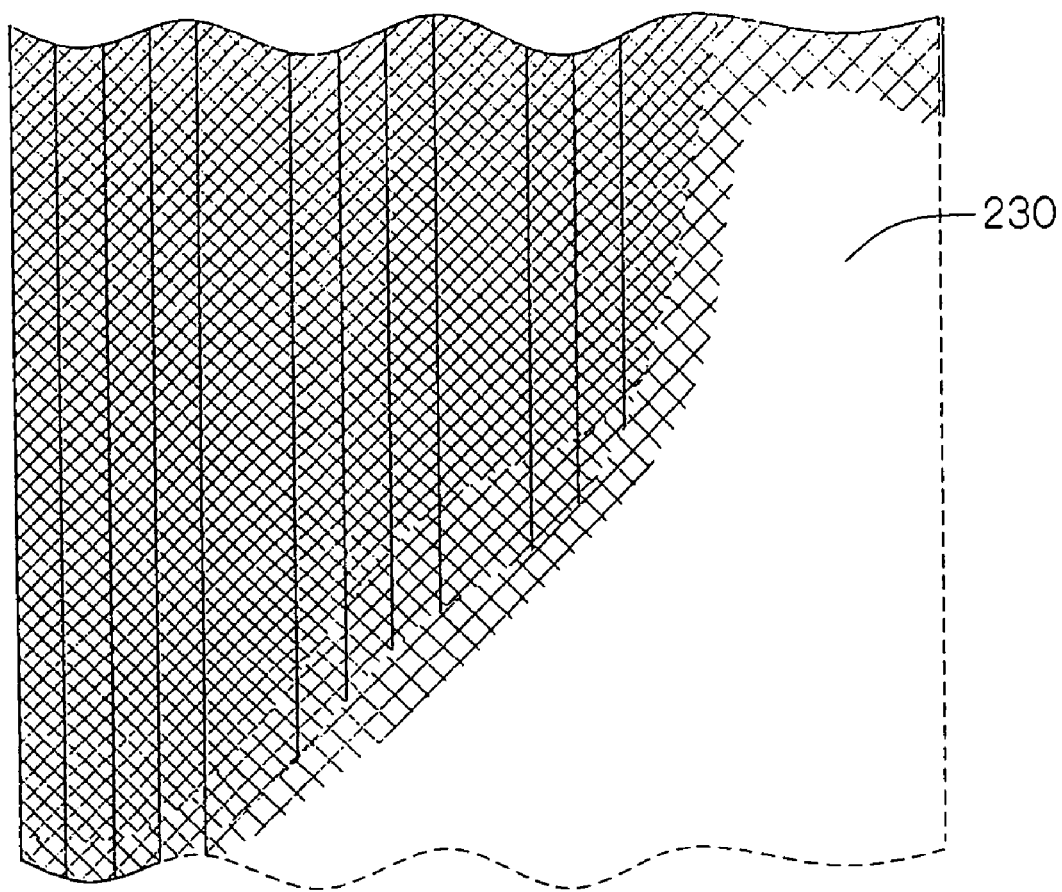
FIG. 12 is a view of an example of one ground knit fabric of the third embodiment.

The communicating portions 224 are not necessarily arranged in lattice-form, and instead, can be arranged in a staggered-form or any other irregular form. On the other hand, as shown in FIG. 12, the other ground knit fabric 230 can be formed, for example, by a flat knit fabric organization which is continuous both in a wale direction and a course direction. However, a knitting organization of the ground knit fabrics 220 and 230 is not limited to that shown in this figure. For example, a through hole organization such as a mesh or a tricot can be employed.

The connecting threads 130 are arranged so as to run back and forth between the ground knit fabrics 220 and 230 facing each other. More specifically, a portion of the connecting threads 130 is arranged between the strip-shaped fabric portions 221 and the ground knit fabric 230. Further, as shown in FIG. 10, a portion of the connecting threads 130 which are connected to one of the strip-shaped fabric portions 221 is connected to the ground knit fabric 230 at a region of the ground knit fabric 230 which front-faces the strip-shaped fabric portion 221. On the other hand, the other portion of the connecting threads 130 is connected to the ground knit fabric 230 at a region of the ground knit fabric 230 which is positioned directly beneath the cell 222 adjacent to the one strip-shaped fabric portion 221, and at a region of the ground knit fabric 230 which front-faces the other adjacent strip-shaped fabric portion 221.

As a result, the other portion of the connecting threads 130 is diagonally arranged in between the ground knit fabrics 220 and 230. Further, in any one of the strip-shaped fabric portions 221, the connecting threads 130 are arranged in this form so that the connecting threads 130 cross each other at the lower portions of the cylinders 222 between the adjacent strip-shaped fabric portions 221. Then, due to such arrangement of the connecting threads 130, the three-dimensional knitted fabric can impart a soft spring characteristic having a large compressibility as compared to the arrangement in which the entire connecting threads 130 are arranged almost vertically in between the ground knit fabrics 220 and 230 (see FIG. 5). Meanwhile, owing to a buckling strength of the respective connecting threads 130, the three-dimensional knitted fabric can impart a soft spring feeling having considerable compressibility, as well as sufficient restoring force. Further, in a third embodiment of the present invention, a hollow portion 241, where the connecting threads do not exist, is formed at a widthwise intermediate portion of each of the respective wale portions 223 which are formed by the strip-shaped knit fabric portions 221 and the connecting threads 130. Consequently, the three-dimensional knitted fabric can attain appreciably high compressibility and the hollow portion 241 also contributes to making the three-dimensional knitted fabric (cushion material) more compact.

The respective wale portions 223, which are formed by the strip-shaped fabric portions 221 and the connecting threads 130 according to the third embodiment of the present invention, operate as a main elastic region having low surface stiffness, which, in the same manner as the projections 160, imparts a principal restoring force in relation to compressive deformation. Further, the respective wale portions 223 are formed so as to be separated from one another at a spacing of one or a few wale portions, and thereby correspond to a portion of the main elastic region. In other words, as described above, the respective wale portions 223 are a region where the connecting threads 130 cause a predetermined elasticity, and compressibility is large. Further, a region comprising a portion of the connecting threads 130 which are arranged directly under the cylinders 222 between the wale portions 223, and a portion of the other ground knit fabric 230 is where the arrangement density of the connecting threads 130 is lower than that of the connecting threads in a region of the wale portions 223 forming the main elastic region. A region which has a small compressibility and a high surface stiffness and can impart only a slight amount of elasticity in the thickness direction of the three-dimensional knitted fabric due to the deformation of the connecting threads 130. Consequently, the three-dimensional knitted fabric 210 of the third embodiment of the present invention is structured by two or more regions having different degrees of surface stiffness.

Figure 21:
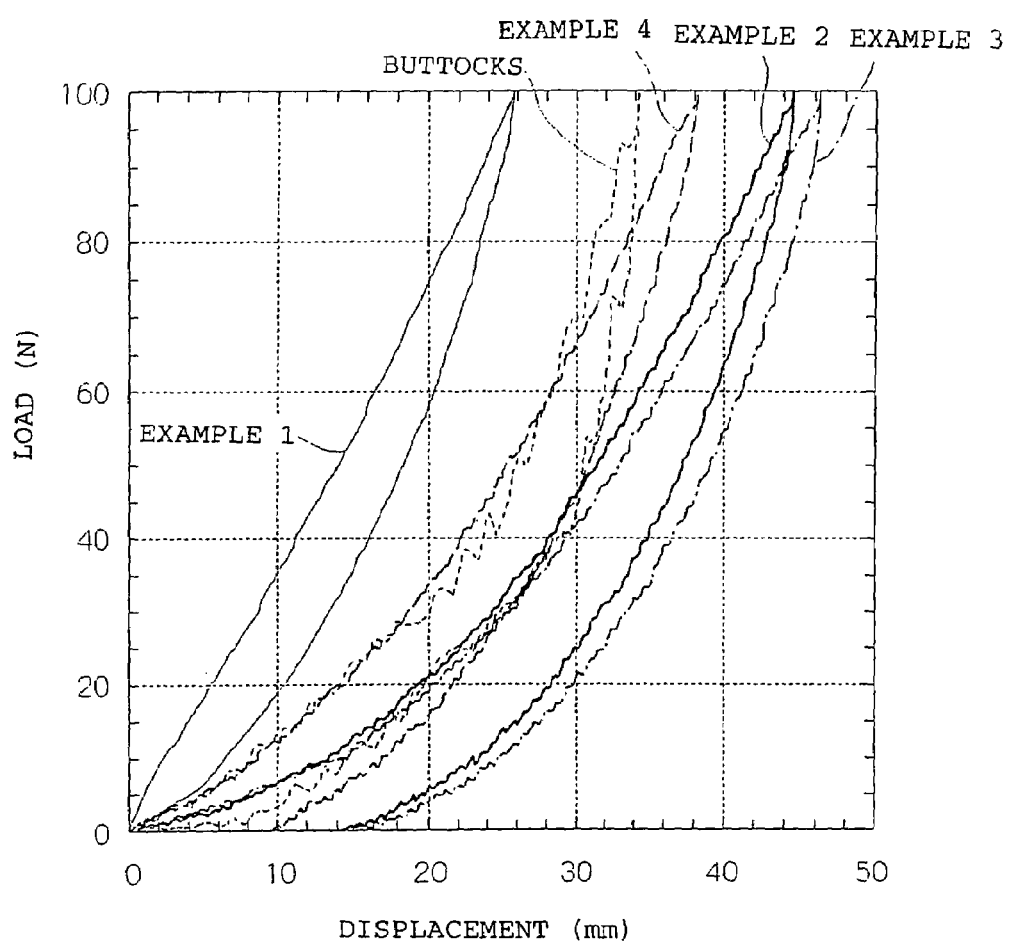
FIG. 21 is a graph illustrating the relationship between displacement and load at buttocks of a human body in Examples of the third to sixth embodiments of the three-dimensional knitted fabric.

FIG. 21 shows a spring characteristic of a muscle portion of the buttocks of a human body. However, as will be apparent from this graph, when a pressure within a range of 0.1 to 10 N/mm is applied by a circular compressing plate having a diameter of compressing plate having a diameter of 98 mm to a muscle portion of the buttocks, the spring characteristic has a small hysteresis loss, and a relatively high linearity. As compared to this, in a conventional cushion material having a soft elastic structure in which a soft polyurethane slub foam and a viscous elastic polyurethane foam are laminated to each other, while a part of the load characteristic has a spring constant which is substantially equivalent to that of the present embodiment, and however, hysteresis loss is substantial and restoring force is insufficient. In view of the aforementioned facts, when the three-dimensional knitted fabric 210 is stretched between the seat frame, a spring constant is substantially equivalent to that of a muscle portion of the buttocks of a seated occupant, and hysteresis loss and linearity are also substantially equivalent to those of the spring characteristic of a muscle portion of the buttocks of a seated occupant. Consequently, a muscle portion of the buttocks of a seated occupant hardly deform when an occupant is seated on the seat, and the required restoring force can be reliably obtained.

When the three-dimensional knitted fabric 210 is stretched between the seat frame, in order for the three-dimensional knitted fabric 210 to perform the aforementioned functions, it is essential that load characteristics in a thickness direction before stretching be a relatively low hysteresis loss and relatively high linearity. However, in the three-dimensional knitted fabric 210 of the first embodiment of the present invention, arrangement density and thickness of the connecting threads 130 are entirely uniform (see FIG. 5), and accordingly, the surface of the three-dimensional knitted fabric 210 imparts uniform elasticity. Therefore, the three-dimensional knitted fabric is largely affected by a buckling characteristic of the connecting threads and has a load characteristic which is non-linear and in which hysteresis loss is considerable. Consequently, in the three-dimensional knitted fabric of the first embodiment of the present invention, for example, spring constant becomes excessively large because restoring force is given emphasis in order to adjust the thickness and density of the connecting threads. On the other hand, when thickness or density of the entire connecting threads is reduced uniformly and the spring constant of the three-dimensional knitted fabric approaches that of a muscle portion of a human body, a hysteresis loss increases and restoring force becomes insufficient.

Figure 20:
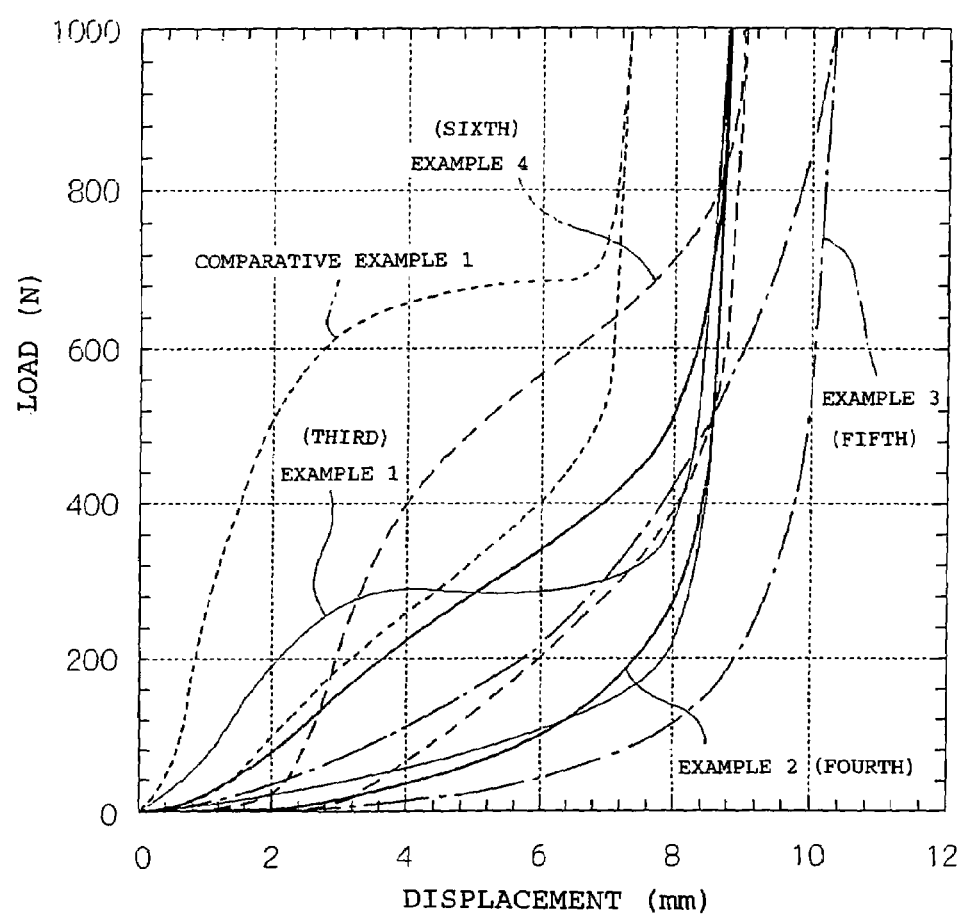
FIG. 20 is a graph illustrating the relationship between displacement and load (pressure) in Examples and Comparative Examples of the third to sixth embodiments of the three-dimensional knitted fabric.

In contrast to this, in accordance with the third embodiment of the present invention, the respective wale portions 223, formed by the aforementioned strip-shaped fabric portions 221 and the connecting threads 130 to form a main elastic region, are partially provided in the three-dimensional knitted fabric. Namely, as compared to a conventional three-dimensional knitted fabric having two regions with different compressibility (surface stiffness) in which the connecting threads are arranged uniformly on the entire surface by using the same materials and mesh organization, in the three-dimensional knitted fabric of the present embodiment, a spring characteristic is soft while the required restoring force is maintained. This is clear from the graph in FIG. 20 illustrating load characteristics. As compared to the characteristics of the three-dimensional knitted fabric of the first embodiment of the present invention (Comparative Example 1 (under the same manufacturing conditions as in Example 4 which will be later described, excepting compressibility: 13.2%, and compressive elasticity: 98.1%)), in the third embodiment as in Example 1, a spring constant becomes smaller, spring characteristics become soft, hysteresis loss is reduced, and linearity is higher. As a result, it can be appreciated that the three-dimensional knitted fabric 210 of the third embodiment is more appropriate as a cushion material (outer cover material) for a seat because a spring characteristic is substantially equivalent to a characteristic of a muscle portion of a human body, and the required restoring force (restoration) is possessed.

In the three-dimensional knitted fabric 210 of the third embodiment of the present invention, such characteristics as described above can be obtained by forming the three-dimensional knitted fabric in the same manner as in a case of forming the projections 160. Namely, it is preferable that compressibility of the wale portions 223 as the main elastic region is 20 to 90%, compressive elasticity of the wale portions 223 is 75 to 100%, and a difference of compressibility between the connecting threads 130 which are directly under the cylinders 222 among the wale portions 223 and a portion of the other ground knit fabric 230 is equivalent to or greater than 5%. Further, a thickness of each of the wale portions 223 as the main elastic region (a thickness t between surfaces of the pair of the ground knit fabrics 220 and 230 which are arranged via the connecting threads 130) is preferably 5 to 100 mm in order to satisfy a characteristic of a vehicle seat cushion material. If the thickness is smaller than a range of 5 to 100 mm, it is difficult to obtain excellent cushioning performance. If the thickness exceeds this range, stability of the shape of the three-dimensional knitted fabric cannot be secured. Further, even when the thickness is within the aforementioned range, if the thickness of the wale portion 223 exceeds 50 mm, due to elasticity of the connecting threads 130, stiffening of cushioning characteristic and approximation of the value to a rigid body must be prevented. When relatively thick wale portions are required, it is preferable to design the wale portions by using the connecting threads 130 with high elasticity so as to impart characteristics having a large stroke and a soft cushioning performance.

Further, by considering convenience of sewing operation, a thickness of 5 to 30 mm is most preferable. Moreover, the three-dimensional knitted fabrics 210 are piled in plurality or can be used by being laminated with another elastic member such as Plumaflex and the like. However, in this case, since a spring characteristic of another elastic member is an additional consideration, it is preferable that a thickness per one three-dimensional knitted fabric 210 (thickness t of each wale portion 223) is 5 to 30 mm, which is of course at the thinner end of the above-described range of thickness.

For the same reasons as described above, a ratio of the wale portions 223 when projected on a plane per unit area is preferably 1 to 99%/m$^2$, and more preferably, 30 to 90%/M$^2$ particularly when the three-dimensional knitted fabric is used as a vehicle seat. In order for the wale portions 223 as the main elastic region to have a ratio per unit area, a width of each of the strip-shaped fabric portions, and a spacing between the adjacent strip-shaped fabric portions are preferably determined as described below:

When both the number of wale portions in a width of each strip-shaped fabric portion and the number of wale portions in a spacing between the adjacent strip-shaped fabric portions 221 are respectively represented by W, it is preferable that W is within a range of the following equation:

$$W=(0.14 \cdot E)/2.54 \sim (15.24 \ 14 \cdot E)/2.54$$

wherein "E" represents the number of gauges of a knitting machine for organizing the three-dimensional knitted fabric, "2.54" is a value in which 1 inch is expressed by a unit of cm. The present inventors researched diligently, resulting in the empirically derived coefficients of "0.14" and "15.24" which can calculate a desired number of wale portions irrespective of the number of gauges of the knitting machine.

The ratio of the wale portions 223 as the main elastic region per unit area can be modified in accordance with changes of density or width of the wale portions 223. For example, in order to control slidability in the forward direction of the pelvis of a human body and improve shape adaptability to changes of posture, it is preferable to increase a width of one wale portion 223 by a portion corresponding to s lumbar of a human body, and to make narrower one wale portion 223 by a portion corresponding to an ishium of a human body.

The type and thickness of ground threads for forming the ground knit fabrics 220 and 230 are not particularly limited. However, use of multifilament threads or spun threads whose thickness is from 167 to 2800 decitex is preferable. If the thickness of multifilament threads is less than 167 decitex, it becomes difficult for the three-dimensional fabric to secure the necessary lumbar strength and the ground threads easily cause elastic fatigue. If the thickness exceeds 2800 decitex, a manufacturing operation becomes difficult, and the sensation of touching the surface of the fabric also deteriorates. It is possible to use monofilament threads as ground threads. However, from a viewpoint of sensation of touch or softness of a fabric surface, as described above, it is preferable to use multifilament threads or spun yarns.

As described above, it is preferable to use monofilament threads having a thickness of 167 to 1100 decitex as the connecting threads 130.

The same materials as those described above can be used for ground threads or for the connecting threads 130.

As in the third embodiment of the present invention, in order to achieve the above-described characteristics with only the fabric knitting organization, a total thickness of mesh formed by the ground threads and the connecting threads 130 which form the ground knit fabrics 220 and 230 is preferably 330 decitex or more, and more preferably 420 to 2800 decitex. Therefore, mesh tightness at a portion where the connecting threads 130 are joined is improved, projection of the connecting threads 130 when pressed by an occupant is prevented, and the retention of shape is improved. Accordingly, excellent cushion characteristics and body pressure distribution characteristics described above can be imparted.

Needless to say, in order for the three-dimensional knitted fabric to impart the above-described characteristics by adjusting the knitting organization, arrangement forms of knit fabrics, ranges of various values, and materials are not limited to those described in the embodiments of the present invention. The knitting organization can also be adjusted by any one element or by combining two elements or more of a group of elements comprising a connecting thread arrangement density, a connecting thread thickness, a connecting thread length, a connecting thread material, a ground knit fabric mesh shape, a ground knit fabric mesh size, a ground thread material for structuring the ground knit fabric, and a mesh tightness at the connecting portion of the connecting thread and the ground knit fabric.

Fourth Embodiment

Figure 13:
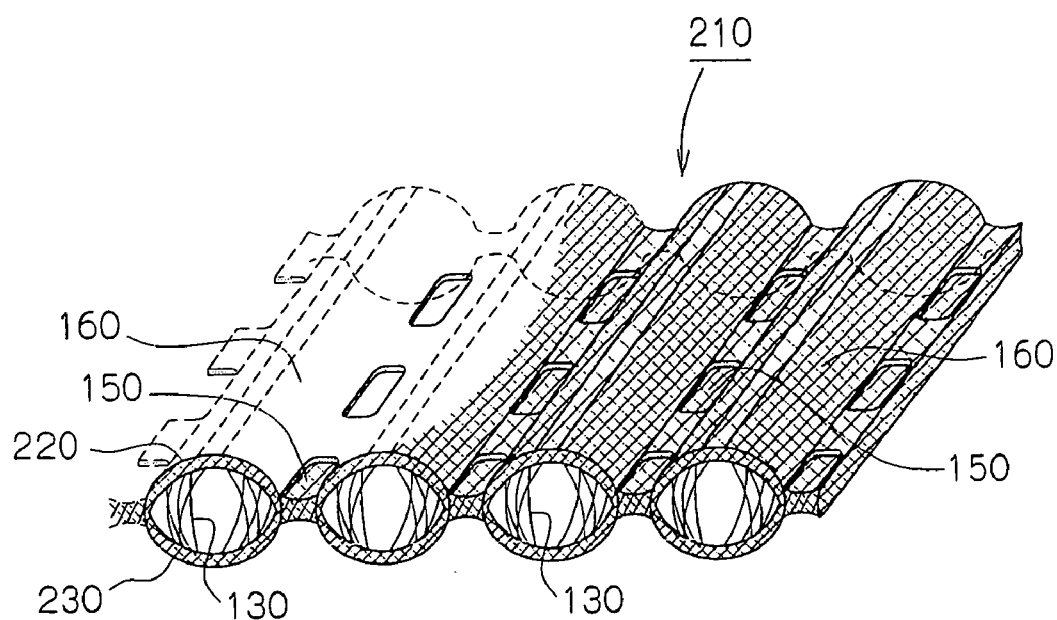
FIG. 13 is a perspective view of a fourth embodiment of the three-dimensional knitted fabric comprising recesses and projections that can be used as the upper elastic member according to the present embodiment.
Figure 14:
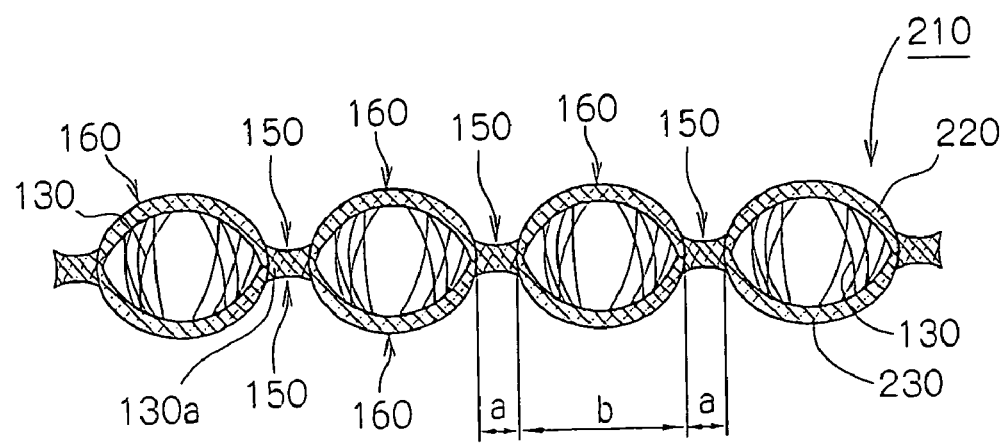
FIG. 14 is a cross-sectional view of the three-dimensional knitted fabric shown in FIG. 13.

In relation to FIGS. 13 and 14, a description of a fourth embodiment of the present invention will be made hereinafter. Portions identical to the third embodiment of the present invention will be denoted by the same reference numerals. In the three-dimensional knitted fabric according to the present embodiment, in the same manner as in the second embodiment of the present invention, the recesses 150 and the projections 160 are formed on the fabric (where the strip-shaped fabric portions link to each other) which was manufactured in the same manner as the three-dimensional knitted fabric 210 of the third embodiment of the present invention in which the projections 160 form the main elastic region.

In the fourth embodiment of the present invention, the recesses 150 are formed by making a pair of the ground knit fabrics 220 and 230 approach one another, and the ground knit fabrics 220 and 230 are disposed so as to be separated from one another at a predetermined spacing in a course direction of the three-dimensional knitted fabric 210 of the third embodiment of the present invention. In the present embodiment, since the recesses 150 are formed among the strip-shaped fabric portions (among which cylinders are formed), the connecting threads 130 in the recesses 150 are inclined or flexed, and the adjacent connecting threads 130 are entangled and joined together. As a result, both side portions of the connecting threads 130 which interpose the entangled portions 130a therebetween act as respectively independent spring elements, in relation to the ground knit fabrics 220 and 230 to which the connecting threads 130 are joined. Accordingly, as schematically shown in FIG. 15, a structure, which appears to be one spring element having a substantially arch-shaped cross section, is formed in one recess 150 as far as the entangled portion 130a of the entangled connecting threads 130 to the entangled portion 130a of the entangled connecting threads 130 in the adjacent recess 150.

Thus, when compressive deformation of the projections 160 occurs due to a load mass, as compared with the case of the third embodiment of the present invention when compressive deformation of the wale portions 223, buckling strength of the connecting threads 130 deteriorates, making it difficult for the connecting threads to impart buckling characteristics. As a restoring force, as shown by an imaginary line in FIG. 5, an elastic function in a bending direction of the spring elements, which have arch-shaped cross-sections and include the entangled connecting threads 130, becomes relatively larger. As a result, since the three-dimensional knitted fabric of the fourth embodiment of the present invention is structured in the same manner as in the third embodiment of the present invention except that the recesses 150 and the projections 160 are formed, a spring characteristic of the projections 160 according to the fourth embodiment of the present invention becomes smaller such that the recesses 160, which receive a very small load, readily deform at an initial stage, a buckling characteristic becomes insufficient, and accordingly, hysteresis loss becomes small and linearity high.

Conversely, when the three-dimensional knitted fabric is stretched across the seat frame, in order to approximate a spring characteristic of the three-dimensional knitted fabric to that of a muscle portion of a human body, the three-dimensional knitted fabric must be structured such that the load characteristic of its own has a comparatively high linearity and a relatively small hysteresis loss. Namely, as compared to the third embodiment of the present invention in which realization of such characteristics as described above is attempted merely by a knitting organization, the three-dimensional knitted fabric of the present invention in which the projections 160 are formed can impart the required characteristics even if conditions of the knitting organization of the ground knit fabrics 220 and 230, and the arrangement of the connecting threads 130 are less stringent.

In this respect, as is apparent from a load characteristic shown in FIG. 20, when the three-dimensional knitted fabric according to a third embodiment of the present invention (Example 1) is compared with that of the first embodiment of the present invention (Comparative Example 1), hysteresis loss decreases and linearity becomes higher. However, in the fourth embodiment of the present invention (Example 2), hysteresis loss decreases considerably and linearity becomes much higher. Further, since a spring performance in the bending direction of the spring elements which have substantially arch-shaped cross sections is used, a spring constant is low, and a cushioning structure is thereby considerably softer than that in the third embodiment of the present invention.

In the fourth embodiment of the present invention, as described above, by entangling the connecting threads 130 in the recesses 150 as described above, elasticity extends and contacts in a direction substantially orthogonal to a line along which the recesses 150 are also formed. For this reason, when the three-dimensional knitted fabric is stretched over the recesses 150, not only is spring performance imparted in a thickness direction of the three-dimensional knitted fabric and in the bending direction of the spring elements having substantially arch-shaped cross sections, but also elasticity (spring performance) occurring in a plane direction orthogonal to the thickness direction of the three-dimensional knitted fabric is additionally imparted to the three-dimensional knitted fabric, thus contributing to a decrease in spring constant. Since the three-dimensional knitted fabric according to the fourth embodiment of the present invention has such a characteristic, as described in the second embodiment of the present invention with reference to FIG. 3, it is preferable that the seat is stretched such that projections are dispersed in the widthwise direction (Y direction) of the seat.

Here, means for forming the recesses 150 will be explained. First, the recesses 150 can be formed at any points. However, the restoring force applied from the recesses 150 in the thickness direction of the three-dimensional knitted fabric is not important. Further, by entangling portions of the connecting threads 130, the recesses 150 are rather used in order to form the projections 160 into the spring elements having substantially arch-shaped cross sections. Therefore, the connecting threads 130 among the recesses 150 do not need high arrangement density. Accordingly, the three-dimensional knitted fabric can be made compact. Consequently, in the fourth embodiment of the present invention in which the third embodiment of the present invention is used unchanged, a portion of the three-dimensional knitted fabric which is included in the cylinders 222 among the strip-shaped fabric portions 221 in the third embodiment of the present invention shown in FIG. 9, together with the communicating portion 224 are preferably made thinner in the wale direction of the three-dimensional knitted fabric, such that the connecting threads 130 included in the portion of the three-dimensional knitted fabric and the communicating portion 224 can be entangled (crossed).

As in the first embodiment and a fifth embodiment of the present invention (which will be described later), the arrangement densities of connecting threads of projections and recesses can be made equivalent.

The arrangement density of the connecting threads in the recesses can be made higher than in the projections, depending on the thickness and the knitting organization of the connecting threads. Further, the three-dimensional knitted fabric can be formed by changing one or two or more of a group of the elements comprising an arrangement density of the connecting threads among the recesses 150 and the projections 160, a thickness of the connecting threads 130, a length of the connecting threads 130, and a material of the connecting threads 130, and a mesh shape and mesh size of the ground knit fabrics 220 and 230, a material of ground threads for structuring the ground knit fabrics 220 and 230, and a mesh tightness at the connecting portions of the connecting threads 130 and the ground knit fabrics 220 and 230. Accordingly, elastic function of the spring elements, which have substantially arch-shaped cross-sections, can be appropriately adjusted. Further, as will be described later, when the ground knit fabrics 220 and 230 are made to approach one another and compressed, the connecting threads 130 in the recesses 150 are made thinner, whereby operations can be simplified.

As shown in FIG. 10, before the recesses 150 are formed, the connecting threads 130, which are included in the recesses 150, are crossed with each other and inclined in relation to each other under the cylinders 222 among the strip-shaped fabric portions 221. Accordingly, the connecting threads 130 are entangled and joined at the crossing portions of the connecting portions 130, whereby it becomes easier to support diagonally the side portions of the projections 160, and accordingly, the spring elements having substantially arch-shaped cross sections can be formed easily.

Figure 38A:
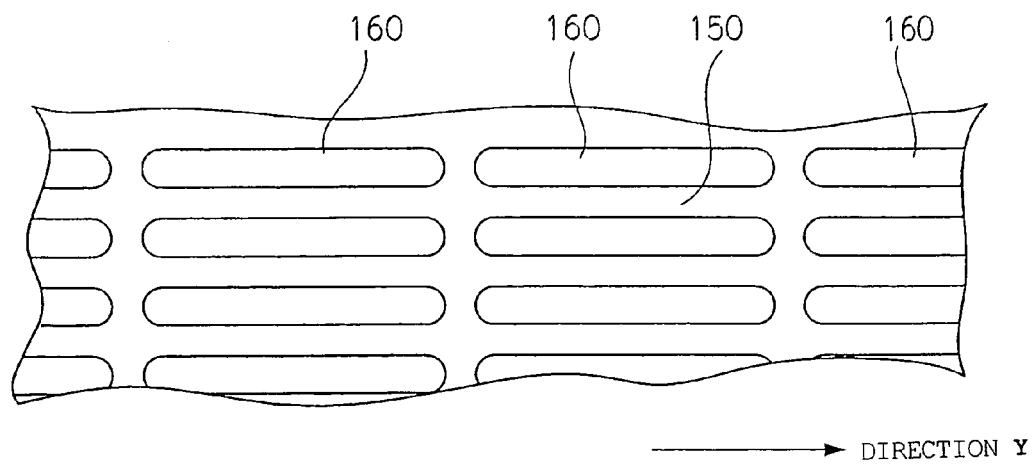
FIG. 38A is a schematic plan view in which projections are arranged in a lattice form.
Figure 38B:
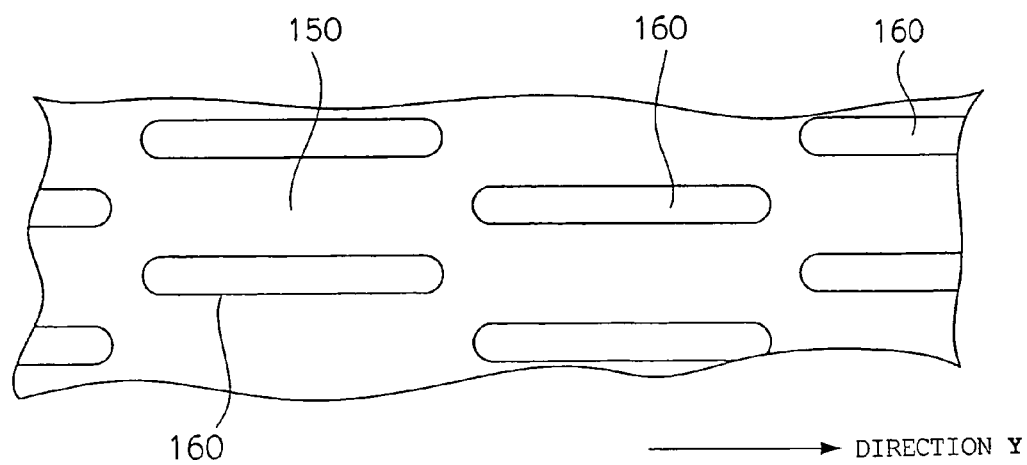
FIG. 38B is a schematic plan view in which projections are arranged in a staggered form.

Each of the recesses 150 can be formed into an arbitrary shape, and can be formed in an arbitrary direction along the surface of the three-dimensional knitted fabric. For example, in accordance with the fourth embodiment of the present invention, the recesses 150 are formed in the wale direction while being separated from one another in the course direction at a predetermined spacing, so that the projections 160 can be arranged in parallel to one another. Further, the recesses 150 can be formed in the wale direction so as to be separated from one another at a predetermined spacing, whereby, as shown in FIGS. 38A and 38B, the projections 160 can be arranged in a lattice form or a staggered form.

The recesses 150 can be formed from one side of the pair of the ground knit fabrics 220 and 230: however, as shown in fourth embodiment of the present invention, they can be formed from both sides of the ground knit fabrics 220 and 230. Examples of means for forming the recesses 150 by getting the ground knit fabrics 220 and 230 close to one another, include welding means, bonding means, and sewing means by using a sewing machine, and means in which molten fabrics are interposed between the ground knit fabrics 220 and 230 and then molten. Among these, use of vibration welding means is preferable because it can prevent the welded portions from forming a rigid body and has high bonding strength.

The projections 160 as a main elastic region in the three-dimensional knitted fabric according to the fourth embodiment of the present invention preferably have compressibility, compressive elasticity and thickness which are exactly the same as those of the wale portions 223 as a main elastic region in the third embodiment of the present invention. Further, the compressibility difference between the projections 160 and the recesses 150 of the present embodiment preferably has the same range, which is equal to or greater than 5%, as that in the third embodiment of the present invention.

The ratio of the projections 160 per unit area as a main elastic region when projected on a plane has the same preferable range as that of the wale portions 223 of the third embodiment of the present invention. Further, it is preferable that the number of wales W per width of the projection 160 and spacing between adjacent projections 160, and the number of wales W are determined in the same manner as those in the third embodiment of the present invention, in which the number of wales W has a range which is represented by the equation: $W=(0.14 \cdot E)/2.54 \sim (15.24 \cdot 14 \cdot E)/2.54$. Moreover, as shown in FIG. 14, when the recesses 150 are projected on a plane, a substantially flat portion of a root portion is used as a width b, and when the projections 160 are projected on a plane, a spacing between the substantially flat portions of the adjacent recesses 150 is a width.

The preferable type and thickness of ground threads for forming the ground knit fabrics 220 and 230 and the connecting threads 130 are in the same range as those in the third embodiment of the present invention. Substantially the same materials as those in the third embodiment of the present invention can be used. However, when the recesses 150 are formed by vibration welding, use of a thermoplastic resin is preferable. Examples of the thermoplastic resin include: thermoplastic polyester resins such as polyethylenetelephthalate (PET) and polybutylencterephthalate (PBT), polyamide resins such as nylon 6 and nylon 66, or two or more of these resins can be used in combination.

However, in the fourth embodiment of the present invention, the connecting threads 130 are partially entangled and joined so that protrusion of the connecting threads can be prevented. Accordingly, tightness of a mesh which is formed by the ground threads for structuring the ground knit fabrics 220 and 230, and the connecting threads 130 can be made lower than that in the third embodiment of the present invention, and the total thickness of the mesh can be made within an even narrower range than this, whereby the ground knit fabrics 220, 230 can impart a soft touch.

Fifth Embodiment

Figure 17:
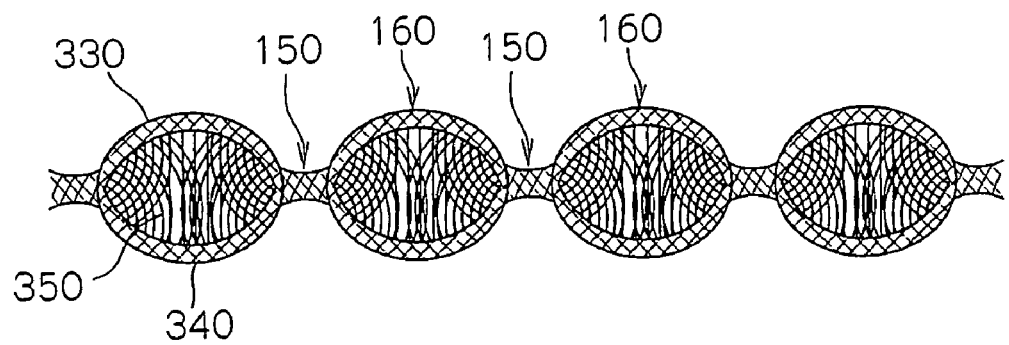
FIG. 17 is a sectional view of a fifth embodiment of the three-dimensional knitted fabric which can be applied to the present embodiment.

FIG. 17 shows a cross sectional view of a three-dimensional knitted fabric according to a fifth embodiment of the present invention. The three-dimensional knitted fabric has the recesses 150 and the projections 160 in the same manner as in the fourth embodiment of the present invention, except that both of the ground knit fabrics 330, 340 are formed by a flat fabric organization which is continuous both in the wale direction and the course direction, in the same manner as the other ground knit fabric 230 of the third embodiment of the present invention, as shown in FIG. 13. Further, the present embodiment is structured in the same manner as the previous embodiments except that, before the recesses 150 are formed, the connecting threads 350 are arranged with a uniform arrangement density on the entire surface of the three-dimensional knitted fabric and exclude any rough arrangement portions. With regard to other conditions, the present embodiment is structured in exactly the same manner as in the fourth embodiment of the present invention. Consequently, the fifth embodiment of the present invention is structured substantially in the same manner as the second embodiment of the present invention.

In the fifth embodiment of the present invention, since the projections 160 as the main elastic region are partially formed, the same characteristic as in the fourth embodiment of the present invention can be imparted. FIG. 20 shows Example 3 in which a load characteristic of the three-dimensional knitted fabric is structured in the same manner as in the fifth embodiment of the present invention. As is apparent from this graph, as compared to a conventional three-dimensional knitted fabric, the three-dimensional knitted fabric in the present embodiment has lower spring constant, lower hysteresis loss, and higher linearity. Further, in FIG. 20, a load characteristic in Example 3 has a spring constant lower than that in Example 2 which is structured in the same manner as in the fourth embodiment of the present invention. This is because the diameter of each connecting thread used in Example 3 was narrower than that of each connecting thread used in Example 2.

Sixth Embodiment

Figure 18:
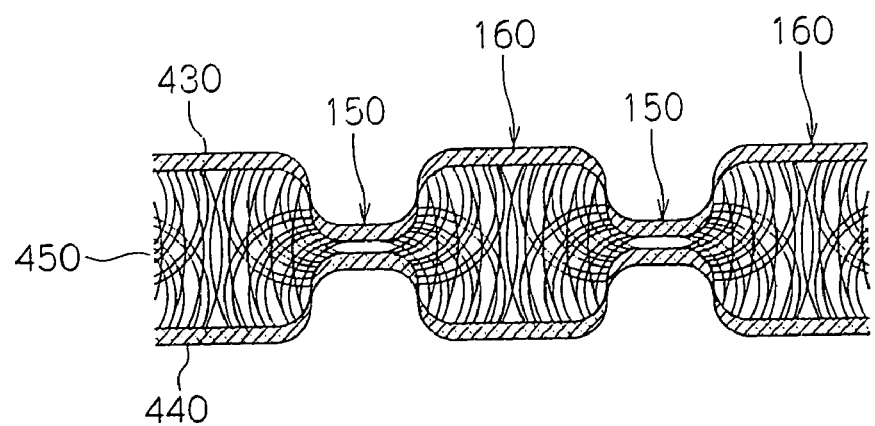
FIG. 18 is a sectional view of a sixth embodiment of the three-dimensional knitted fabric that can be applied to the present embodiment.
Figure 19:
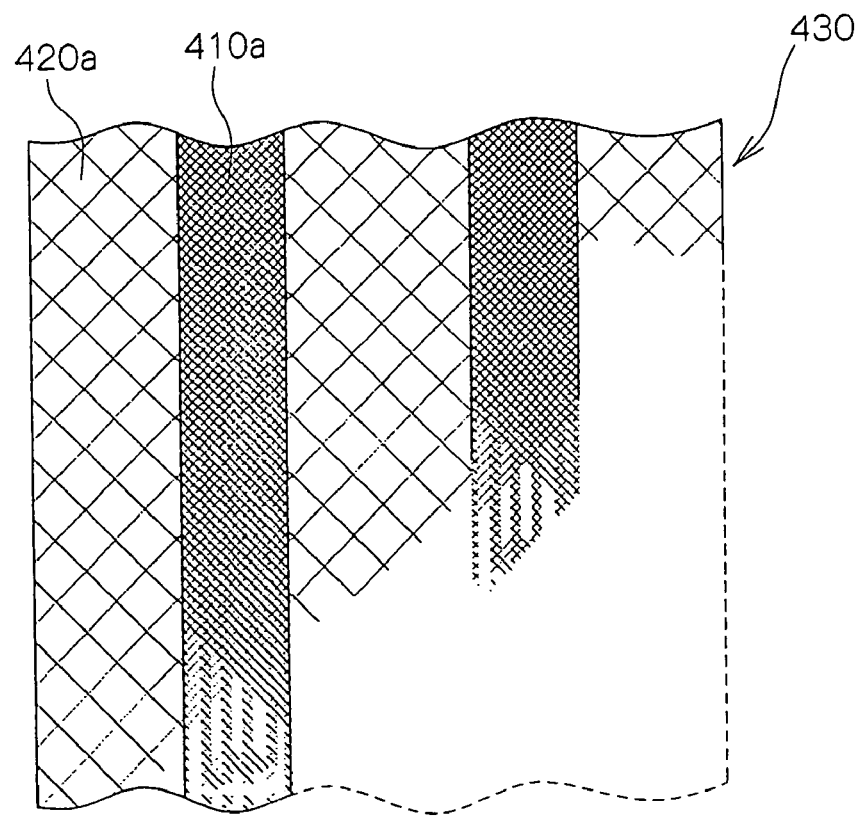
FIG. 19 is a schematic view of an example of one ground knit fabric of the sixth embodiment.

FIG. 18 shows a cross sectional view of a three-dimensional knitted fabric according to a sixth embodiment of the present invention. A three-dimensional knitted fabric of the sixth embodiment of the present invention has the recesses 150 and the projections 160 in the same manner as in the fourth and fifth embodiments of the present invention. However, as shown in FIG. 19, the first ground knit fabric 430 is formed by a rhomboid mesh organization in which portions 420a for forming the projections 160 are continuous in the wale direction, and by a organization in which portions 410a for forming the recesses 150 are continuous both in the wale direction and in the course direction. Further, the other ground knit fabric 440 is structured in the same manner as the other ground knit fabric 230 in the third embodiment of the present invention shown in FIG. 12, and accordingly, is formed by a flat fabric organization which is continuous both in the wale direction and in the course direction. Further, a portion of connecting threads 450 on which the recesses 150 are formed has a slightly higher density than a portion of the connecting threads 450 on which the projections 160 are formed. With regard to other conditions, the sixth embodiment of the present invention is structured in the same manner as in the fourth embodiment of the present invention.

Also in the sixth embodiment of the present invention, since the projections 160 as the main elastic region are partially formed on the three-dimensional knitted fabric, the same characteristics as those in the fourth embodiment of the present invention can be imparted. Namely, as shown in FIG. 20, as compared to a conventional three-dimensional knitted fabric, the load characteristic of the three-dimensional knitted fabric in the sixth embodiment of the present invention (Example 4) has a lower spring constant, a smaller hysteresis loss, and a higher linearity. However, the spring constant of the present embodiment is higher than those in Examples 1 to 3 of the previous embodiments of the present invention because, in the present embodiment, while the connecting threads having the same diameter as those in Examples 1 and 2, and however, the connecting threads were arranged with higher density.

The three-dimensional knitted fabric described above is suitably used as a cushion material (including outer cover material) by being stretched across a seat frame for a variety of seats such as a vehicle seat for automobiles or trains, office chair seats, and furniture chairs. However, when the three-dimensional knitted fabric is stretched across the seat frame, as described above, it is preferable to stretch the three-dimensional knitted fabric by an elongation ratio within 5%. In this way, it is easier to form a structure having a spring characteristic close to a characteristic of a muscle portion of a human body as shown in FIG. 21, which will be described later.

In the second, fourth, fifth and sixth embodiments of the present invention, projections are used as the main elastic region, while in the third embodiment of the present invention, the wale portions are used as projections, namely, the wale portions linked to each other through communicating portions and operating as a main elastic region. In consideration of ease of manufacturing easiness and characteristics imparted by the three-dimensional knitted fabric when it is used for a vehicle seat, it is preferable that the wale portions are structured as described above and operate as the main elastic region. However, by changing the thickness of connecting threads and ground threads and by adjusting the knitting organization, it is also possible to use recesses as a main elastic region with a high compressive elasticity as long as the recesses exhibit characteristics which are substantially equivalent to those of the above-described projections.

In the above description, an example has been explained in which the strip-shaped fabric portions are formed by cylinders. However, it is possible to organize the ground knit fabrics by alternately arranging a large number of roughly knitted portions extending in a predetermined direction and a large number of densely knitted portions extending in a predetermined direction. Further, instead of the strip-shaped fabric portions, the densely knitted portions can be used, and instead of the cylinders, the roughly knitted portions can be used.

However, shaggy fibers can be implanted on a surface layer portion of the three-dimensional knitted fabric so as to form a portion having an elastic compliance larger than that of an occupant's pressing a seat cushion.

(Manufacturing Conditions)

Specific manufacturing conditions of a three-dimensional knitted fabric which is able to impart the above-described functions will be exemplified hereinafter. Further, the three-dimensional knitted fabric of Manufacturing Example 1 has a structure in which recesses and projections are not formed, as shown in FIG. 9, which comprises the wale portions (strip-,shaped portions) 223 which are separated from one another at a spacing of one wale or plural wale portions and the cylinders 222 among the wale portions 223 so as to connect to one another adjacent wale portions. The communication portions 224 are formed in the cylinders 222 at a spacing of one or a few courses. In Manufacturing Examples 2 to 4, projections and recesses are formed as shown in FIGS. 13 and 14.

MANUFACTURING EXAMPLE 1

| | |
|---|---|
| knitting machine: | double-russell (9 gauges/2.54 cm, distance between cylinders: 15 mm) |
| wale density: | 10 threads/2.54 cm |
| course density: | 14 threads/2.54 cm |
| finished thickness (distance between surfaces of the pair of the ground knit fabrics): | 11.5 mm |
| ground threads of the first ground knit fabric: | 1170 decitex/96f polyester/BCF multifilament (crimped threads) |
| ground threads of the other ground knit fabric: | 660 decitex/192f polyester/BCF multifilament (crimped threads) |
| connecting threads: | 660 decitex/1f polyester |
| knitting organization of the one ground knit fabric: | variation organization of two course mesh |
| knitting organization of the other ground knit fabric: | queen's cord |
| total thickness of a mesh formed by ground threads of the first ground knit fabric and the connecting threads: | 1830 decitex (a partial thickness: 3000 decitex) |
| total thickness of a mesh which is formed by ground threads of the other ground knit fabric and the connecting threads: | 980 decitex |
| compressibility of wale portions: | 49.5% |
| compressive elasticity of wale portions: | 98.9% |
| compressibility difference between the wale portions and the other portions: | 5.2% |
| width of a wale portion: | 6 wales |
| width of a cell: | 1 wales |

An example has been described in which the main elastic region is structured by the projections or the wale portions.

MANUFACTURING EXAMPLE 2

| | |
|---|---|
| knitting machine: | double-russell (9 gauges/2.54 cm, distance between cylinders |
| wale density: | 10 threads/2.54 cm |
| course density: | 14 threads/2.54 cm |
| finished thickness (a distance between surfaces of the pair of the ground knit fabrics): | 11.5 mm |
| ground threads of the first ground knit fabric: | 1170 decitex/96f polyester/BCF multifilament (crimped threads) |
| ground threads of the other ground knit fabric: | 660 decitex/192f polyester/BCF multifilament (crimped threads) |
| connecting threads: | 660 decitex/1f polyester |
| knitting organization of the first ground knit fabric: | variation organization of two course mesh |
| knitting organization of the other ground knit fabric: | queen's cord |

-continued

| | |
|---|---|
| total thickness of a mesh which is formed by the ground threads of the first ground knit fabric and the connecting threads: | 1880 decitex (partial thickness: 3000 decitex) |
| total thickness of a mesh formed by the ground threads of the other ground knit fabric and the connecting threads: | 1980 decitex |
| compressibility of projections: | 57.9% |
| compressive elasticity of projections: | 98.8% |
| compressibility difference between projections and recesses: | 57.8% |
| vibration welding conditions of recesses: | pressure 18.2 kgf/m$^2$, amplitude: 1.0 mm, and time: 1.2 sec |
| width of a projection: | 5 wales |
| width of a recess: | 2 wales |

MANUFACTURING EXAMPLE 3

| | |
|---|---|
| knitting machine: | double-russell (9 gauges/2.54 cm, a distance between cylinders: 15 mm) |
| wale density: | 9.8 threads/2.54 cm |
| course density: | 12.8 threads/2.54 cm |
| finished thickness (distance between surfaces of the pair of ground knit fabrics): | 12.05 mm |
| ground threads of the one ground knit fabric: | 1170 decitex/384f |
| ground threads of the other ground knit fabric: | 560 decitex/1f |
| connecting threads: | 560 decitex/1f |
| knitting organization of the one ground knit fabric: | 1 repeat two course mesh |
| knitting organization of the other ground knit fabric: | queen's cord |
| total thickness of mesh formed by the ground threads of the first ground knit fabric and the connecting threads: | 1730 decitex |
| total thickness of mesh formed by the ground threads of the other ground knit fabric and the connecting threads: | 1120 decitex |
| compressibility of projections: | 89.1% |
| compressive elasticity of projections: | 100% |
| compressibility difference between projections and recesses: | 89.0% |
| vibration welding conditions of recesses: | pressure 21.7 kgf/m$^2$, amplitude: 1.0 mm, and time: 1.0 sec |
| width of projections: | 6 wales |
| width of recesses: | 2 wales |

MANUFACTURING EXAMPLE 4

| | |
|---|---|
| knitting machine: | double-russell (9 gauges/2.54 cm, distance between cylinders: 15 mm) |
| wale density: | 9 threads/2.54 cm |
| course density: | 13.5 threads/2.54 cm |
| finished thickness (distance between surfaces of the pair of the ground knit fabrics): | 11.5 mm |
| ground threads of the first ground knit fabric: | 1170 decitex/96f |
| ground threads of the other ground knit fabric: | 660/decitex/192f |
| connecting threads: | 660 decitex/1f |
| knitting organization of the one ground knit fabric: | projections: 1 repeat 4 course mesh recesses: W atlas deformation |
| knitting organization of the other ground knit fabric: | queen's cord |
| total thickness of a mesh which is formed by the ground threads of the first ground knit fabric and the connecting threads: | 2050 decitex (partial thickness: 3220 decitex) |
| total thickness of a mesh formed by the ground threads of the other ground knit fabric and the connecting threads: | 1540 decitex |
| compressibility of projections: | 20.0% |
| compressive elasticity of projections: | 94.3% |
| compressibility difference between projections and recesses: | 6.8% |
| vibration welding conditions of recesses: | pressure 18.2 kgf/m$^2$, amplitude: 1.0 mm, and time: 1.2 sec |
| width of projections: | 5 wales |
| width of recesses: | 3 wales |

EXAMPLE 1

The three-dimensional knitted fabric which was manufactured in Manufacturing Example 2 was used as the upper elastic member 31d for structuring the cushion material for the seat portion 31. As shown in FIG. 3, the projections 160 were arranged such that the longitudinal direction of the projections 160 corresponded to the left-right direction of the seat, and the elastic compliance thereof was determined by the flexure amount in relation to the pressure value. The three-dimensional knitted fabric for structuring the upper elastic member 31d was arranged at an elongation percentage of 0%. As shown in FIGS. 1 and 2, the intermediate elastic member 31c formed by the three-dimensional knitted fabric, the mesh structure elastic member 31b, and the metal springs 31a were disposed under the upper elastic member 31d.

The three-dimensional knitted fabric for forming the intermediate elastic member 31c was manufactured in the same manner as in Manufacturing Example 2 except that recesses and projections were not formed thereon. For the mesh structure elastic member 31b, Plumaflex (product name) was used, supported by four metal springs at both the right and left sides thereof. Further, the mesh structure elastic member 31b was provided at a distance within a range from 140 mm to 290 mm from the seat surface rear end, and was provided at the seat portion which the vicinity of a tuber ishiadicum bottom portion of the seated occupant contacts and the rearward-direction portion therefrom such that the mesh structure elastic member 31b and the metal springs 31a hardly imparted an elastic performance. Further, the metal springs 31a in this Example 1 had a diameter of 2.6 mm, a length of 54.6 mm, a mean diameter 16.1 mm, and a total of 20 winds, and a spring constant of 0.55 N/mm.

Figure 22:
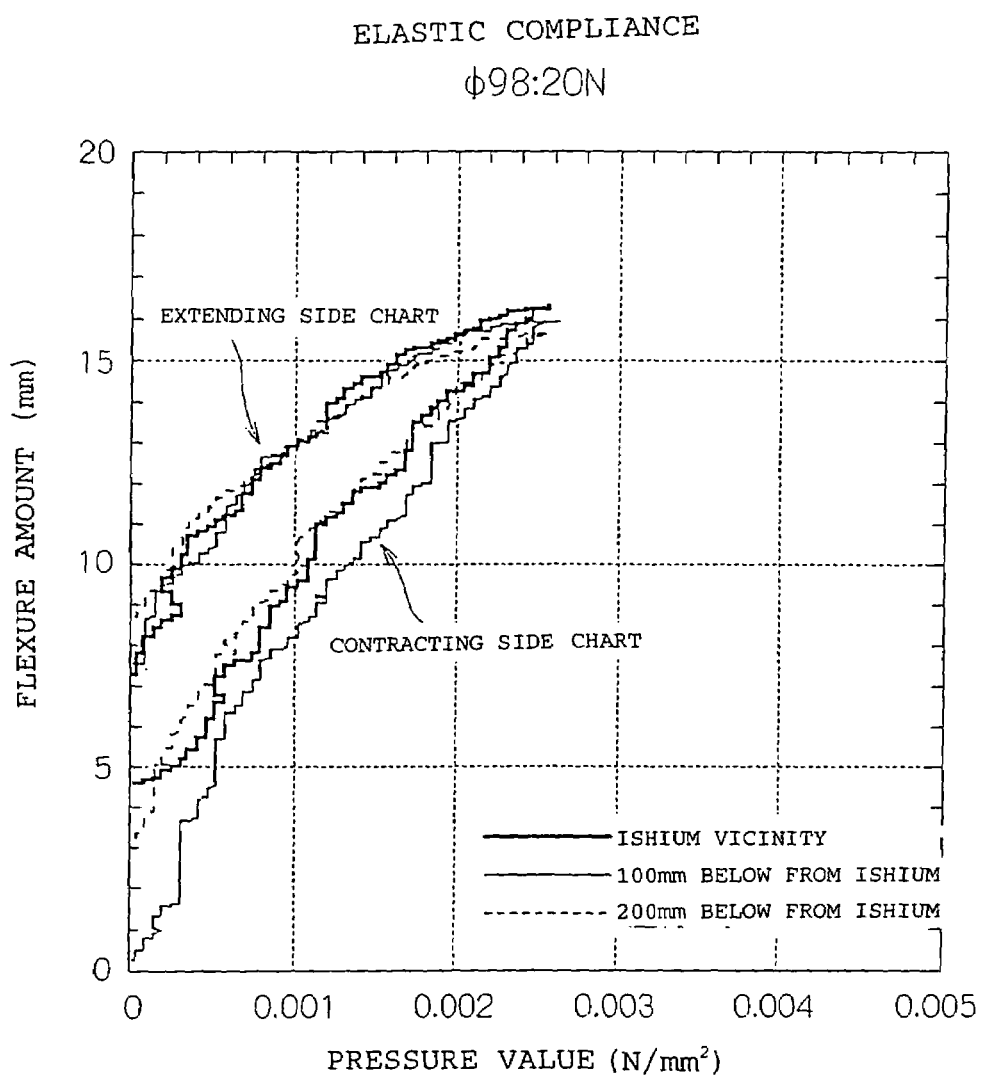
FIG. 22 is a graph illustrating elastic compliance of a human body measured by using a pressurizing plate having a diameter of 98 mm.

A circular 98 mm-diameter pressuring plate applied pressure to the three-dimensional knitted fabric at a speed of 50 mm per minute from the surface to a pressure value of 100 N, and measured a flexure amount in relation to a pressure amount, at distances of 150 mm from the seat surface rear end (the vicinity of a tuber ishiadicum bottom portion), of 250 mm from the seat surface rear end, and of 350 mm from the seat surface rear end (the vicinity of the front edge portion 41 of the seat portion), of the cushion material for the seat portion 31 having the above-described structure in Example 1. As a means of comparison, polyurethane foam with a thickness of 105 mm at a distance of 150 mm from the seat surface rear end (the vicinity of a tuber ishiadicum bottom portion), with a thickness of 75 mm at a distance of 250 mm from the seat surface rear end, and with a thickness of 50 mm at a distance of 350 mm from the seat surface rear end was used as a cushion material. Then, a flexure amount in relation to a pressure amount of this was determined in the same manner as the aforementioned cushion material in Example 1, at distances of 150 mm from the seat surface rear end, 250 mm from the seat surface rear end, and 350 mm from the seat surface rear end (the vicinity of the front edge portion 41 of the seat portion). The results were shown in FIGS. 23 to 25. Further, the circular 98 mm-diameter pressurizing plate applied a pressure to the three-dimensional knitted fabric from the seat surface rear end of the seat portion at a distances of 150 mm, 250 mm, and 350, respectively corresponding to the vicinity of an ishium of a seated occupant, 100 mm downward from the ishium, and 200 mm downward from the ishium. Pressure was compressed to 20 W and the results were shown in FIG. 22. Further, the results shown in FIG. 22 have also been incorporated in FIGS. 23 to 25.

Figure 23:
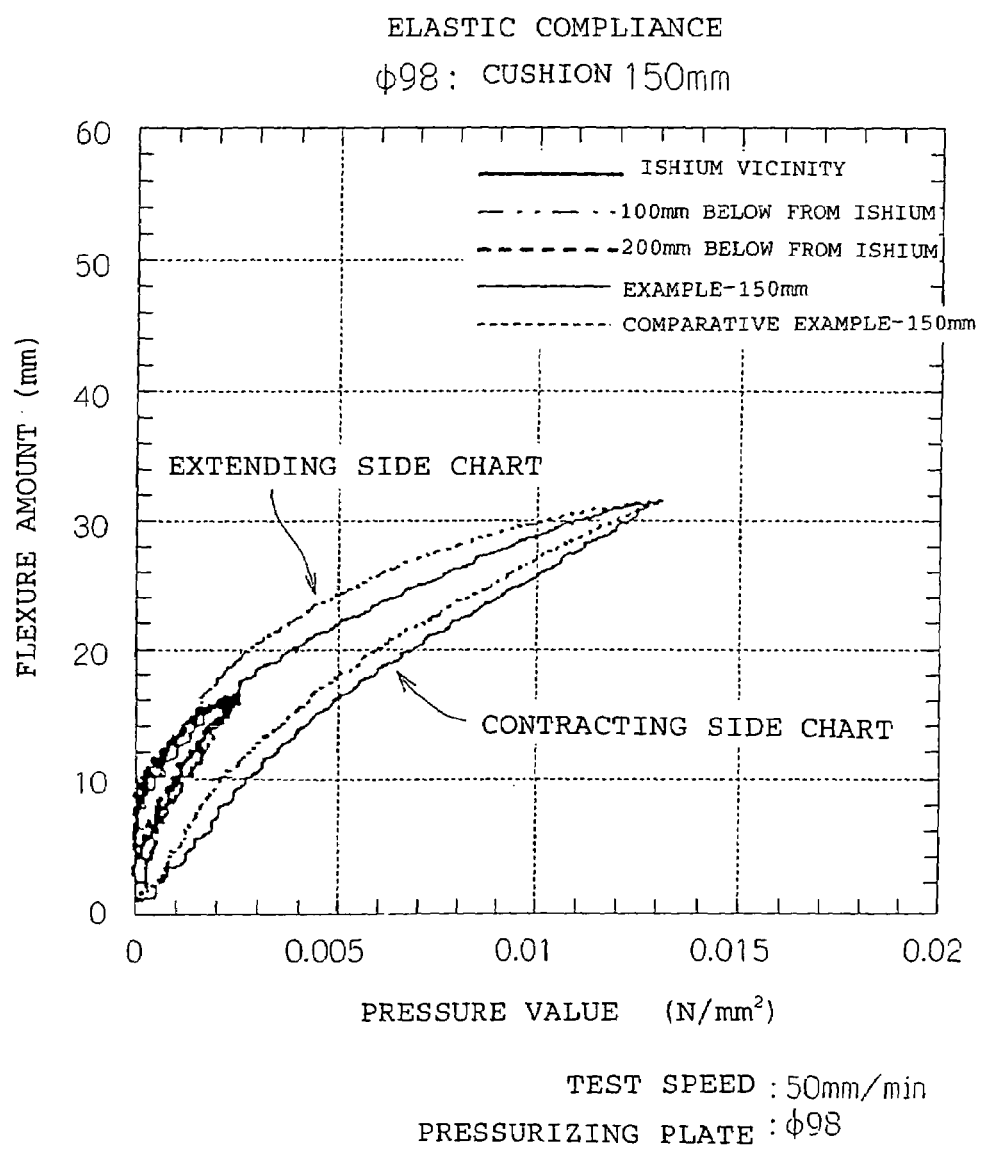
FIG. 23 is a graph illustrating elastic compliance characteristics which is measured by using the 98 mm-diameter pressurizing plate at a distance of 150 mm from a seat surface rear end of a cushion material for a seat portion in Examples and Comparative Examples.

As is apparent from FIG. 23, an elastic compliance when a reaction force was applied to an extending side of the cushion material at 150 mm from the seat surface rear end had hysteresis equivalent to or greater than that of elastic compliance characteristics in Example and Comparative Example, and had a fluctuation characteristic tendency similar to that of elastic compliance of a human body.

Figure 24:
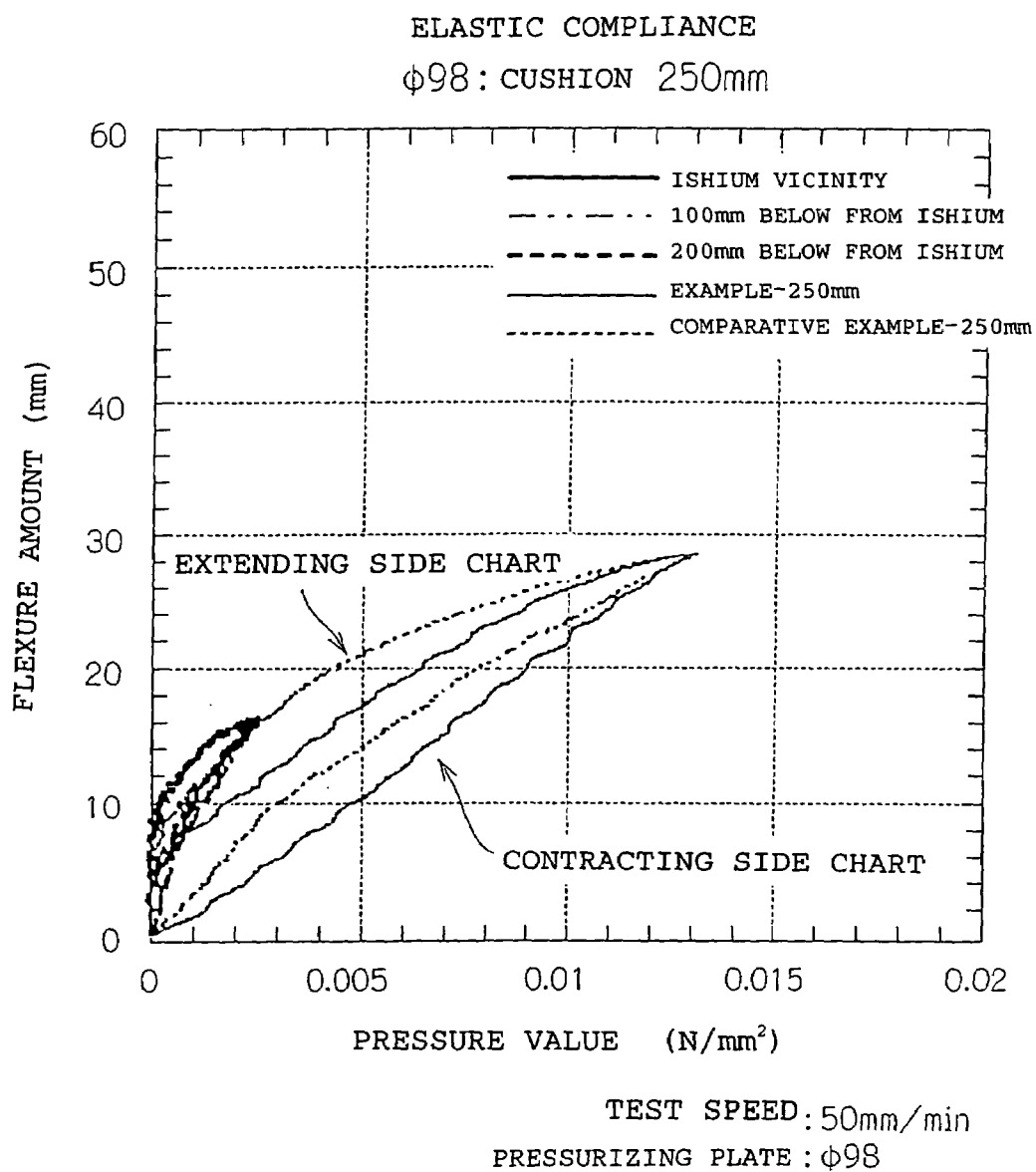
FIG. 24 is a graph illustrating elastic compliance characteristics measured by using the 98 mm-diameter pressurizing plate at a distance of 250 mm from the seat surface rear end of the cushion material for the seat portion in Examples and Comparative Examples.

As shown in FIG. 24, in Example, elastic compliance decreased when linearity became higher and a reaction force was applied to an extending side of the cushion material, on the contrary, in Comparative Example as shown in FIG. 23, the characteristic did not show any noticeable change as compared to the fluctuation characteristic at a distance of 150 mm from the seat surface rear end and exhibited a strong tendency of non-linearity.

Figure 26:
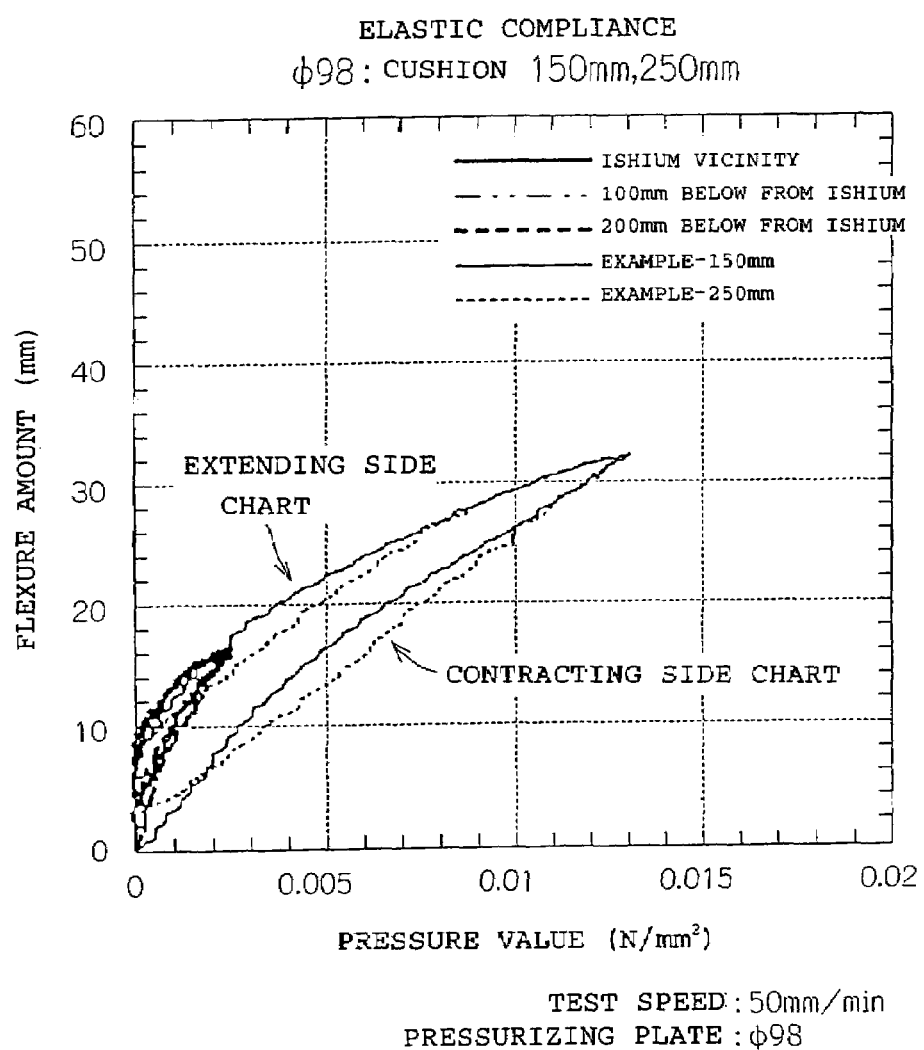
FIG. 26 is a graph illustrating overlapping elastic compliance characteristics at distances of 150 mm and 250 mm from the seat surface rear end of the cushion material for the seat portion in Examples.
Figure 27:
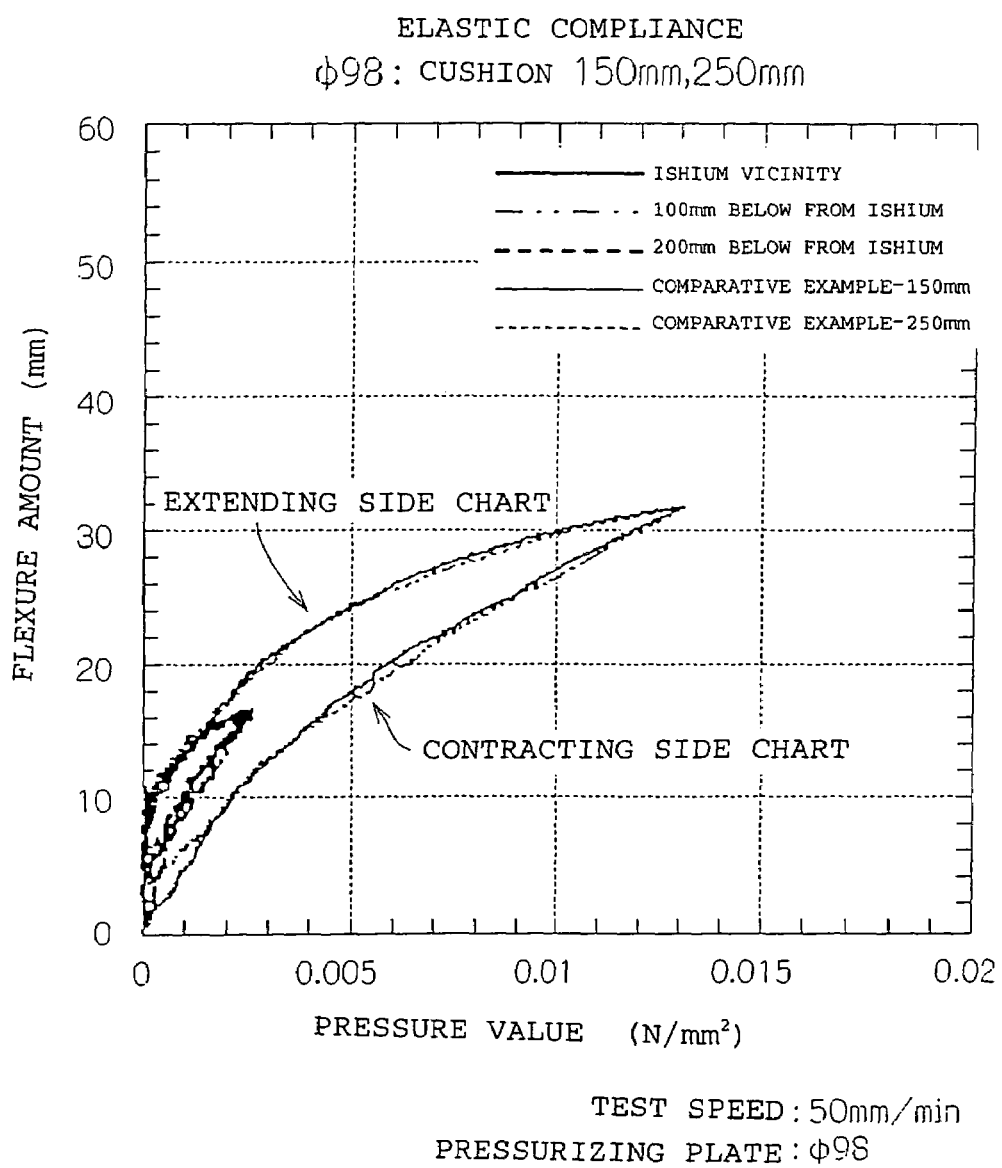
FIG. 27 is a graph illustrating overlapping elastic compliance characteristics at distances of 150 mm and 250 mm from the seat surface rear end of the cushion material for the seat portion in Comparative Examples.

FIGS. 26 and 27 show elastic compliance at distances of 150 mm and 250 mm from the seat surface rear in Example, and elastic compliance at distances of 150 mm and 250 mm from the seat surface rear in Comparative Example, by respectively overlapping characteristics with one another. It can be observed from these graphs that characteristics in Example had high linearity at a distance of 250, and that characteristics in Comparative Example had hardly changed. In this way, in Example, linearity is high at the seat portion which the vicinity of a pelvis front portion of a seated occupant contacts. Therefore, when an occupant is seated on the seat, a dam-like portion is formed at the seat portion which the vicinity of a pelvis front portion of a seated occupant contacts, and the seat portion which the vicinity of a tuber ishiadicum bottom portion of a seated occupant contacts and the rearward-direction portion therefrom relatively sink in the seat. Accordingly, it was noted that slidablity of buttocks of a seated occupant in a forward direction can be prevented, and seating stability when an occupant is seated can be improved.

Figure 25:
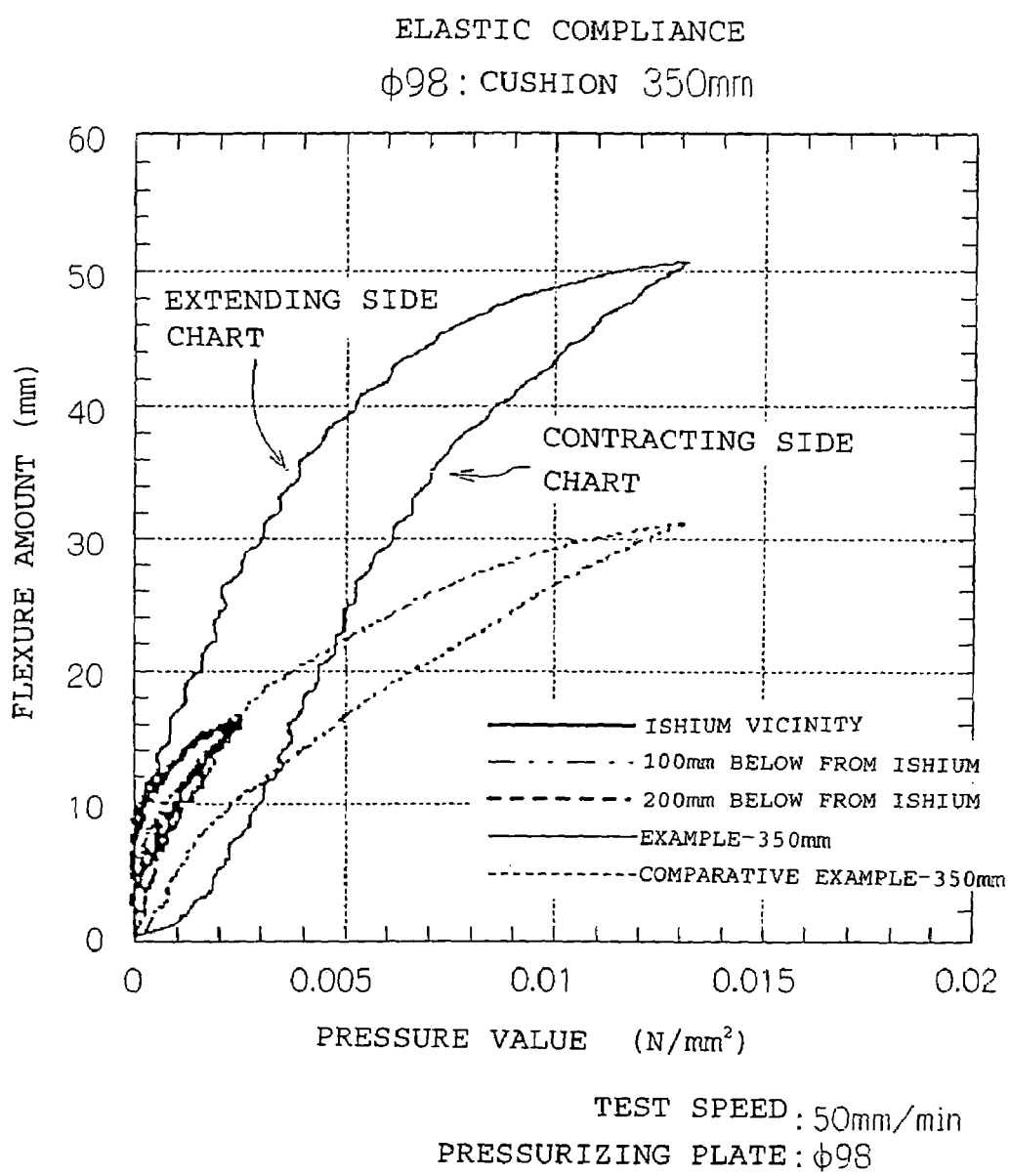
FIG. 25 is a graph illustrating elastic compliance characteristics which is measured by using the 98 mm-diameter pressurizing plate at a distance of 350 mm from the seat surface rear end of the cushion material for the seat portion in Examples and Comparative Examples.

As is apparent from FIG. 25, in Example, elastic compliance when a reaction force is applied to an extending side of a front edge portion of the seat portion is greater than elastic compliance of a human body. However, in Comparative Example, the elastic compliance when a reaction force is applied to an extending side of a front edge portion of the seat portion is substantially equivalent to that of a human body.

A size of a 98 mm-diameter pressurizing plate substantially corresponds to a portion of the seat portion which one of the thighs of a seated occupant contacts. In Example, as described above, since the front edge portion of the seat portion has large elastic compliance, it is effective to prevent the impeding of blood flow into the thighs of a seated occupant. Moreover, it was noted that when the thighs are moved, a reaction force applied in the region of the seat portion contacts is not large and a smooth pedal operation can be facilitated.

EXAMPLE 2

Figure 28:
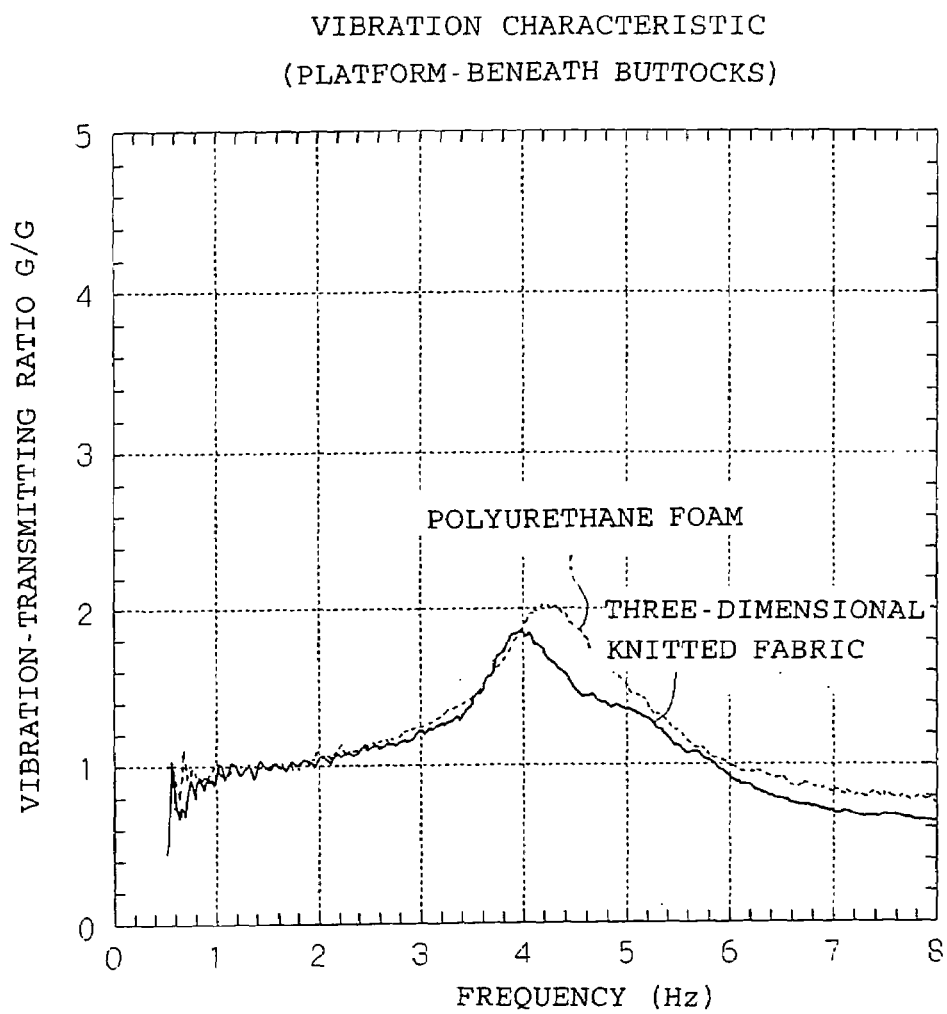
FIG. 28 is a graph illustrating vibration-transmitting characteristics of the seat in Examples.

A human being with a JM96 (load dispersion to the cushion: 85 kg) was seated on the above-described seat. A platform of a pressure applying apparatus was set at a lower portion of a seat cushion portion. A vibration transmitting ratio (G/G) in relation to a frequency was measured. The results are shown in FIG. 28 by a bold line. As a means of comparison, a vibration characteristic of a seat using polyurethane foam is shown by a narrow line.

If a vibration transmitting ratio (G/G) is excessive, a transient response quality deteriorates and because vibration remains, riding comfort is affected. However, in this respect, preferably, a seat using the three-dimensional knitted fabric imparts a characteristic which is lower than that of a seat using polyurethane foam.

An oscillation at 2 Hz or less which vibrates the very skeleton of a human body will largely influence vehicle riding comfort. However, in the case of the seat according to the present embodiment, oscillation peaks were at between 2 Hz and 5 Hz, which are lower frequencies than those when polyurethane foam was used as a cushion material. A vibration-transmitting ratio in a range of 6 to 8 Hz which oscillates with the viscera of a seated occupant was relatively small as compared with a case where polyurethane foam was used for a cushion material. Consequently, the seat of the present invention is excellent from a viewpoint of vibration absorbing performance.

Figure 29:
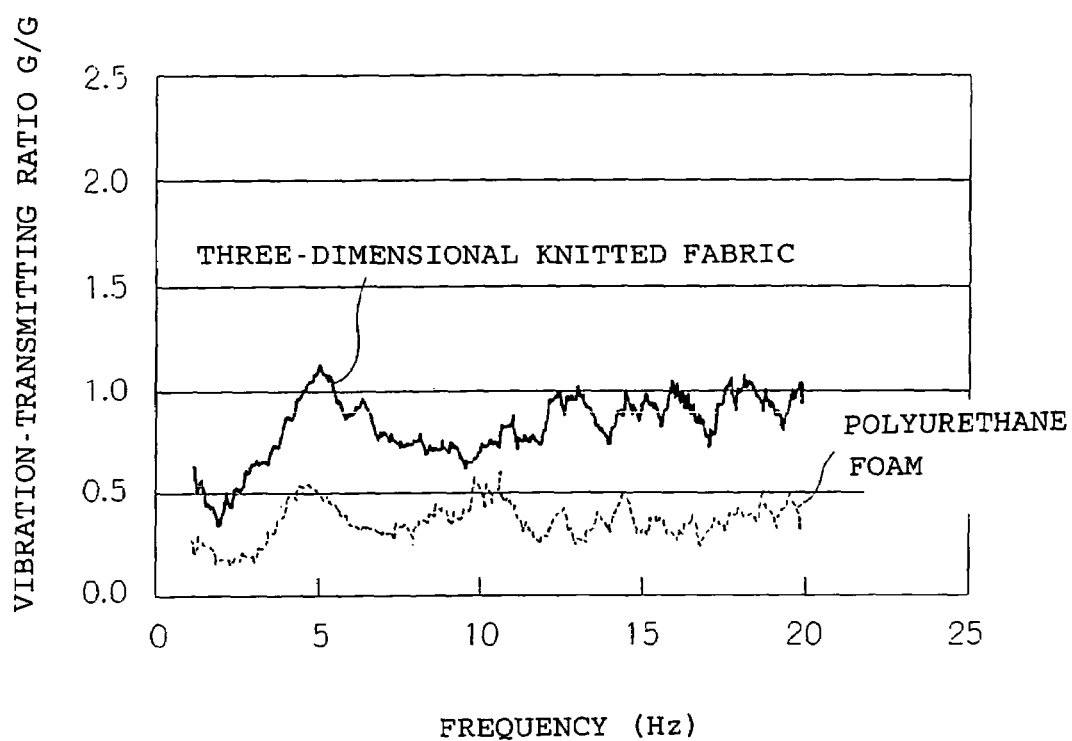
FIG. 29 is a graph illustrating a comparison between vertical vibration-transmitting characteristics of the cushion material of the seat portion and those of a waist portion of a human body in relation to a floor.
Figure 30A:
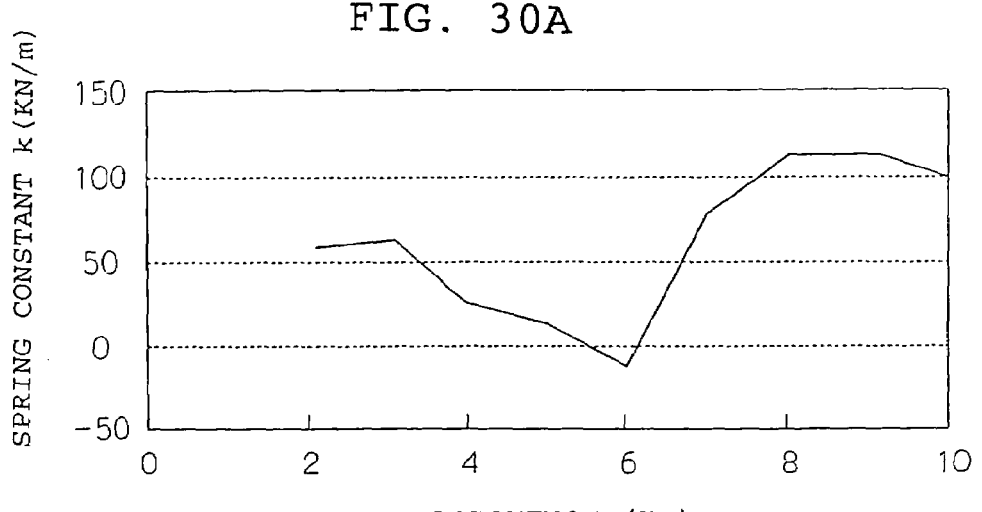
FIG. 30A is a diagram of frequency characteristics of a spring constant k of a JM85.
Figure 30B:
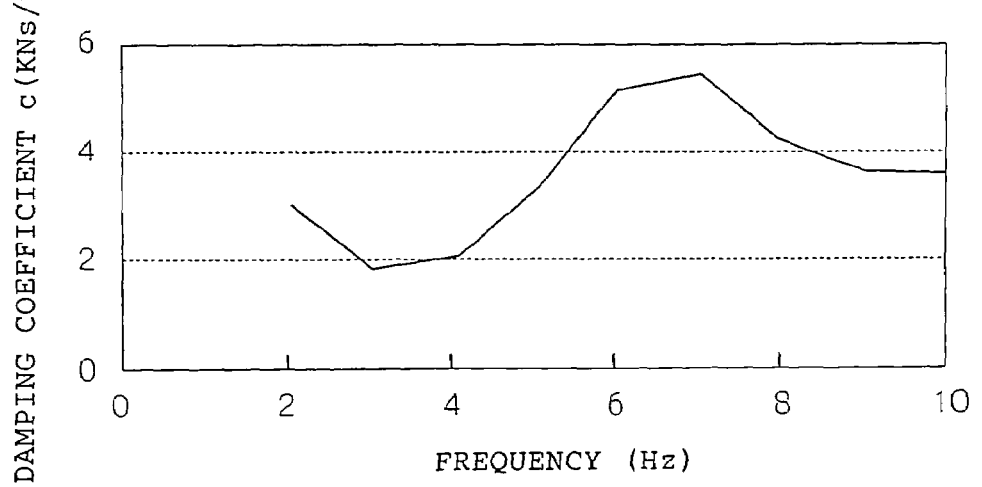
FIG. 30B is a diagram of frequency characteristics of a damping coefficient c of a JM85.
Figure 31:
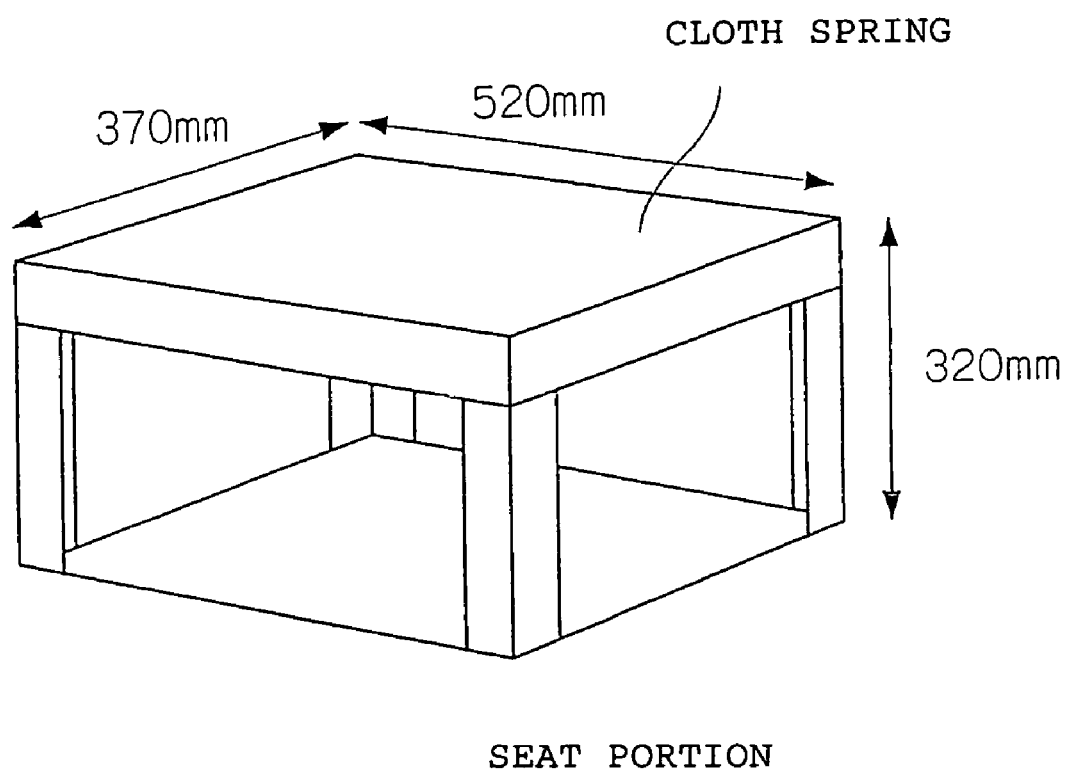
FIG. 31 is a schematic view of a measuring apparatus of the spring constant k and the damping coefficient c of a JM85.
Figure 32:
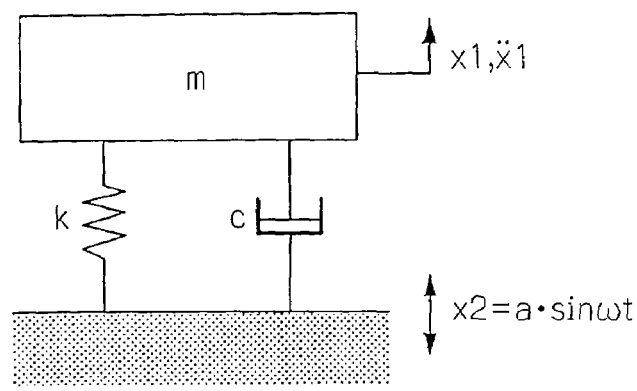
FIG. 32 is a schematic view of a vibration model with 1 degree of freedom, having the spring constant k and the damping coefficient c.
Figure 33:
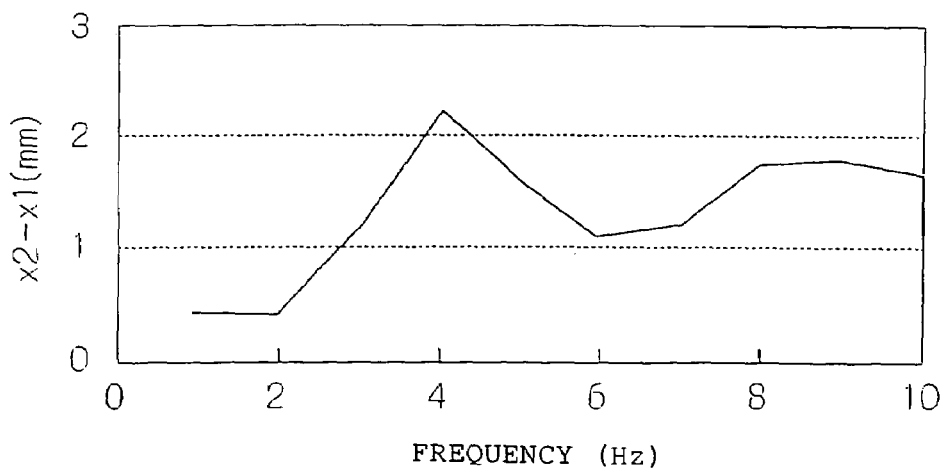
FIG. 33 is a graph showing a frequency characteristic of flexure of a muscle portion of the buttocks.
Figure 34:
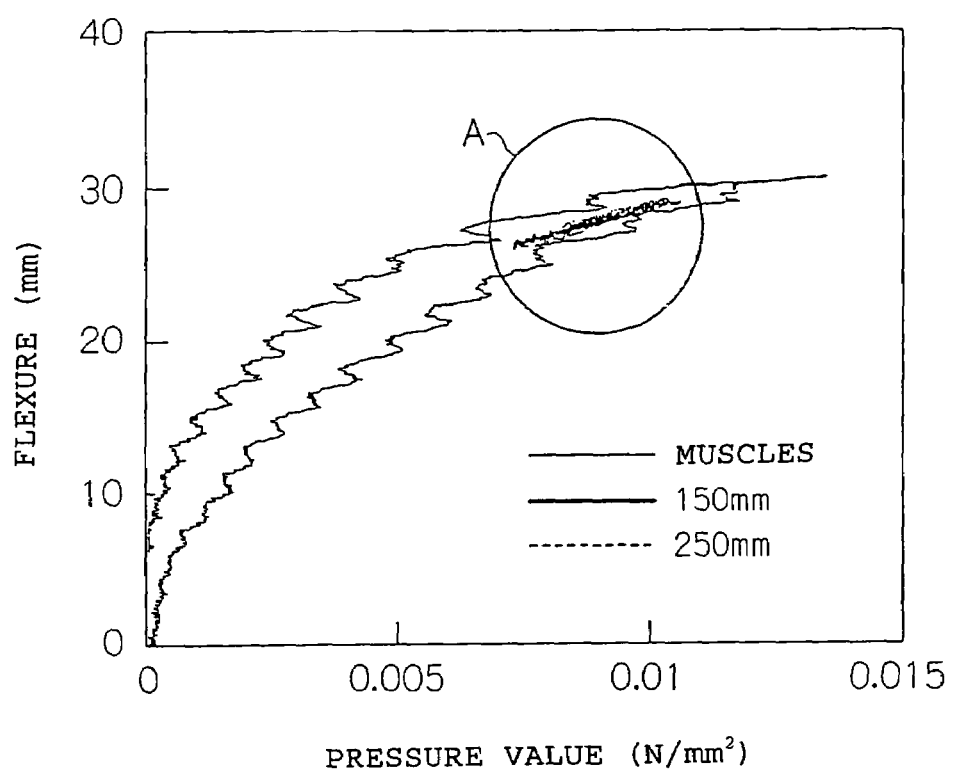
FIG. 34 is a graph showing an elastic compliance of the cushion material by simulating the state in which a characteristic of a muscle portion and a characteristic of the cushion material are in equilibrium at distances of 150 mm and 250 mm from the seat surface rear end.
Figure 35A:
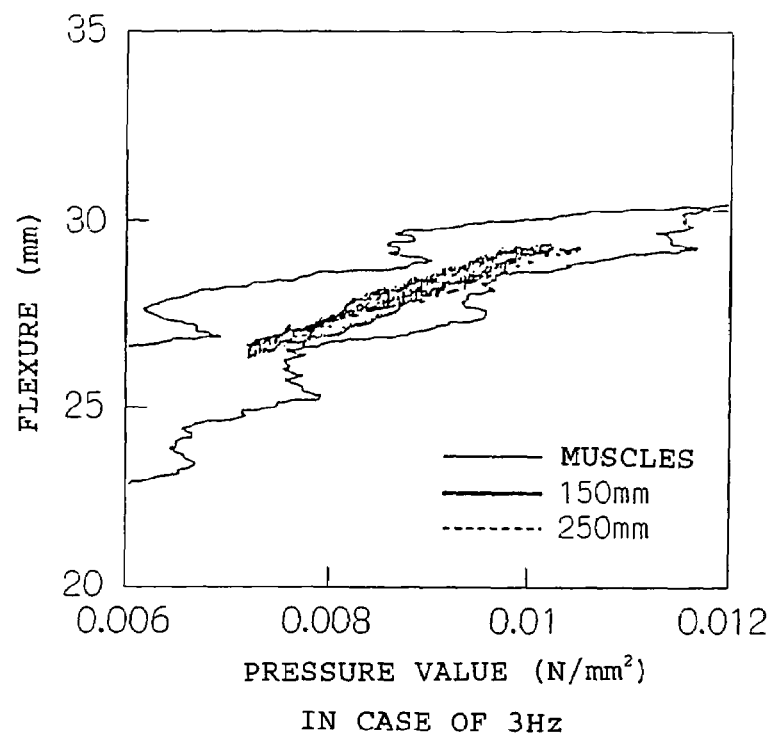
FIG. 35A is a graph showing a characteristic at 3 Hz by enlarging a portion A of FIG. 34.
Figure 35B:
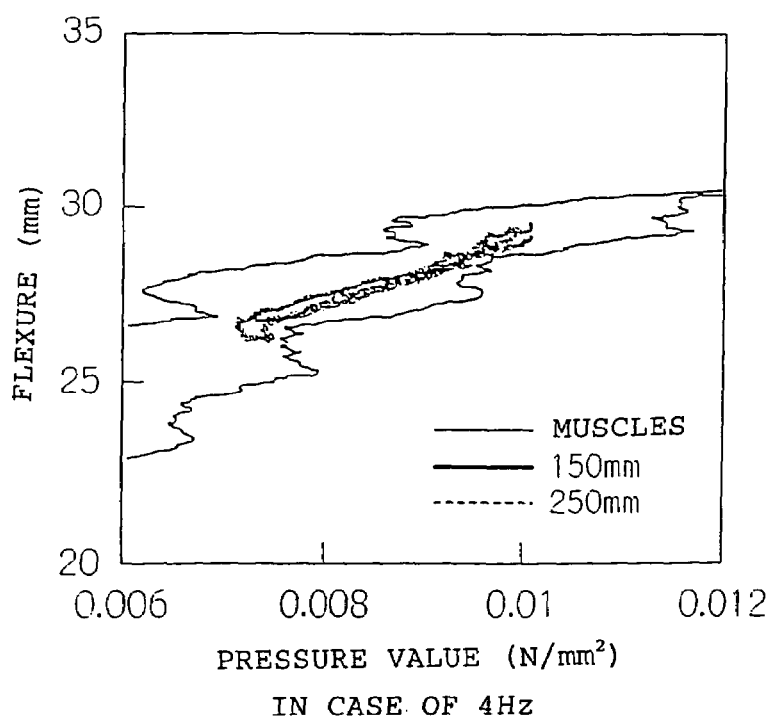
FIG. 35B is a graph of a characteristic at 4 Hz.
Figure 36:
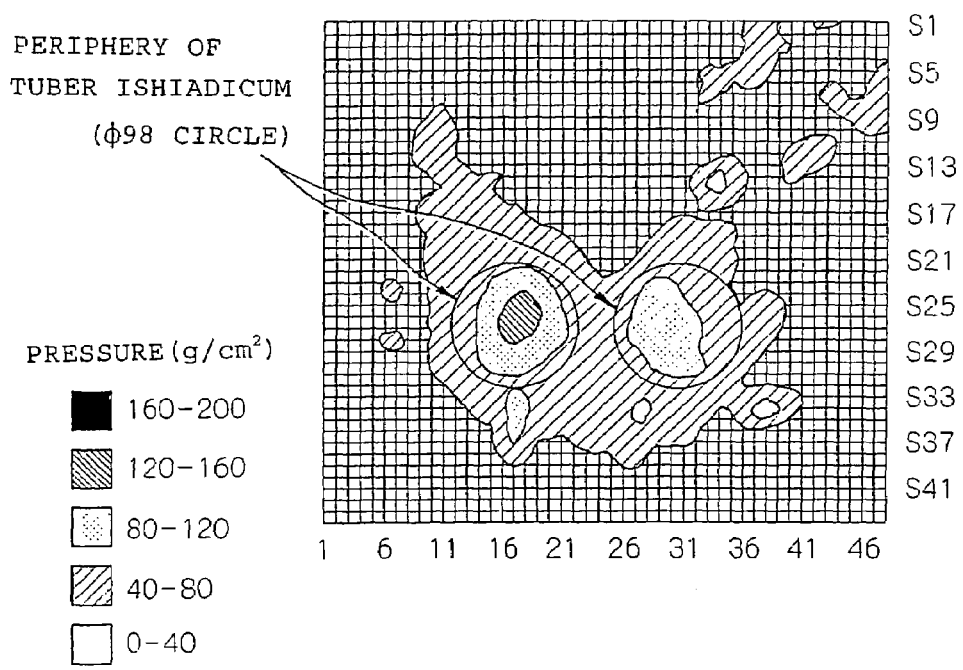
FIG. 36 is a graph of static body pressure distribution of the cushion material.

As shown in FIG. 29, when a relative vertical vibration transmitting characteristic of the cushion material and that of a waist portion of a human body in relation to a vehicle floor were examined, it was noted that a displacement of the cushion material using the three-dimensional knitted fabric was in a range of lower frequency and was relatively larger than that of the cushion material using polyurethane foam. Namely, in the cushion material using the three-dimensional knitted fabric, when a pressure was applied to a wide area of the three-dimensional knitted fabric, the entire connecting threads flexed. However, when a pressure was applied to a narrow range of a dimension of the three-dimensional knitted fabric, a pressure was applied to the connecting threads themselves, and the connecting threads were displaced between the connecting threads and the ground fabrics. At this time, a clone frictional force was generated, overcomes elasticity of the connecting threads in a bending direction thereof, and thereby causing a delay in restoration of elasticity. Consequently, a phase delay to the inputted vibration became larger, and vibration energy can be absorbed, and a vibration-transmitting ratio could be suppressed to a low level.

What is claimed is:

1. A seat comprising:
   a seat frame; and
   a cushion material supported by the seat frame and having a three-dimensional knitted fabric which is formed by a pair of ground knit fabrics which are disposed so as to be separated from one another, and connecting threads joining the separated pair of ground knit fabrics, the connecting threads extending in the space separating the separated pair of ground knit fabrics,
   wherein the cushion material includes a first region whose elastic compliance when a reaction force is applied to an extending side of the cushion material when an occupant is seated on the seat is adapted to be substantially equivalent to an elastic compliance of a portion of the occupant's body pressing the cushion material and a second region whose elastic compliance is larger than that of the first region.

2. The seat of claim 1, wherein, when a load applied to a contracting side of the cushion material when the occupant is seated on the seat, and a reaction force which is applied to an extending side of the cushion material in response to the load which has been applied to the contracting side of the cushion material are in equilibrium, an elastic compliance of the second region when a micro-reaction is applied to an extending side of the cushion material is adapted to be larger than that of a human body portion pressing the cushion material.

3. The seat of claim 1, wherein the first region and the second region are laminated to one another such that the second region is positioned on a top layer portion of a seat portion, or the first region and the second region are disposed such that the second region is adapted to be positioned at a front edge portion of the seat portion, and the first region is positioned at a predetermined region including a tuber ishiadicum of the occupant.

4. The seat of claim 1, wherein a lower portion of the first region has a region which elastic compliance is adapted to be smaller than that of the human body portion.

5. The seat of claim 1, wherein the cushion material is structured such that the three-dimensional knitted fabric is stretched across the seat frame, and a portion of the stretched three-dimensional knitted fabric is mounted on an elastic member whose size is smaller than the three-dimensional knitted fabric and whose elastic compliance characteristic is substantially linear, and the cushion material comprises the first region in which the elastic member exists beneath the three-dimensional knitted fabric and the second region in which no elastic member exists beneath the three-dimensional knitted fabric.

6. The seat of claim 5, wherein the elastic member is provided at a region which has a predetermined region including a seat portion which is adapted to contract a tuber ishiadicum bottom portion of the seated occupant, and which excludes a vicinity of a front edge portion of the seat portion and a rearward-direction portion from the predetermined region.

7. The seat of claim 5, wherein a region, whose elastic compliance when a reaction force is applied to an extending side of the cushion material when the occupant is seated on the seat is adapted to be smaller than an elastic compliance of a human body portion pressing the cushion material and whose linearity of displacement is adapted to be higher than that of a predetermined region including a seat portion which a tuber ishiadicum bottom portion of the seated occupant contacts, is provided at the seat portion which the vicinity of the pelvis front portion of the seated occupant contacts, between the predetermined region including a seat position which a tuber ishiadicum bottom portion of the seated occupant which is adapted to contact and a front edge portion of the seat portion.

8. The seat of claim 7, wherein, when a weight of the seated occupant and a reaction force of the cushion material are in equilibrium, and the cushion material vibrates due to an external pressure, an elastic compliance of the seat position which corresponds to the vicinity of the pelvis front portion of the seated occupant is adapted to be substantially equivalent to an elastic compliance of a portion of the occupant's body pressing the cushion material.

9. The seat of claim 5, wherein the three-dimensional knitted fabric is stretched across the seat frame such that a portion from the seat surface rear end to a predetermined region which is adapted to be contacted by a tuber ishiadicum bottom portion of the seated occupant is slackened to a predetermined amount, while a corresponding seat position corresponding to a vicinity of a pelvis front portion of the seated occupant, between the predetermined region portion which a tuber ishiadicum bottom portion of the seated occupant, and a front edge portion of the seat portion is slackened to a smaller amount than predetermined amount.

10. The seat of claim 9, wherein, when a weight of the seated occupant and a reaction force of the cushion material are in equilibrium, and the cushion material vibrates due to an external pressure, the three-dimensional knitted fabric is stretched such that an elastic compliance of the position which corresponds to the vicinity of the pelvis front portion of the seated occupant is adapted to be substantially equivalent to an elastic compliance of a portion of the occupant's body pressing the cushion material.

11. The seat of claim 5, wherein the three-dimensional knitted fabric is stretched across the seat frame such that a portion from a seat surface rear end to a predetermined region which is adapted to be contacted by a tuber ishiadicum bottom portion is slackened by providing 5 to 60 mm of extra width in relation to the entire width of the seat frame for structuring the seat frame and a position corresponding to a vicinity of a pelvis front portion between the predetermined region ishiadicum bottom portion and a front edge portion of the seat is slackened by providing 0 to 20 mm of extra width.

12. The seat of claim 11, wherein, when a weight of the seated occupant and a reaction force of the cushion material are in equilibrium, and the cushion material vibrates due to an external pressure, the three-dimensional knitted fabric is stretched such that an elastic compliance of the position which corresponds to the vicinity of the pelvis front portion of the seated occupant is adapted to be substantially equivalent to an elastic compliance of a portion of the occupant's body pressing the cushion material.

13. The seat of claim 5, wherein the elastic member comprises a mesh-structure elastic member, a sheet-structure elastic member, or a mesh or sheet-structure elastic member which is supported by a metal spring, wherein the elastic member imparts large elasticity to a position corresponding to a vicinity of a pelvis front portion of the seated occupant.

14. The seat of claim 13, wherein, when a weight of the seated occupant and a reaction force of the cushion material are in equilibrium, and the cushion material vibrates due to an external pressure, the three-dimensional knitted fabric is stretched such that an elastic compliance of the position which corresponds to the vicinity of the pelvis front portion of the seated occupant is adapted to be substantially equivalent to an elastic compliance of a portion of the occupant's body pressing the cushion material.

15. The seat of claim 1, wherein the three-dimensional knitted fabric further comprises a portion which has a high surface stiffness, and a main elastic region which has a low surface stiffness and imparts a major restoring force in relation to compressive deformation.

16. The seat of claim 15, wherein the three-dimensional knitted fabric comprises at least two portions each having different compressibility, the portions having the highest compressibility being structured as a main elastic region which imparts a major restoring force in relation to compressive deformation.

17. The seat of claim 13, wherein the main elastic region of the three-dimensional knitted fabric has compressibility in a range from 20% to 90%, and compressive elasticity in a range from 75% to 100%, and compressibility difference between the main elastic region and the non-main elastic region is at least 5%.

18. The seat of claim 15, wherein recesses and projections are formed on at least one of the surfaces of the three-dimensional knitted fabric and at least one of the recesses and the projections are provided at the main elastic region.

19. The seat of claim 18, wherein the projections are provided at the main elastic region and form substantially arch-shaped cross sections with adjacent recesses to form a structure which can use elasticity which is applied in a bending direction of the projections having substantially arch-shaped cross sections.

20. The seat of claim 18, wherein the three-dimensional knitted fabric is stretched across the seat frame such that the projections are formed in a wale form in an arbitrary direction of a surface of the three-dimensional knitted fabric, and the projections run in a longitudinal direction which corresponds to a transverse direction of the seat at one of a seat portion or both at the seat portion and a back portion.

21. The seat of claim 18, wherein the three-dimensional knitted fabric is stretched across the seat frame such that the projections of the three-dimensional knitted fabric are arranged in a lattice form or a staggered form, and a direction in which arrangement density of the main elastic region is high, corresponds to a transverse direction of the seat, at one of a seat portion or both at the seat portion and a back portion.

22. The seat of claim 18, wherein the recesses are formed by joining connecting threads between the pair of ground knit fabrics in a state in which the ground knit fabrics are made to approach one another, and the projections structure the main elastic region.

23. The seat of claim 18, wherein the recesses of the three-dimensional knitted fabric are formed by one of welding, adhesion, stitching, welding using molten fabric, and vibration welding.

24. The seat of claim 18, wherein the three-dimensional knitted fabric is formed so that one element or an arbitrary two or more of a group of the elements comprising: connecting thread arrangement density, connecting thread thickness, connecting thread length, connecting thread material, ground knit fabric mesh shape, ground knit fabric mesh size a ground thread material for structuring the ground knit fabric, and mesh tightness at the connecting portion of connecting threads and a ground knit fabric are different in a region of the projections and a region of the recesses.

25. The seat of claim 18, wherein the three-dimensional knitted fabric is formed such that connecting threads in the region of the recesses have an arrangement density which is lower than that of connecting threads in the region of the projections for structuring the main elastic region.

26. The seat of claim 15, wherein a thickness of the main elastic region of the three-dimensional knitted fabric ranges from 5 mm to 80 mm.

27. The seat of claim 15, wherein a percentage per unit area of the main elastic region of the three-dimensional knitted fabric when projected on a plane is in a range from 30% to 90%/m2.

28. The seat of claim 15, wherein the main elastic region of the three-dimensional knitted fabric is formed by adjusting a knitted organization.

29. The seat of claim 28, wherein the knitting organization of the three-dimensional knitted fabric is adjusted with any one element or by an arbitrarily combination of two elements or more of a group of elements comprising a connecting thread arrangement density, a connecting thread thickness, a connecting thread length, a connecting thread material, a ground knit fabric mesh shape, a ground knit fabric mesh size a ground thread material for structuring the ground knit fabric, and a mesh tightness at the connecting portion of the connecting thread and the ground knit fabric.

30. The seat of claim 1, wherein the three-dimensional knitted fabric is stretched across the seat frame at an elongation percentage of less than 5%.

31. The seat of claim 1, wherein the pair of ground knit fabrics, which are disposed so as to be separated from one another, comprise:

a first ground knit fabric which is formed by a flat fabric organization, and a second ground knit fabric which comprises a plurality of strip-shaped knit fabric portions which are arranged so as to extend in a predetermined direction at a predetermined spacing, wherein the three-dimensional knitted fabric is formed by connecting, with connecting threads, the plurality of the strip-shaped knit fabric portions, respectively, to the first ground knit fabric at a region of the first ground knit fabric which faces the respective strip-shaped fabric portions, at a region of the first ground knit fabric which faces the respective cylinders among the respective strip-shaped fabric portions, and at a region of the first ground knit fabric which faces other respective adjacent strip-shaped fabric portions.

32. The seat of claim 31, wherein a hollow portion where connecting threads do not exist is formed at a widthwise-intermediate portion of a region where the first ground knit fabric faces the strip-shaped knit fabric portions.

33. The seat of claim 31, further comprising a plurality of communicating portions where the respective adjacent strip-shaped knit fabric portions link with each other at a plurality of portions which are separated from one another at a predetermined spacing in an extending direction of the strip-shaped knit fabric portions.

34. The seat of claim 31, wherein respective edge portions of the strip-shaped knit fabric portions and the first ground knit fabric are made to approach one another so that the respective strip-shaped knit fabric portions form projections.

35. A seat comprising:
a seat frame; and
a cushion material including a three-dimensional knitted fabric supported by the seat frame and formed by joining, with connecting threads, a pair of ground knit fabrics which are disposed so as to be separated from one another, wherein the cushion material includes a first region whose elastic compliance when a reaction force is applied to an extending side of the cushion material when an occupant is seated on the seat is adapted to be substantially equivalent to an elastic compliance of a portion of the occupant's body pressing the cushion material and which first region is adapted to be positioned at a predetermined region including a seat portion which contacts a tuber ishiadicum bottom portion of the seated occupant, a second region whose elastic compliance is larger than the elastic compliance of the first region and which is positioned in the vicinity of a front edge portion of the seat portion, and a third region whose elastic compliance is smaller than the elastic compliance of the first region and which is adapted to be positioned at a position corresponding to a vicinity of a pelvis front portion of the seat occupant.

36. The seat of claim 35, wherein the cushion material vibrates, an elastic compliance of the third region of the seat portion is adapted to be substantially equivalent to an elastic compliance of a human body portion pressing the cushion material.

* * * * *

UNITED STATES PATENT AND TRADEMARK OFFICE
CERTIFICATE OF CORRECTION

PATENT NO. : 7,275,793 B2
APPLICATION NO. : 10/477877
DATED : October 2, 2007
INVENTOR(S) : Etsunori Fujita et al.

It is certified that error appears in the above-identified patent and that said Letters Patent is hereby corrected as shown below:

Column 42, line 23, delete "is adapted to contract" and insert --contacts--;

Column 42, line 40, delete "which is adapted to contact" and insert --contacts--;

Column 43, lines 6 and 11, delete "which is adapted to be contacted by" and insert --including--;

Column 43, line 11, insert after "region": --including a tuber--.

Signed and Sealed this

Third Day of June, 2008

JON W. DUDAS
*Director of the United States Patent and Trademark Office*